(12) United States Patent
Miyamoto et al.

(10) Patent No.: US 7,116,917 B2
(45) Date of Patent: Oct. 3, 2006

(54) OPTICAL TRANSMITTER AND OPTICAL TRANSMISSION SYSTEM

(75) Inventors: Yutaka Miyamoto, Yokohama (JP);
Akira Hirano, Yokohama (JP);
Shoichiro Kuwahara, Yokosuka (JP);
Masahito Tomizawa, Yokosuka (JP)

(73) Assignee: Nippon Telegraph and Telephone Coproration, Tokyo (JP)

(*) Notice: Subject to any disclaimer, the term of this patent is extended or adjusted under 35 U.S.C. 154(b) by 613 days.

(21) Appl. No.: 10/185,407

(22) Filed: Jun. 26, 2002

(65) Prior Publication Data
US 2003/0002121 A1    Jan. 2, 2003

(30) Foreign Application Priority Data
Jun. 29, 2001 (JP) ............................ P2001-199467
Feb. 18, 2002 (JP) ............................ P2002-040855

(51) Int. Cl.
*H04B 10/12* (2006.01)
(52) U.S. Cl. ....................................... 398/185; 398/188
(58) Field of Classification Search ................ 398/183, 398/185, 188, 189
See application file for complete search history.

(56) References Cited

U.S. PATENT DOCUMENTS

| 5,543,952 | A  | * | 8/1996  | Yonenaga et al. ........... 398/185 |
| 5,917,638 | A  |   | 6/1999  | Franck et al. ................ 398/201 |
| 6,330,375 | B1 | * | 12/2001 | Fishman et al. .............. 385/11 |
| 6,381,048 | B1 | * | 4/2002  | Chraplyvy et al. ............ 398/79 |
| 6,559,996 | B1 |   | 5/2003  | Miyamoto et al. ........... 398/183 |
| 2002/0196508 | A1 | * | 12/2002 | Wei et al. .................... 359/183 |

FOREIGN PATENT DOCUMENTS

| EP | 0 825 733 A2 | 2/1998 |
| JP | 61-169034 | 7/1986 |
| JP | 06-053904 | 2/1994 |
| JP | 2000-059300 | 2/2000 |
| JP | 2000-106543 A | 4/2000 |
| JP | 2000-156665 A | 6/2000 |
| JP | 2001-244894 | 9/2001 |
| JP | 2001-251250 | 9/2001 |
| JP | 2002-023121 | 1/2002 |
| JP | 2001-147411 | 5/2002 |

OTHER PUBLICATIONS

Y. Miyamoto et al., "Duobinary carrier-suppressed return-to-zero format and its application to 100GHz-spaced 8x43-Gbit/s DWDM unrepeatered transmission over 163 km", Tech. Digest of OFC2001, paper TuU4, 2001.

(Continued)

*Primary Examiner*—Christina Y. Leung
(74) *Attorney, Agent, or Firm*—Darby & Darby

(57) ABSTRACT

The present invention suppresses to a minimum the degradation of the transmission quality caused by chromatic dispersion characteristic of an optical transmission medium, and the interplay between the chromatic dispersion and non-linear optical effects in dense WDM transport systems. A baseband input data signal is pre-coded in advance by a pre-coding unit, phase modulation is carried out using a pre-coded signal by the optical phase modulating unit, and the phase modulated optical signal is converted to an RZ intensity modulated signal by the optical filter unit that performs phase-shift-keying to amplitude-shift-keying conversion. For example, an optical phase modulating unit generates an encoded DPSK phase modulated signal using a differential phase shirt keying (DPSK) format, and a phase modulated signal is converted to an RZ intensity modulated signal by the optical filter unit disposed downstream of the optical phase modulating unit.

24 Claims, 43 Drawing Sheets

OTHER PUBLICATIONS

T. Miyamoto et al., "Suppression of degradation induced by SPM/XPG+GVM in WDM transmission using a bit-synchronous intensity modulated DPSK signal", Digest of OECC2000, paper 14D3-3, pp. 580-581, Jul. 2002.

K. Noguchi et al., "$LiNbO_3$ high-speed modulator", Tech. Dig. Of CLEO Pacific Rim '99, paper FS2, pp. 1267-1268, 1999.

K. Sato et al., "Dual mode operation of semiconductor mode-locked lasers for anti-phase pulse generation", OFC'2000, 320/Th W3-1, 2000.

H. Takahasi et al., "Transmission characteristics of arrayed waveguide N×N wavelength multiplexer", IEEE J. Lightwave Technol., vol. 13, No. 3, pp. 447-455, 1995.

Y. Miyamoto et al., "100 Ghz-spaced 8×43 Gbit/s DWDM unrepeatered transmission over 163km using duobinary-carrier-suppressed return-to-zero format", Electronics Letters, vol. 37, No. 23, Nov. 2001.

Miyamoto et al., "S-band 3×120-km DSF transmission of 8×42.7-Gbit/s DWDM duobinary carrier-suppressed RZ signals generated by novel wideband PM/AM conversion", OAA2001, Post Deadline Paper, Jul. 2001.

First Office Action for Chinese Patent Application No. 02123164.8 issued on Jul. 22, 2005.

English Translation of Excerpts from Japanese Office Action regarding the Examiner's Comments mailed Oct. 18, 2005.

Akio Konishi et al., 3.24 Tbit/s carrier suppressed RZ transmission using a single supercontinuum source, The Institute of Electronics, Information and Communication Engineers (IEICE), Proceedings of the 2001 IEICE Society Conference, Aug. 29, 2001, B-10-86, p. 424.

Y. Miyamoto et al, Duobinary carrier-suppressed return-to-zero format and its application to $100GH_z$-spaced 8×43-Gbit/s DWDM unrepeatered transmission over 163 km, Optical Fiber Communication Conference (OFC), Technical Digest Postconference Edition, Anaheim, CA, Mar. 17-22, 2001, Trends in Optics and Photonics Series, Tops, vol. 54, Washington, WA: OSA, US, vol. 2, Mar. 17, 2001, p. TuU4-1.

K. Fukuchi, et al, 10 Gbit/s-120 km standard fiber transmission employing a novel optical phase-encoded intensity modulation for signal spectrum compression, Conference on Optical Fiber Communications, Dallas, Feb. 16-21, 1997, New York, IEEE, US, Feb. 16, 1997, p. 270-271.

K. Takayama, et al, An All-Optical $10-GH_z$ LD-Based Clock Regenerator Using a Mach-Zehnder-Interferometer-Type NRZ-to-RZ Converter, IOOC-ECOC, European Conference on Optical Communication ECOC, International Conference on Integrated Optics and Optical Fiber Communication IOOC, vol. 1, 1991, p. 77-80.

T. Miyano et al, Suppression of Degradation Induced by SPM/XPM+GVD in WDM Transmission Using a Bit-Synchronous Intensity Modulated DPSK Signal, Technical Digest, Optoelectronics and Communications Conference, Proceedings of OECC, Jul. 2000, p. 580-581.

* cited by examiner

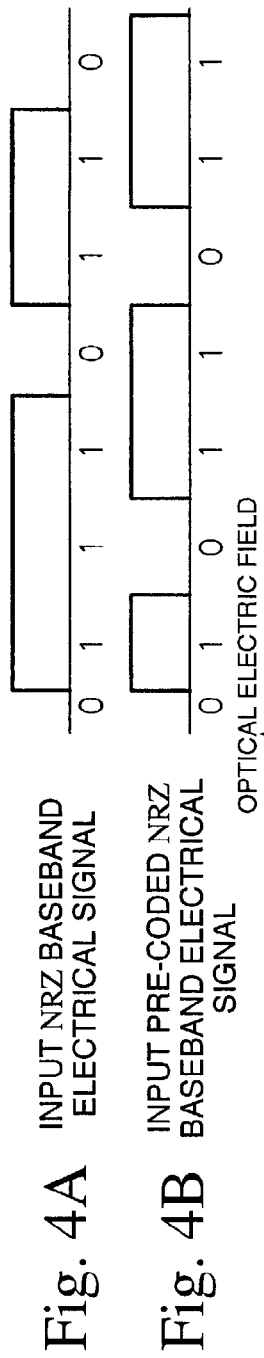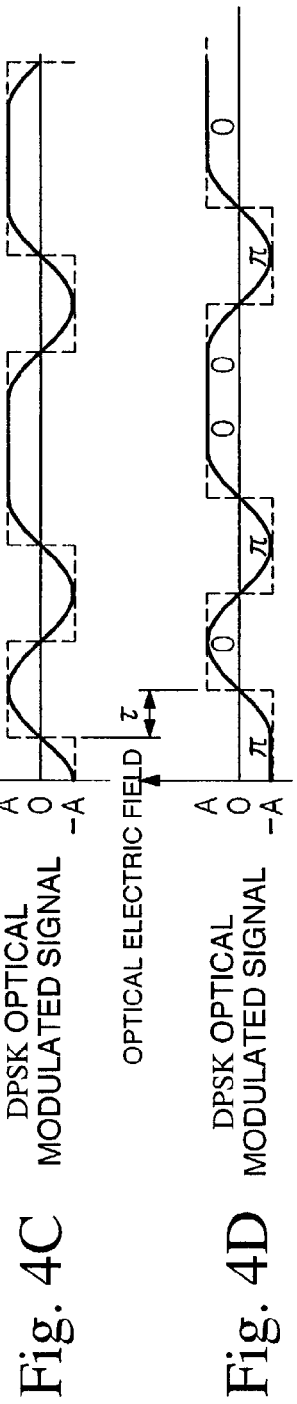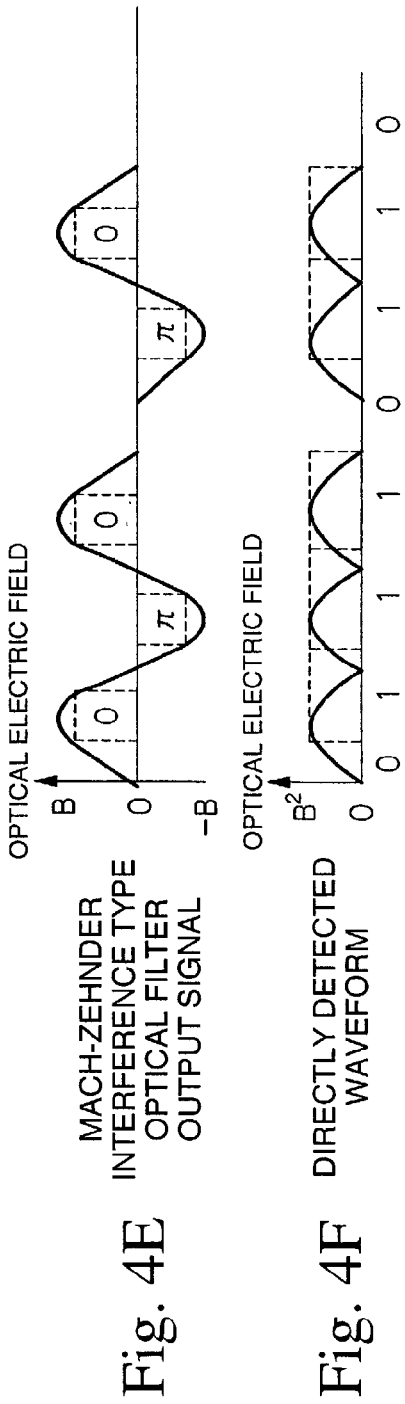

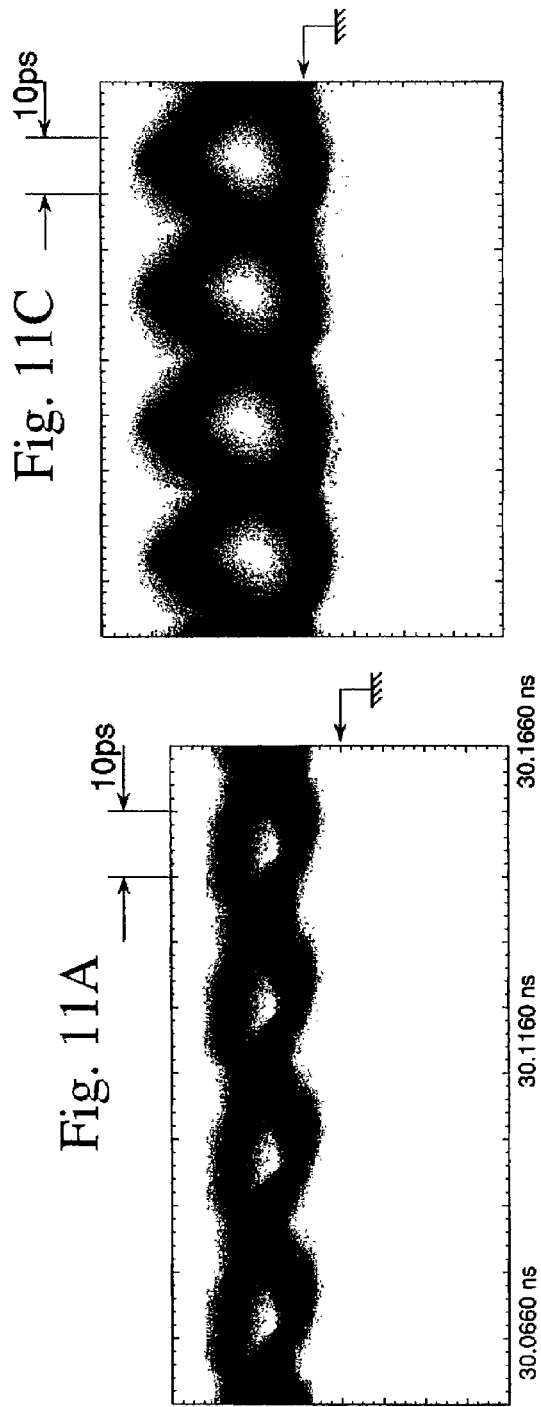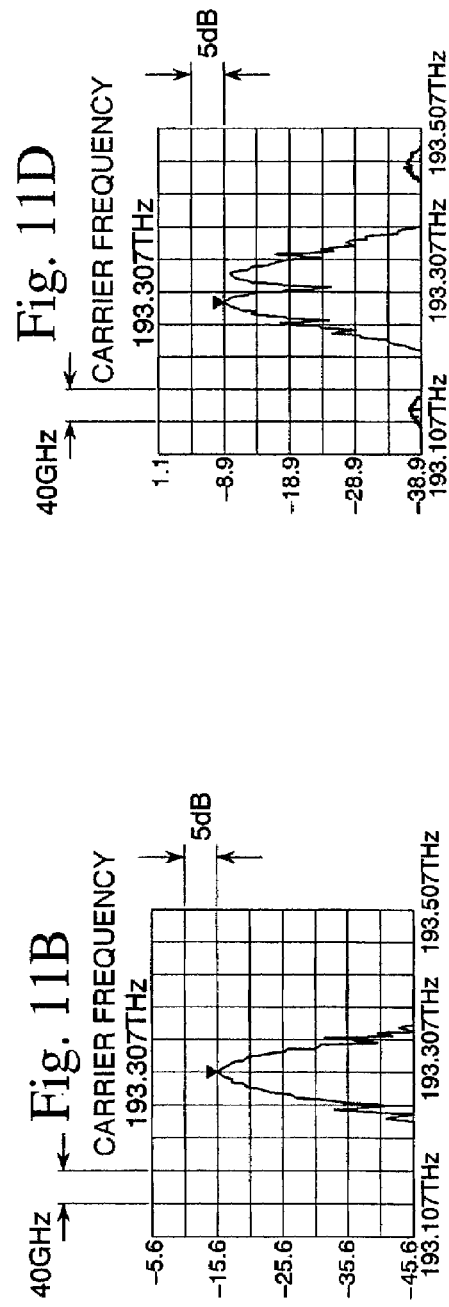

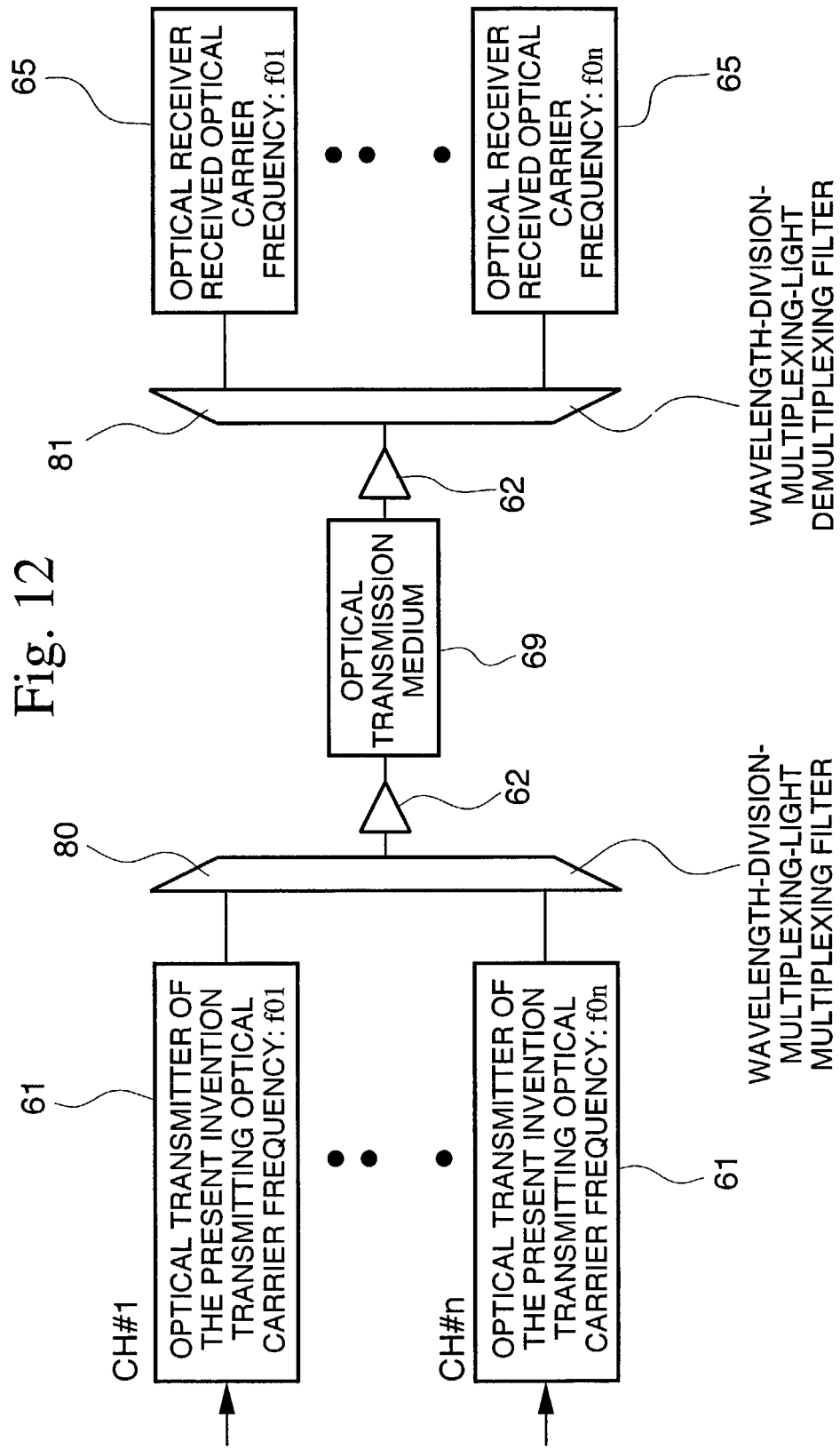

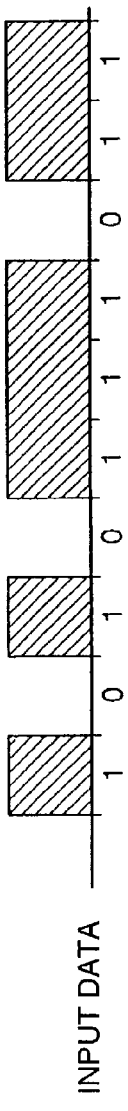
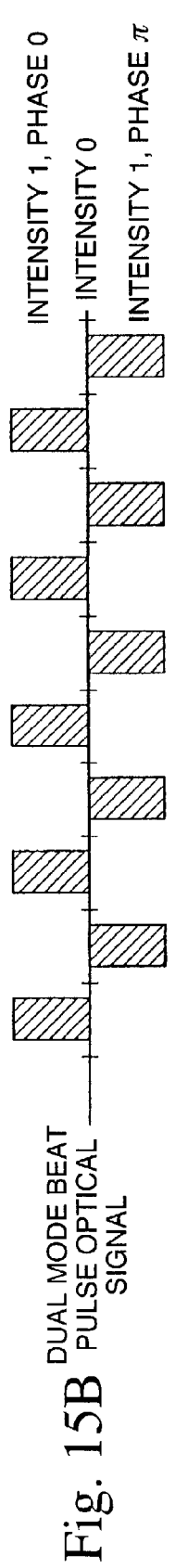
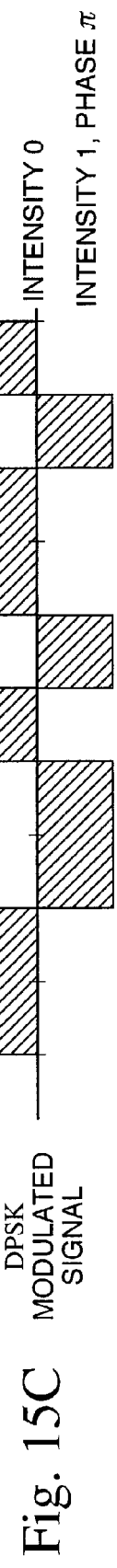
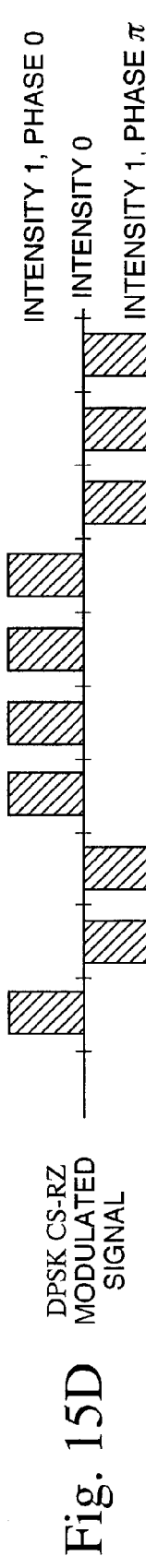
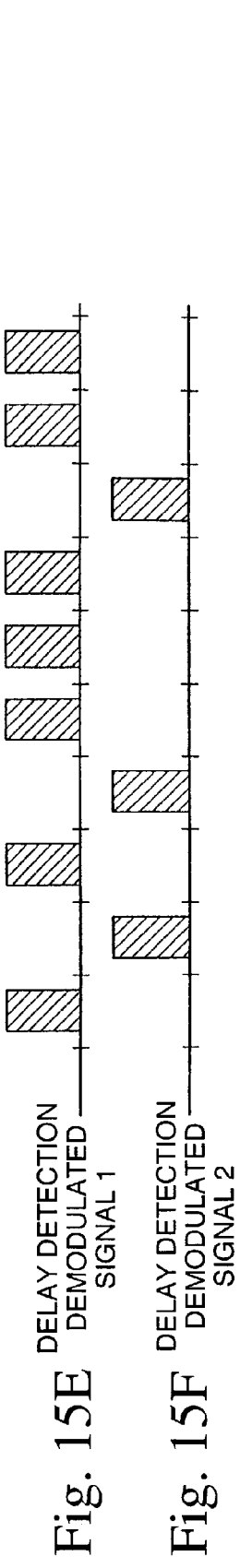
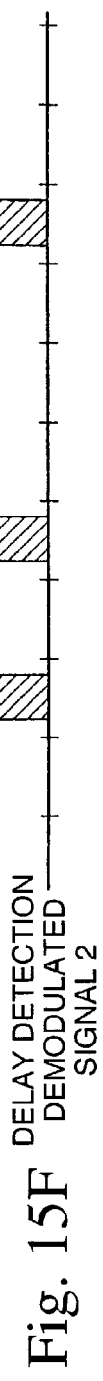
Fig. 15A  INPUT DATA
Fig. 15B  DUAL MODE BEAT PULSE OPTICAL SIGNAL
Fig. 15C  DPSK MODULATED SIGNAL
Fig. 15D  DPSK CS-RZ MODULATED SIGNAL
Fig. 15E  DELAY DETECTION DEMODULATED SIGNAL 1
Fig. 15F  DELAY DETECTION DEMODULATED SIGNAL 2

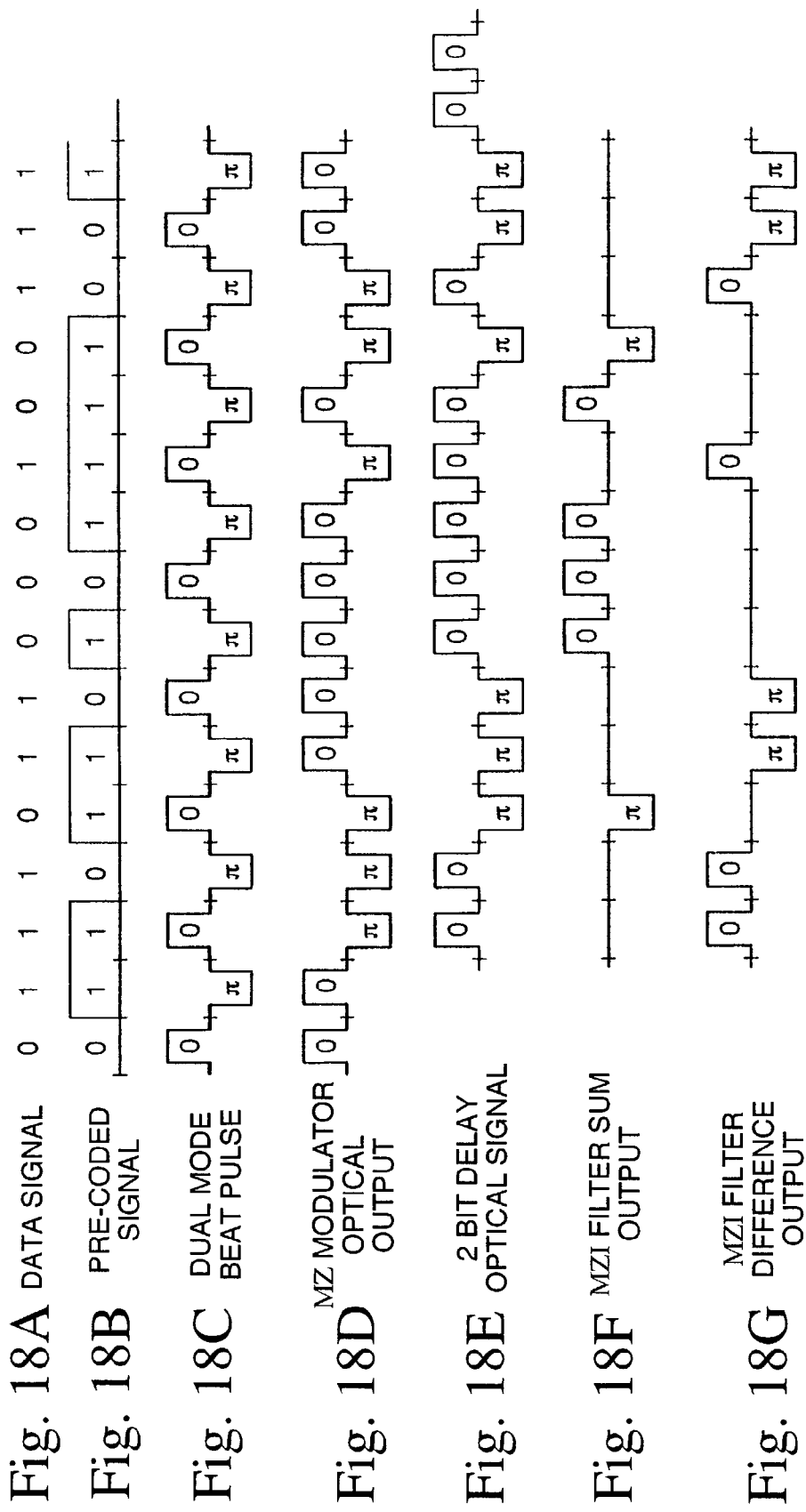

SPECTRUM
INTENSITY
(dB)

SPECTRUM
INTENSITY
(dB)

SPECTRUM
INTENSITY
(dB)

SPECTRUM
INTENSITY
(dB)

SPECTRUM
INTENSITY
(dB)

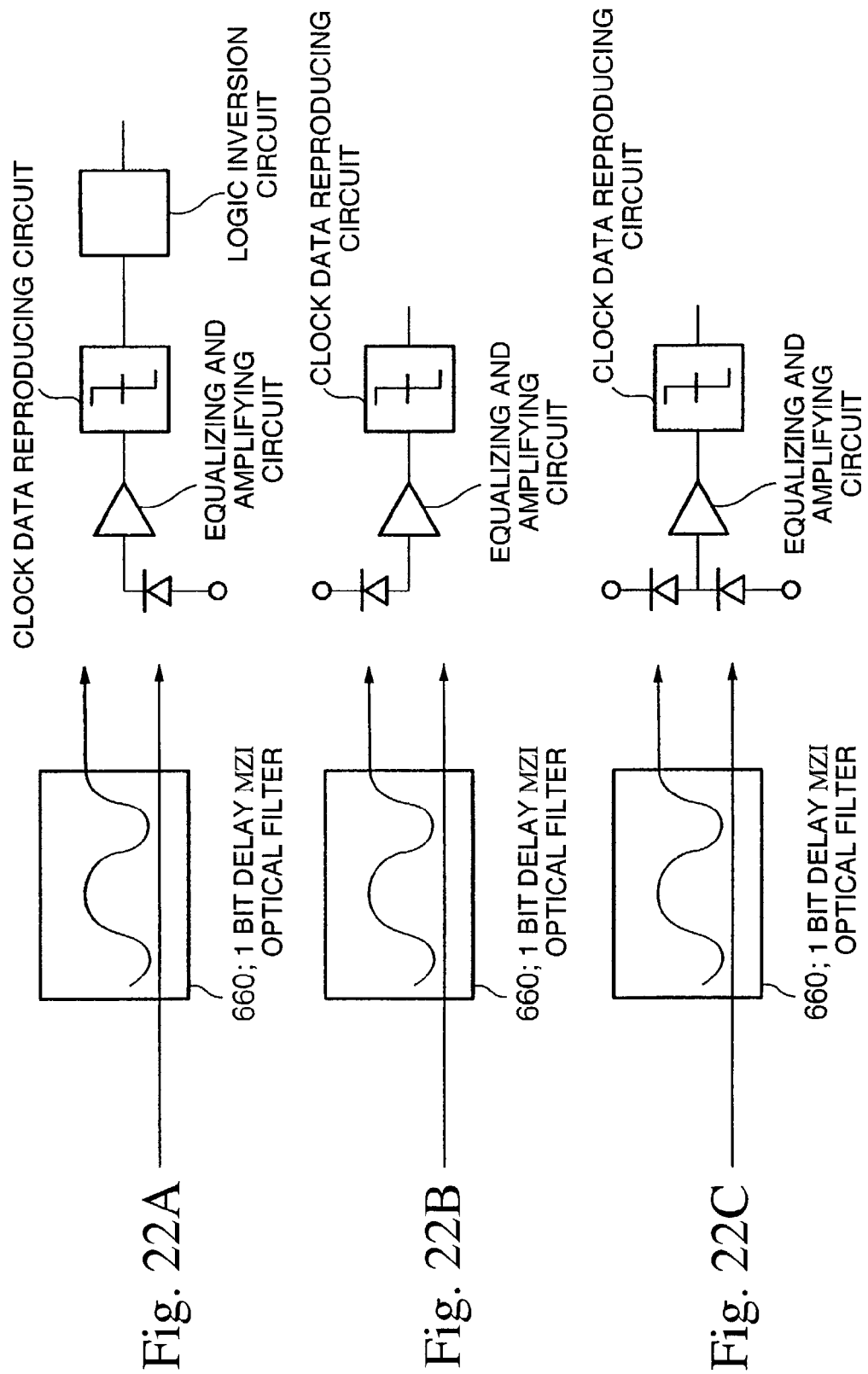

SPECTRUM INTENSITY (dB)

$f_0-2B$  $f_0-B$  $f_0$  $f_0+B$  $f_0+2B$

SPECTRUM INTENSITY (dB)

$f_0-2B$  $f_0-B$  $f_0$  $f_0+B$  $f_0+2B$

SPECTRUM INTENSITY (dB)

$f_0-2B$  $f_0-B$  $f_0$  $f_0+B$  $f_0+2B$

SPECTRUM INTENSITY (dB)

SPECTRUM INTENSITY (dB)

SPECTRUM INTENSITY (dB)

filtered optical spectrum
(24-GHz FWHM Gaussian)

filtered waveform
(24-GHz FWHM Gaussian)

filtered eye diagram
(24-GHz FWHM Gaussian)

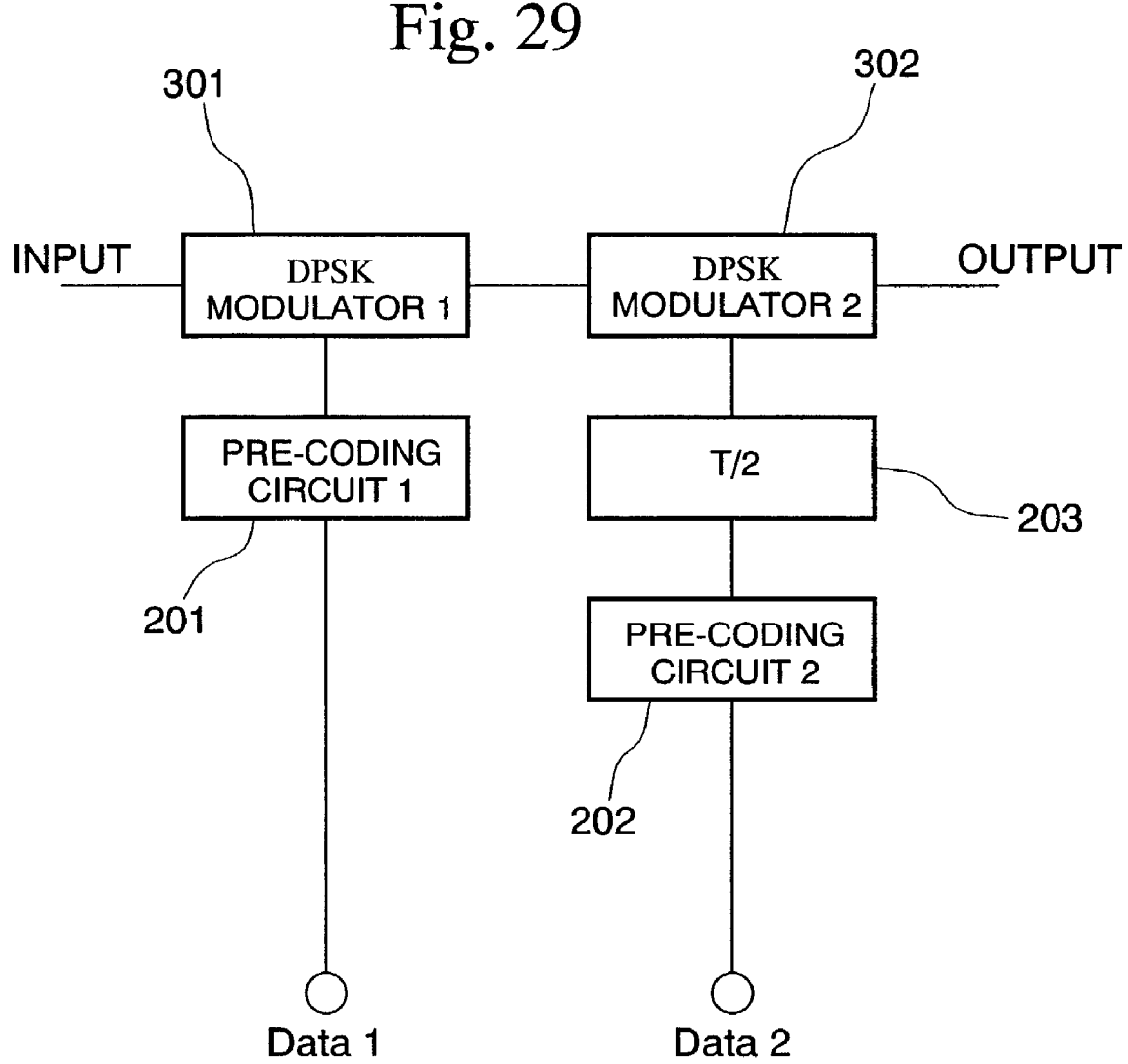

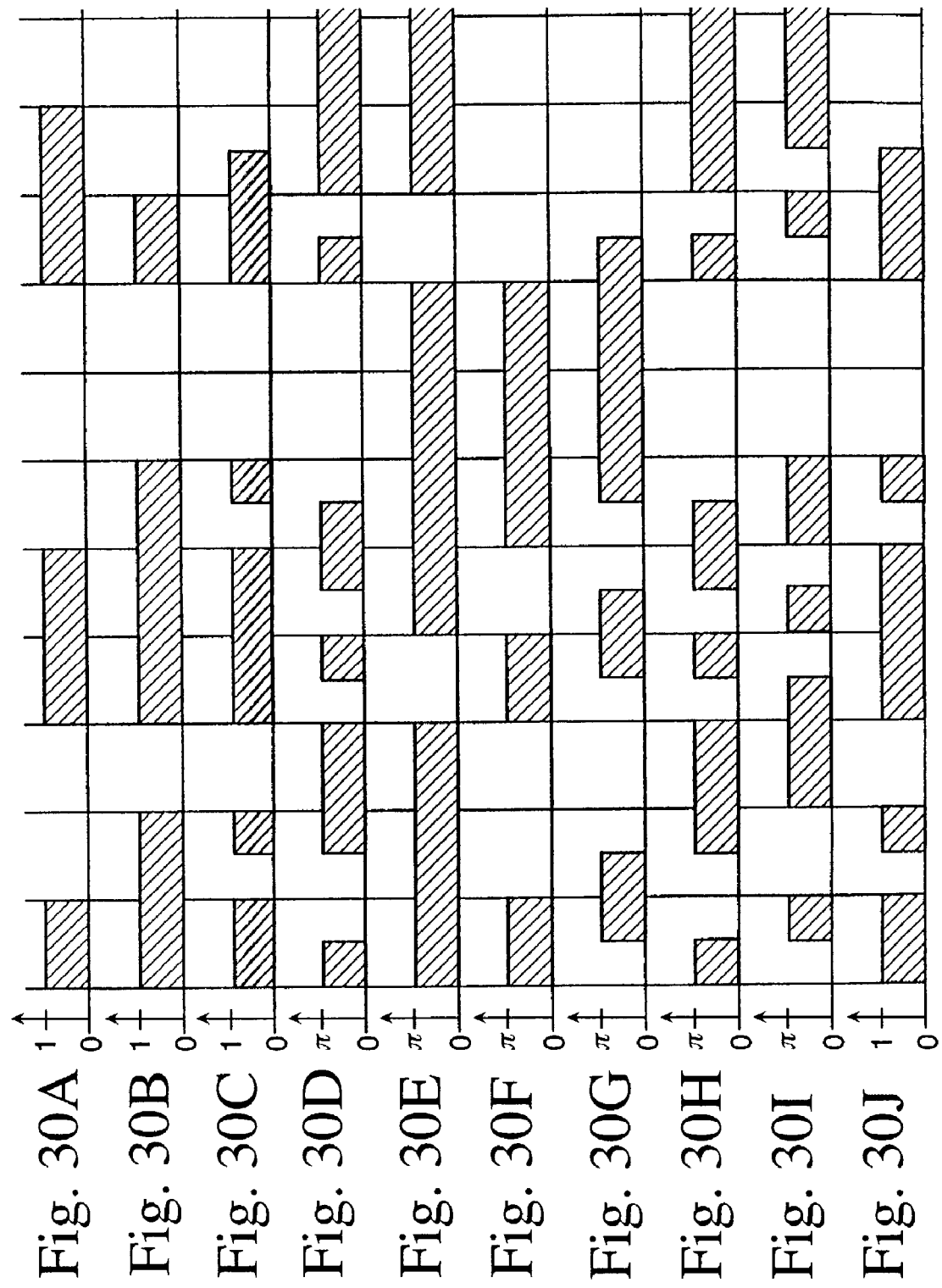

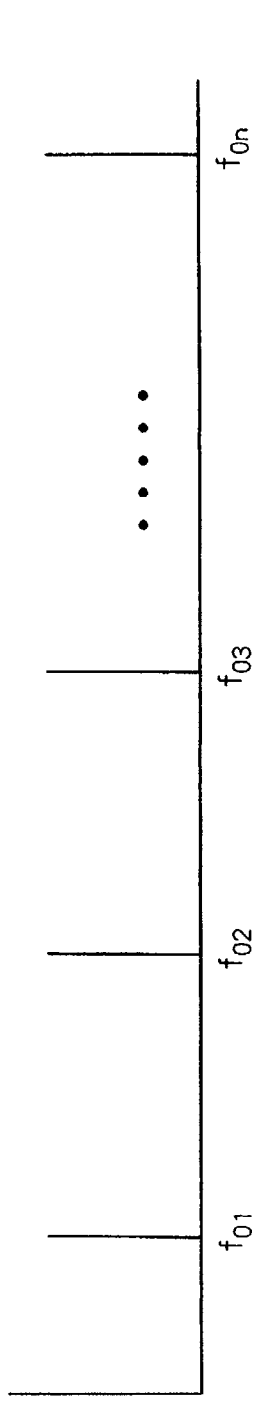
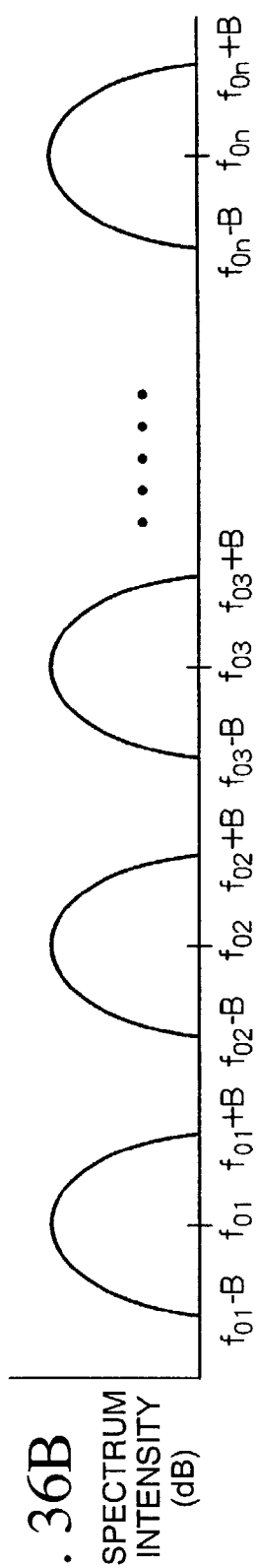
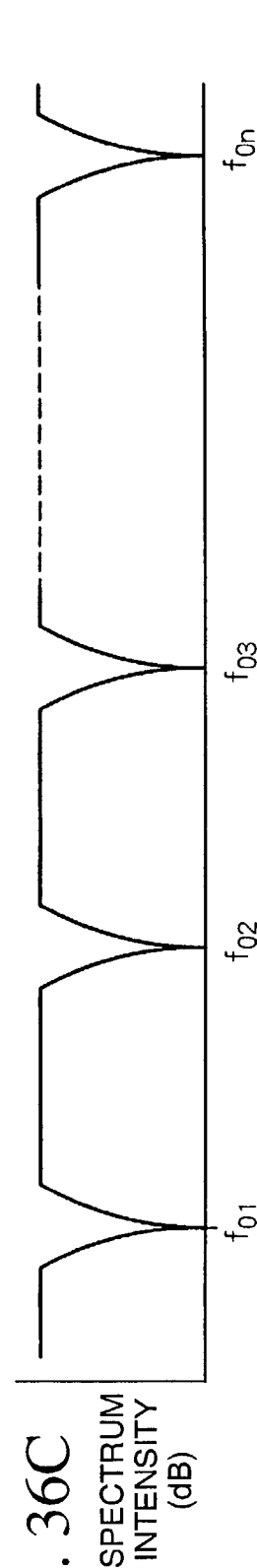
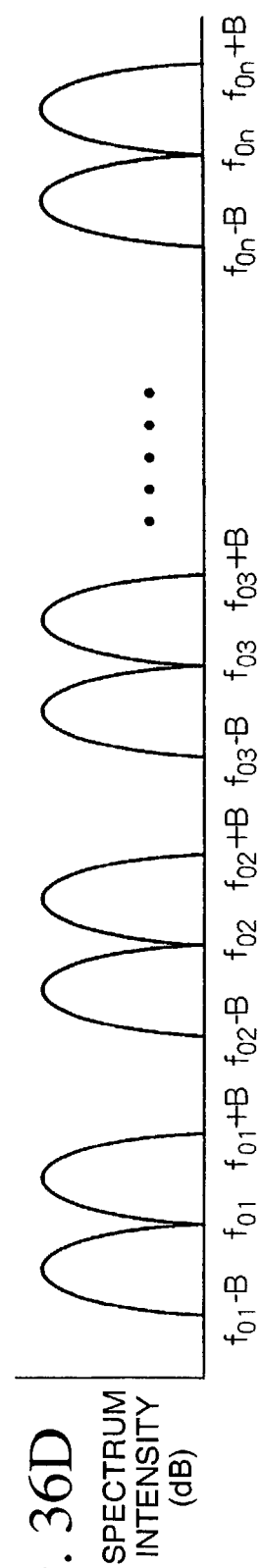
Fig. 36A
Fig. 36B
Fig. 36C
Fig. 36D

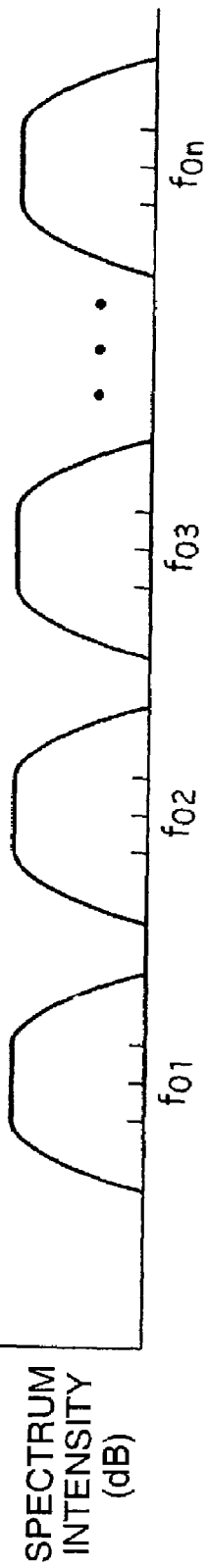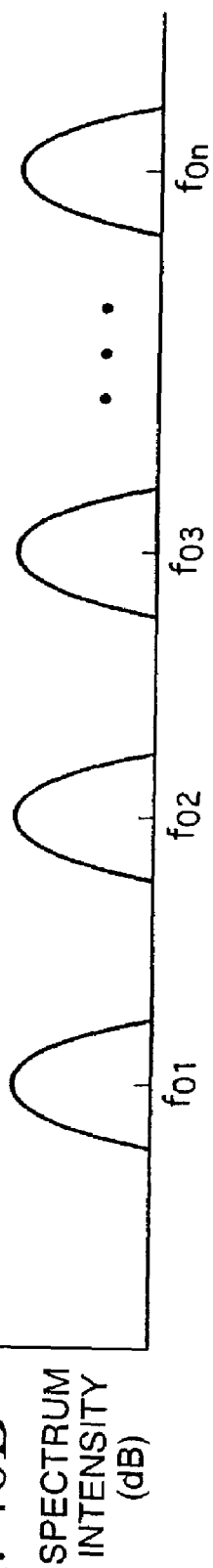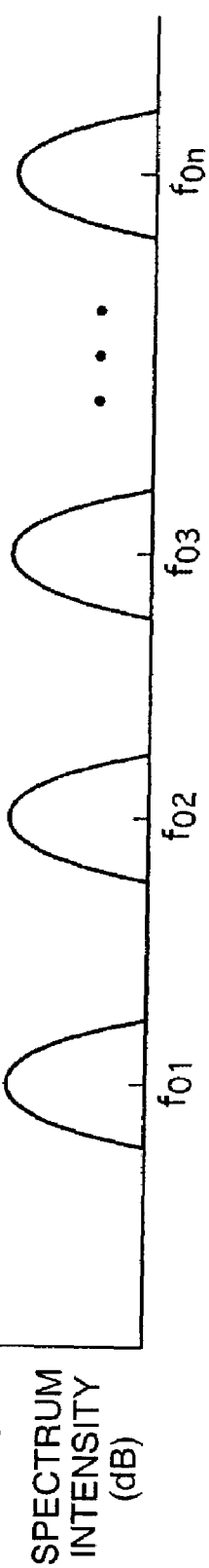

PRIOR ART

Fig. 42A  BINARY NRZ SIGNAL INPUT  1 0 1 0 0 1 0 1 1

Fig. 42B  LOGICALLY INVERTED OUTPUT (NRZ)  0 1 0 1 1 0 1 0 0

Fig. 42C  PRE-CODED SIGNAL (NRZ)

Fig. 42D
ELECTRIC DUOBINARY SIGNAL
(TERNARY SIGNAL)
(ENVELOPE OF THE OPTICAL
ELECTRIC FIELD SIGNAL)

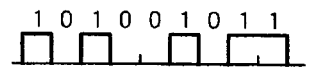

π on level
off level
0 on level
CORRESPONDING OPTICAL SIGNAL STATE

Fig. 42E  DUAL MODE BEAT PULSE OPTICAL SIGNAL

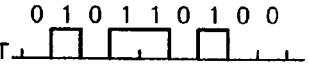

ENVELOPE OF THE OPTICAL ELECTRIC FIELD SIGNAL

Fig. 42F  DUOBINARY OPTICAL SIGNAL

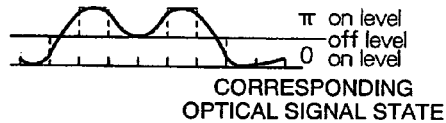

π on level
off level
0 on level
PHASE OF THE OPTICAL ELECTRIC FIELD SIGNAL

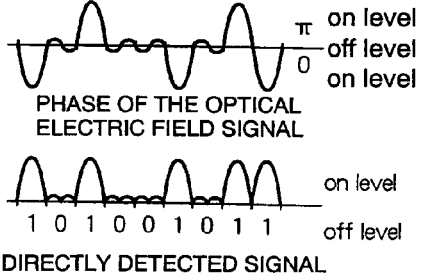

1 0 1 0 0 1 0 1 1 on level
off level

DIRECTLY DETECTED SIGNAL

OPTICAL TRANSMITTER AND OPTICAL TRANSMISSION SYSTEM

BACKGROUND OF THE INVENTION

1. Field of the Invention

The present invention relates to an optical transmitter and an optical transmission system that can minimize the deterioration in the transmission quality due to the chromatic dispersion of an optical transmission medium such as an optical fiber, or due to the interaction between the chromatic dispersion and nonlinear optical effects.

This application is based on patent application No. 2001-199467 filed in Japan, the contents of which are incorporated herein by reference.

2. Background Art

An RZ (return-to-zero) optical intensity modulation format used along with phase modulation has been proposed having the object of minimizing the deterioration in the transmission quality due to the chromatic dispersion of an optical transmission medium such as an optical fiber, or due to the interaction between the chromatic dispersion and nonlinear optical effects.

For example, a citation 1, Y. Miyamoto et al. "Duobinary carrier-suppressed return-to-zero format and its application to 100 GHz-spaced 8×43-Gbit/sec DWDM unrepeatered transmission over 163 km", Tech. Digest of OFC 2001, paper Tu U4, 2001, discloses a technology relating to a duobinary carrier-suppressed return-to-zero (DCS-RZ) format that modulates a dual mode beat signal with an optical duobinary code.

FIG. 41 is a diagram for explaining the conventional structure of an optical transmitter that uses a DCS-RZ format.

In FIG. 41, a direct current bias is applied to the first push-pull type Mach-Zehnder (MZ) optical intensity modulator 91 so as to realize transmission-null when unmodulated, and the first push-pull type Mach-Zehnder optical intensity modulator 91 is complementarily driven by an electrical sine wave signal having one-half the frequency of the line rate generated by a half frequency divider 92.

The intensity and phase of the CW light output from the single longitudinal mode LD 90, which is the light source of the carrier frequency $f_0$, are simultaneously modulated by the MZ optical intensity modulator 91 using the frequency multiplier function and the phase modulation function of an MZ optical intensity modulator, and a dual mode beat signal having a repetition frequency of B is generated. Here, B is the line rate.

At the second MZ optical intensity modulator 93, the dual mode beat signal is modulated with data using an optical duobinary format. The input NRZ (non-return-to-zero) signal is converted to a pre-coded NRZ code by the precoder circuit 97 that is formed by the logic inversion circuit 94, the exclusive OR circuit 95, and the 1 bit delay circuit 96, and the pre-coded NRZ code is differentially output.

The differential pre-coded NRZ code is amplified by the baseband amplifier 98, and then converted to a complementary ternary electrical duobinary code by the low pass filter (LPF 99) having 3 dB bandwidth of B/4. A direct current bias is applied to the second MZ optical modulator 93 so as to realize transmission-null when unmodulated, and the second MZ optical modulator 93 modulates with a complementary ternary electrical duobinary code to generate a DCS-RZ optically modulated code.

FIGS. 42A through 42F and FIGS. 43A and 43B show an example of the operation of the conventional technology.

FIG. 42A shows the binary NRZ signal input generated by the binary NRZ signal generating unit 103. FIG. 42B shows the NRZ data signal output from the logic inversion circuit 94 in the case that a binary NRZ signal is input. FIG. 42C shows the positive-phase signal output from the pre-coding circuit 97 in the case that the output NRZ data signal is input, and the logic thereof is inverted each time a space bit is input as the input NRZ signal. FIG. 42D shows the waveform output from the LPF 99 in the case that the pre-coded signal is input.

As shown by reference numeral 100 in FIG. 41, the logical operation of the LPF 99 is identical to that of a circuit block comprising the 1 bit delay circuit 101 and the analog AND circuit 102. Due to the band limiting function of the LPF 99, the complementary ternary electrical duobinary signal shown by the bold solid line is generated.

FIG. 42E shows the electrical field waveform of the dual mode beat optical signal modulated by the first MZ optical intensity modulator 91 when the CW optical signal from the LD 90, which is the light source, is input. The electrical field waveform forms an optical pulse train where the repetition frequency is equal to the line rate, and whose optical phase is alternate π phase flip for each bit. This dual mode beat optical signal is modulated with the ternary electrical duobinary signal shown in FIG. 42D, and thereby the DCS-RZ code shown in FIG. 42F is generated. The phase is inverted for each mark bit, and thus an RZ intensity modulated optical data signal is obtained.

FIG. 43A shows the optical spectrum of the dual mode beat signal output from the first MZ optical intensity modulator 91. The optical carrier signal component $f_0$ is suppressed, and at the optical frequency fb±(B/2) (where B is the line rate), two longitudinal modes having a frequency spacing of B are generated. The two longitudinal modes are modulated with each of the optical duobinary codes by the second MZ optical modulator 93.

As a result, as shown in FIG. 43B, the optical modulated spectrum of the generated DCS-RZ optical signal is comprised of two optical duobinary signal modulated spectrum arranged at optical frequencies $f_0 \pm B$, the carrier component is completely suppressed, and the optical modulation band is narrowed to 2B. Thereby, the tolerance with respect to chromatic dispersion is double that of the conventional RZ.

The above format suppresses the impairment of the optical duobinary code due to optical nonlinear effects, and thus RZ encoding can be realized while suppressing the broadening of the optical modulation band. Thus, this is suitable as a modulation format in a dense wavelength division multiplexing transmission system.

When considering a wavelength division multiplexing system on a binary RZ intensity modulation code, the optical nonlinear phase shift due to the cross-phase modulation from other channels is strongly depending on the signal pattern, and the interplay between chromatic dispersion and cross-phase modulation (XPM) causes the system performance to deteriorate. In order to mitigate the XPM-induced impairment, T. Miyano et al. propose an RZ-intensity-modulated phase-encoded signal in citation 2, T. Miyano, M. Fukutoku, and K. Hattori, "Suppression of degradation induced by SPM/XPG+GVM transmission using a bit-synchronous intensity modulated DPSK signal", Digest of OECC2000, Makuhari, paper 14D3-3, pp. 580–581, 2000.

As described above, in a conventional optical transmitter and optical transmission system using an RZ optical intensity modulated format used with phase modulation, generally, optical modulators are necessary for each intensity modulation, phase encoding, and pulse modulation, and these optical modulators are connected in a multi-stage cascade. Thereby, the insertion loss in the modulating unit increases, and the optical output power of the modulating unit decreases. Thus, there are the problems that the optical signal shot noise increases and the SN ratio of the output of the optical transmitting unit degrades.

In addition, in the case of high speed transmission, the relative phase between an electrical data signal and a clock signal for each of the modulators connected in multi-stage must be precisely controlled, and in order to compensate the drift of the phase due to temperature characteristics and the like, a stable phase control must be carried out. Thereby, the problem of the control circuits and the like becoming complicated is made tangible.

Furthermore, in the conventional wavelength division multiplexing system, since two or more optical modulators must be installed for each channel, the number of parts increases, in particular in the case that the number of channel increases in the WDM system. This is a drawback because the cost of the optical transmitter and the optical transmission system using them increases.

At the same time, in the conventional RZ optical transmitter and optical transmission system using a DCS-RZ format, the optical duobinary encoding unit, which carries out the intensity data modulation and phase modulation in data encoding process requires a baseband analog processing circuit (LPF 99 shown in FIG. 41) that generates a ternary opto-electrical signal converted signal depending on the line rate.

As the line rate increases, however, it is difficult to realize the high-speed baseband analog processing in the unit. In order to suppress waveform distortion of the ternary electrical duobinary signal, the waveform distortion due to reflected waves in the rejection band of the LPF 99 must be suppressed. At the same time, in the high frequency band, realizing ideal electrical characteristics is difficult, and in particular, terminating the reflected wave in the rejection band of the filter is difficult. In addition, when realizing the ideal roll-off characteristics of the electrical filter, frequency dependent loss and frequency dispersion of the electrical transmission line and the filters occurs as the line rate increases, and thereby the waveform distortion occurs. Thus, there is the problem that compensation of the waveform becomes difficult.

In addition, the conventional PSK signal that has been modulated using an RZ format can suppress the cross-phase modulation in a wavelength division multiplexing system. However, when considering an increasingly high density of the wavelength division multiplexing system equal to or above 0.4 bits/s/Hz, the optical modulation band spreads four times the line rate, and thus the cross-talk penalty increases. In addition, when considering the high-speed transmission using the conventional technology, it is necessary to increase the operating speed of the baseband signal input into the modulator.

However, as the line rate increases, generally there is a tendency for the breakdown voltage of the electronic device to decrease, and thus this makes difficult to realize high output operation in a driver for driving a modulator or the like becomes difficult. Furthermore, realization of high-speed operation in the pre-coding circuit as well becomes difficult, and it is necessary to redesign and remanufacture the circuit each time the line rate is increased.

It is an object of the present invention to provide an optical transmitter and an optical transmission system wherein decreasing the loss and increasing the speed of the optical modulator is facilitated by using the RZ optical intensity modulation format along with phase modulation. In addition, the invention measures the increasing speed of the analog signal processing by performing a function in the optical carrier frequency domain, which has been carried out by a conventional baseband analog processing circuit. Furthermore, the invention facilitates realization of an amplifier circuit such as a driver circuit by encoding all the electric signals with a simple binary NRZ format.

Furthermore, it is an object of the present invention to provide an optical transmitter and an optical transmission system that use the RZ optical intensity modulation format along with phase modulation, and that make possible simultaneous PSK-ASK conversion of the wavelength division multiplexed signals by using a periodic optical conversion filter, and make possible the elimination of the synchronization function in the active high-speed signal processing by using a passive optical filter.

SUMMARY OF THE INVENTION

This summary of the invention does not necessarily describe all necessary features so that the invention may also be a sub-combination of these described features.

The optical transmitter of the present invention comprises: a light source; a pre-coding device that receives an NRZ signal; an optical phase modulating device that carries out optical phase modulation and that is driven by either a pre-coded NRZ signal or a differential pre-coded NRZ signal generated by the pre-coding device; and an output terminal, wherein an RZ optical signal in which a plurality of duobinary optical signal components are included in the optical RZ signal spectrum with carrier suppression is output from the output terminal.

In addition, the optical transmitter of the present invention comprises: a light source which is a single mode longitudinal light source; a pre-coding device that generates a differential pre-coded NRZ signal whose logic inverts each time a mark bit is input as an NRZ signal; an optical phase modulating device that modulates the optical phase of a single longitudinal mode optical signal from the light source using the differential pre-coded NRZ signal generated by the pre-coding device; and an optical filter device that converts an optical-phase modulated signal generated by the optical phase modulating device to an RZ optical intensity modulated signal.

Furthermore, the optical transmitter of the present invention further comprises: a dual mode beat pulse light source that generates two longitudinal mode signals which synchronizes with a data signal and which have the mode spacing between the two longitudinal modes that is an integral multiple of the data line rate, and which is mode-locked with each other; a pre-coding device that carries out code conversion such that an intensity modulated signal output from the optical transmitter has a logic identical to the input NRZ signal; and an optical phase modulating device in which an optical pulse train generated by the dual mode beat pulse light source has undergone optical phase modulation by a pre-coded NRZ signal generated by the pre-coding device.

The optical transmission system of the present invention comprises: an optical transmitter that comprises: a light source; a pre-coding device that receives an NRZ signal; an optical phase modulating device that carries out optical phase modulation and that is driven by either a pre-coded NRZ signal or a differential pre-coded NRZ signal generated by the pre-coding device; and an output terminal, and that outputs an RZ optical signal having the suppressed carrier component from the output terminal as an optical transmission signal; an optical phase-modulation/amplitude modulation converting device that is provided on one of either the optical transmitter or an optical receiver; wherein the optical receiver demodulates and detects the transmitted RZ optical signal as an optical intensity modulated signal, and converts the optical intensity modulated signal to an electrical signal.

In addition, the optical transmission system of the present invention comprises: an optical transmitter that comprises: a pre-coding device that generates a differential pre-coded NRZ signal whose logic inverts each time a mark bit is input as the NRZ signal; an optical phase modulating device that performs optical phase modulation on a signal from either a single longitudinal mode light source or a dual mode beat pulse light source using the differential pre-coded NRZ signal generated by the pre-coding device; and an optical filter device that converts an optical phase modulated signal generated by the optical phase modulating device into an RZ optical intensity modulated signal; an optical transmission medium that transmits the RZ optical intensity modulated signal output by the optical transmitter; and an optical receiver that receives the RZ optical intensity modulated signal output by the optical transmitter via the optical transmission medium, and directly detects the RZ optical intensity modulated signal to convert the RZ optical intensity modulated signal into a baseband electrical signal.

The optical transmission system of the present invention comprises: an optical transmitter that is provided with: a pre-coding device that carries out code conversion of the input NRZ signal such that the optical intensity modulated signal output from the optical transmitter has a logic identical to the input NRZ signal; and an optical phase modulating device that performs optical phase modulation on a signal either from a single longitudinal-mode light source or a dual mode beat pulse light source using the differential pre-coded NRZ signal generated by the pre-coding device; an optical transmission medium that transmits a phase modulated data signal with sinusoidal RZ optical intensity modulation that has been output by the optical transmitter; and an optical receiver that receives the RZ optical modulated signal output by the optical transmitter via the optical transmission medium, and after passing through an optical filter device that converts the RZ optical modulated phase-encoded signal to an optical amplitude-encoded signal, directly detects the optical intensity modulated signal to convert to a baseband electrical signal.

In the structure described above, the baseband input data signal is pre-coded in advance by the pre-coding device, phase modulation is carried out by the phase modulating device using the pre-coded signal, and the resultant phase encoded optical signal is converted into an RZ intensity modulated signal that has undergone the phase modulation by the optical filter device. The phase modulating device, for example, generates an encoded DPSK phase modulation signal using differential phase shift keying (DPSK), and converts the phase modulated signal into an RZ intensity signal by the optical filter device disposed downstream of the DPSK optical modulation signal device.

If an optical periodic filter is used as the optical filter device described above, conversion of modulation format of the wavelength division multiplexed signals can be simultaneously conducted due to the broadband characteristic of the optical filter, and thus an optical filter device for each channel becomes unnecessary. Thereby, the number of parts can be drastically reduced in the high capacity wavelength division multiplexing system having a large number of channels, and thereby the cost of the optical transmitter can be reduced. In addition, by using a passive optical filter that does not require high-speed signals, precise control of the signal phase between modulators becomes unnecessary.

In particular, by using a Mach-Zehnder optical intensity modulator as the phase modulating device that carries out differential phase shift keying on the single longitudinal mode optical signal using a pre-coded NRZ signal, it is possible to use only binary NRZ signals as the electric signals. Therefore, the baseband signal processing can be easily realized, and the number of optical modulators can be reduced. In addition, the analog processing function conventionally carried out in the baseband can be realized in an optical carrier frequency band using a passive optical filter, and thereby, an ideal wideband analog processing can be realized, and improvement of the reflective characteristics in the filter processing and the broadband transmission characteristics becomes possible for generation of the ultra-high-speed signal.

In addition, as another embodiment of the optical transmission system of the present invention, an optical filter that carries out phase modulation/RZ intensity modulation conversion is disposed on the receiver side of the optical transmission system, phase encoded signal is used as a transmission code, and an RZ pulse whose intensity has been phase encoded is used. Thereby, transmission impairments due to nonlinear cross talk such as cross-phase modulation in wavelength division multiplexing transmission system can be suppressed, and at the same time the optical modulation band can be reduced in comparison to conventional technology, and attaining higher density wavelength division multiplexing system becomes possible.

As another embodiment of the optical transmission system of the present invention, the phase modulating device can be structured by n phase modulators connected in series. Thereby, by using a driver for driving a modulator and a pre-coding circuit having a baseband signal processing speed of B', it is possible to generate a phase modulated optical data signal that has undergone the n time division multiplexed RZ intensity modulation having a line rate of B=n×B' or an RZ intensity optical data signal that has undergone phase modulation.

All of these multiplexed signals are bandwidth-reduced RZ signals, and can form a high-density wavelength division multiplexing system using a simple structure in comparison to conventional technology.

In addition, as yet another embodiment of the transmitter and the pre-coding device in the optical transmission system according to the present invention, by using a structure comprising n pre-coding circuits having a signal processing speed of B', a delay device that delays the n output signals of the pre-coding circuit, and an exclusive OR circuit that performs exclusive OR on the n delayed output signals, it is possible to generate n time division multiplexed pre-coded signals having a line rate of B=n×B', and an increase in the line rate of a transmission system can be easily realized.

According to the present invention explained above, in order to realize a high speed optical transmitter and optical transmission system using the RZ optical intensity modulation format used with phase modulation, the optical transmitter is provided with a pre-coding device that generates a differential pre-coded NRZ signal whose logic inverts each time a mark bit is input as an NRZ signal; an optical phase modulation device that carries out optical phase modulation on a single longitudinal mode optical signal generated by a light source using the differential pre-coded NRZ signal generated by the pre-coding device; and an optical filter device that converts the phase modulated optical signal generated by the optical phase modulating device to an RZ optical intensity modulated signal. Thereby, the loss of the optical modulator is decreased and enhancing the high-speed operation of the optical modulator becomes easy.

In addition, by carrying out an analog processing function in the optical carrier frequency domain that was conventionally carried out in baseband frequency domain, the speed of the analog signal conversion processing can be increased, and furthermore, by making all electrical signals binary NRZ format, the amplifier circuits such as drive circuits can be easily realized.

At the same time, by employing a periodic optical filter, simultaneous PSK-ASK conversion of the wavelength division multiplexed signals becomes possible, and by using a passive optical filter, the synchronization between several optical modulators in the active high-speed signal processing can be omitted, and it becomes possible to provide an optical transmitter and optical transmission system that uses the RZ optical intensity modulation format along with phase modulation.

In addition, according to the present invention, simultaneous conversion of the phase modulated wavelength division multiplexed signals to intensity modulated WDM signals becomes possible by the parallel processing of the optical filter. Furthermore, by phase modulating a dual mode beat pulse signal, an RZ phase modulated code or an intensity modulated code having a constant duty cycle can be used as the transmission code. Therefore, narrowing of the optical modulation bandwidth becomes possible, and the efficiency for frequency utilization of the wavelength division multiplexing system can be improved. At the same time, the tolerance of transmission quality degradation due to nonlinear effects can be improved.

In addition, by narrowing the optical modulation bandwidth on the receiver side, the chromatic dispersion tolerance can be improved. Furthermore, an increase in the system line rate can be realized without enhancing the operation speed of the pre-coding circuit, the modulator, and the driver for the modulator.

BRIEF DESCRIPTION OF THE DRAWINGS

FIGS. 4A through 4F are diagrams for explaining in detail the operation according to the present embodiment shown in FIG. 1 and FIG. 2.

FIGS. 11A through 11D are diagrams showing the operation of the experimental system shown in FIG. 10.

FIG. 12 is a diagram for explaining another embodiment of the optical transmission system according to the present invention.

FIGS. 15A through 15F are diagrams for explaining the operation of the optical transmitter and the optical transmission system shown in FIGS. 13 and 14 using the waveform of each part.

FIGS. 18A through 18G are diagrams for explaining the operation of the optical transmitter and the optical transmission system shown in FIG. 17 using the waveform of each part.

FIGS. 22A through 22C are diagrams for explaining an example of the structure of the optical receiver according to the optical transmission system in FIG. 21.

FIG. 29 is a diagram for explaining the internal structure of the pre-coding unit and the phase modulating unit used in the present invention.

FIGS. 30A through 30J are diagrams for explaining the operation of the pre-coding unit and the phase modulating unit shown in FIG. 29.

FIGS. 36A to 36D are diagrams for explaining the operation of the embodiment according to the present invention shown in FIG. 34 and FIG. 35.

FIGS. 40A through 40C are diagrams for explaining the operation of the optical transmission system shown in FIG. 37 using the optical signal spectra.

FIGS. 42A through 42F are diagrams for explaining the operation of the conventional optical transmitter shown in FIG. 41.

DETAILED DESCRIPTION OF THE PREFERRED EMBODIMENTS

The following embodiments do not restrict the interpretation of the claims relating to the present invention, and the combination of all the features explained in the embodiments is not always indispensable means of solving the problem.

Figure 1:
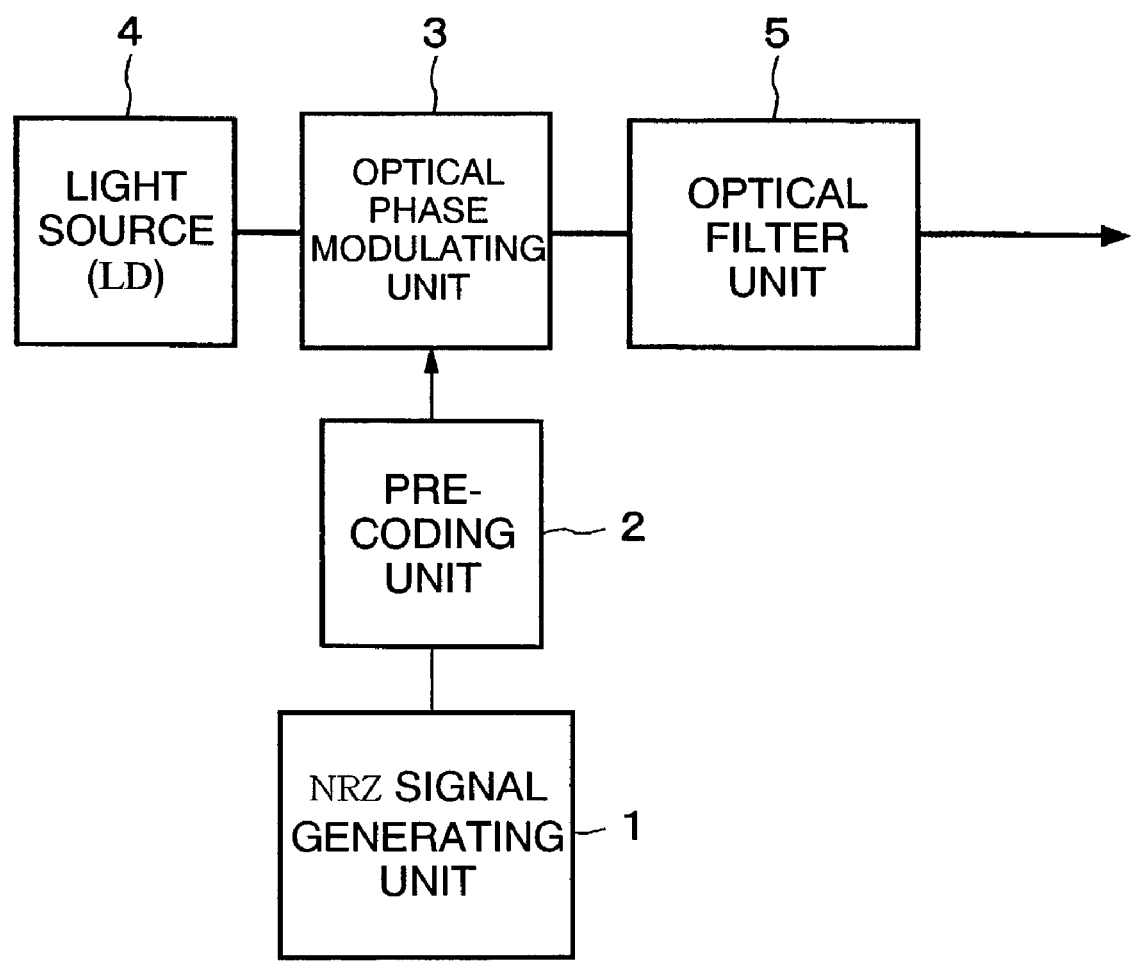
FIG. 1 is a block diagram showing an embodiment of the optical transmitter according to the present invention.

FIG. 1 is a block diagram showing an embodiment of the optical transmitter according to the present invention. In FIG. 1, the binary NRZ electrical signal output from the NRZ signal generating unit 1 is input into the pre-coding unit 2. The pre-coding unit 2 carries out signal processing so that the optical signal output from the optical transmitter matches the input NRZ signal. The differential pre-coded NRZ signal generated by the pre-coding unit 2 is amplified as necessary, and input into the optical phase modulating unit 3.

The single longitudinal mode CW optical signal emitted by the light source 4 (LD: a laser diode) is appropriately phase modulated by the optical phase modulating unit 3, and subsequently input into the optical filter unit 5 that converts the optical phase modulated signal into an RZ intensity modulated signal. The output of the optical filter unit 5 is optically amplified as necessary, and is output as the output signal of the optical transmitter according to the present invention at a predetermined optical power.

Figure 2:
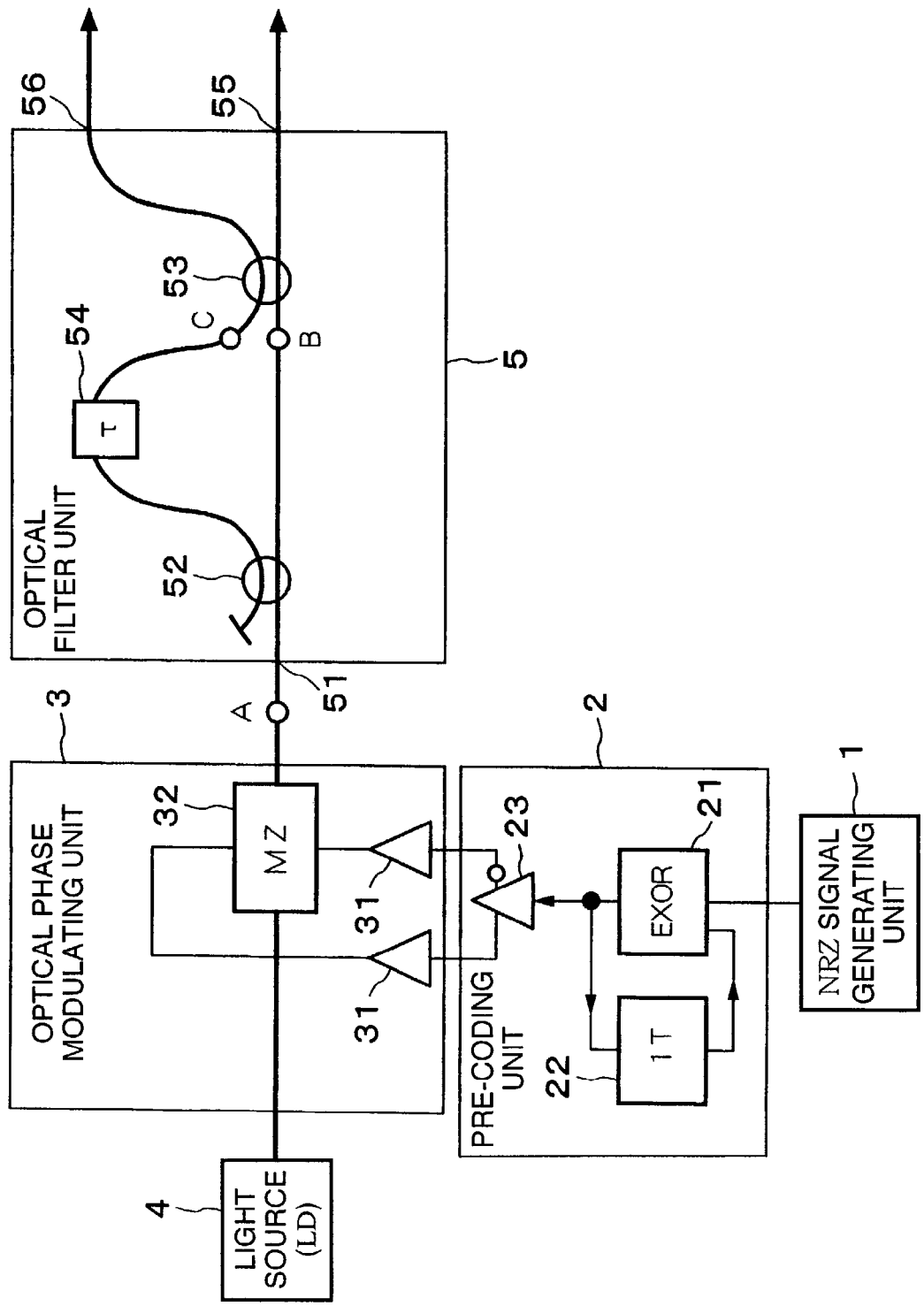
FIG. 2 is a diagram showing the internal structure of each block of the optical transmitter shown in FIG. 1.

FIG. 2 shows the detailed structure of each of the blocks of the optical transmitter shown in FIG. 1. In FIG. 2, blocks having the same reference numerals as the blocks shown in FIG. 1 are the same as those in FIG. 1.

Figure 41:
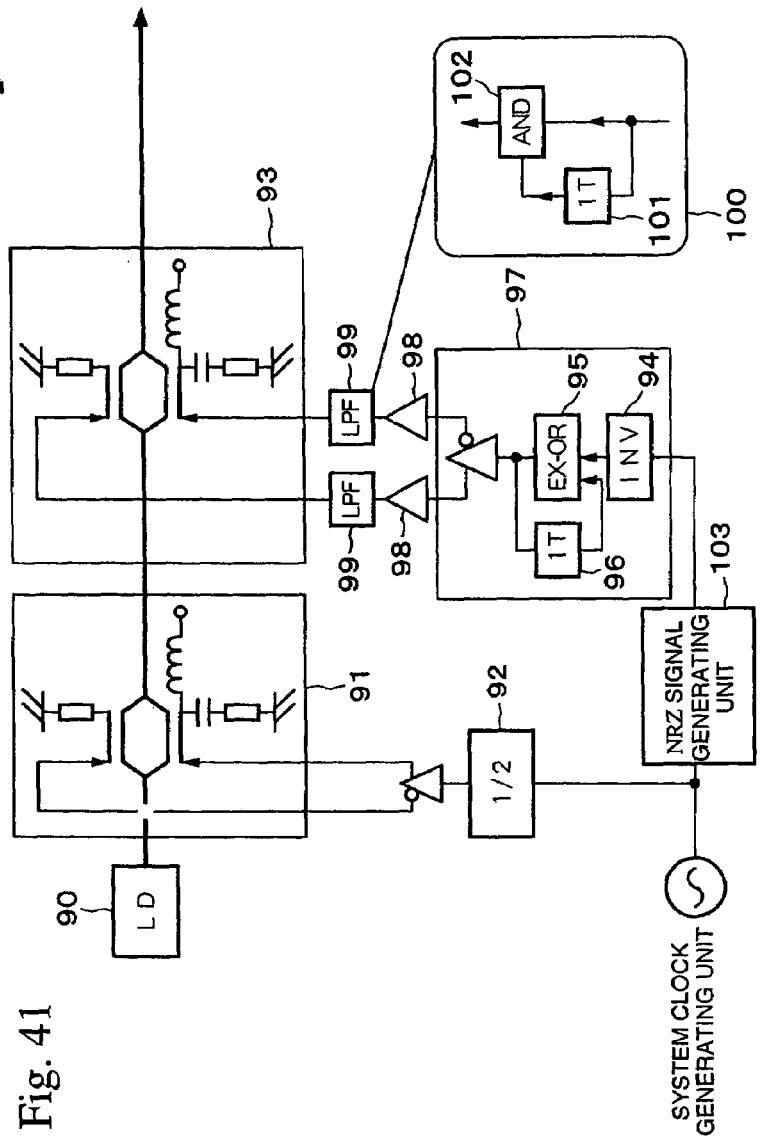
FIG. 41 is a diagram for explaining the structure of a conventional optical transmitter.
Figure 43A:
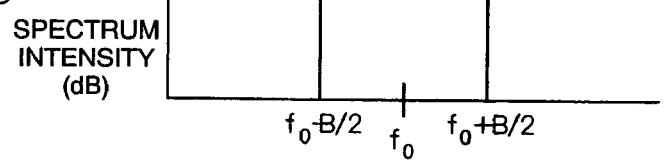
FIGS. 43A and 43B are diagrams for explaining optically modulated spectrum of the conventional optical transmitter shown in FIG. 41
Figure 43B:
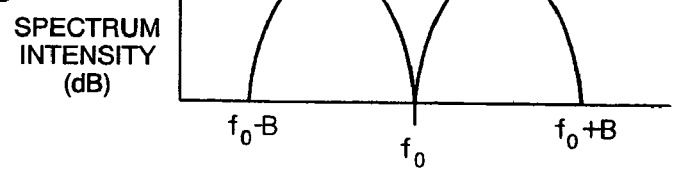

The NRZ electrical signal output from the NRZ signal generating unit 1 is input into the pre-coding unit 2. The pre-coding unit 2 is formed by an exclusive OR circuit (EXOR 21), a 1-bit delay circuit 22, and a differential output circuit 23. The pre-coding unit 2 differs from the conventional pre-coding unit 97 (FIG. 41) in that there is not a logic inversion circuit 94 for inverting the logic of the input data signal.

The pre-coding unit 2 shown in FIG. 2 carries out differential encoding, thereby a differentially pre-coded encoded NRZ signal whose logic is inverted each time a mark bit is input as the input NRZ signal is differentially output. The differentially encoded NRZ signal is input into the optical phase modulating unit 3. The optical phase modulating unit 3 amplifies the signal as necessary by using the baseband amplifier 31, and supplies it to the MZ optical intensity modulator 32.

Figure 3:
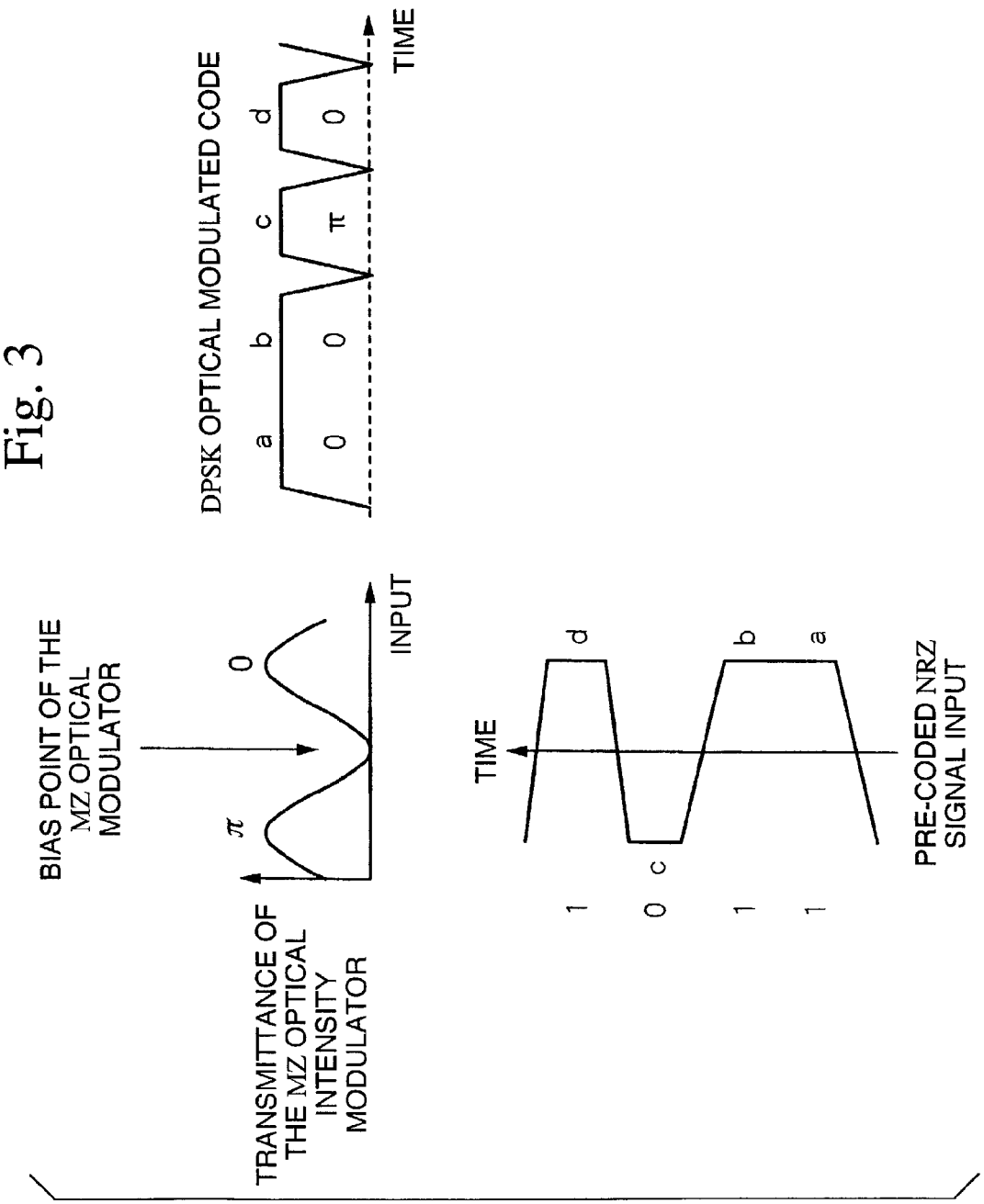
FIG. 3 is a diagram for explaining the operation of the MZ optical modulator shown in FIG. 2.

FIG. 3 is a diagram for explaining the operation of the MZ optical intensity modulator 32 shown in FIG. 2. As shown in FIG. 3, the differentially encoded NRZ signal generated by the pre-coding unit 2 is amplified to equal amplitudes, preferably amplified up to half-wave voltage of the MZ optical intensity modulator 32. Here, the direct current bias is applied to the MZ optical intensity modulator 32 so as to realize transmission-null when unmodulated.

Returning to FIG. 2, following the operating conditions described above, the MZ optical intensity modulator 32 generates the DPSK optical signal that is encoded using a DPSK (differential phase shift keying) format. The DPSK optical signal is input into the Mach-Zehnder interferometer (MZI) type optical filter that forms the optical filter unit 5 and whose rejection band center frequency matches the optical carrier frequency of the DPSK optical signal. The MZI optical filter is formed by 3 dB directional couplers (52 and 53) disposed at the input port 51 and the cross output port 56, and an optical delay element 54 having a delay of τ(s). In the case that an optical signal input into the through port 5 is Ein (i.e., input optical signal electric field), the output optical electric field of the MZI optical filter is given by the following equation:

$$E(t)=(Ein/2)\cdot exp\{-j(\omega\tau+\phi)/2\}\cdot sin\{(\omega\tau+\phi)/2\} \qquad \text{(Equation 1)}$$

where ω is the optical frequency, τ is the amount of delay of the optical delay element 54, and φ is the relative phase between the two optical signals propagated through the waveguide in the Mach-Zehnder optical filter.

FIGS. 4A through 4F are diagrams for explaining in detail the operation of the embodiment of the present invention. Here, the case is shown in which the delay amount τ of the delay element is equal to $T_0/2$ ($T_0=1/B$, where B is the line rate).

FIG. 4A shows the input NRZ baseband electrical signal (binary), and FIG. 4B shows the input pre-coded NRZ baseband electrical signal output from the pre-coding unit 2 in the case that the signal shown in FIG. 4A is input thereto. FIG. 4C shows the generated DPSK optical modulated signal that has been modulated by the MZ optical intensity modulator 32 with the pre-coded NRZ signal. FIG. 4D shows the DPSK optical signal at point C (FIG. 2) in the MZI optical filter that has been delayed by τ by the optical delay element 54. FIG. 4E shows the DPSK optical signal (the output signal from the Mach-Zehnder interferometer type optical filter) output from the MZI optical filter. The dashed line is the logical electrical field envelope, and the solid line is the DPSK optical signal for the case that optical phase modulation has been carried out with a bandwidth limit applied to the pre-coded NRZ electrical signal. Finally, FIG. 4F shows the directly detected waveform.

Moreover, FIG. 4E shows the RZ optical signal output from the through port 56 of the 3 dB directional coupler 53 of the MZI optical filter 51 according to the above Equation 1. The dashed line is the logical electrical field envelope, and the solid line is the electrical field envelope in the case that optical phase modulation has been carried out with a bandwidth limit applied to the pre-coded NRZ electrical signal.

As can be understood from FIGS. 4E and 4F, the MZI optical filter outputs a signal in accordance with a phase change rule that is identical to that of the DCS-RZ signal, whose phase is inverted with each mark bit. In the optical filter unit 5 shown in FIG. 2, the optically modulated signal of the rejection band is separated by the 3 dB directional coupler 53 and output from the cross port 56. Thereby, by terminating the cross port 56 by means of angled polishing or the like, the reflected wave in the optical filter rejection band does not return to either the through port 55 and the input port 51, and thus the reflection can be sufficiently reduced.

Figure 5A:
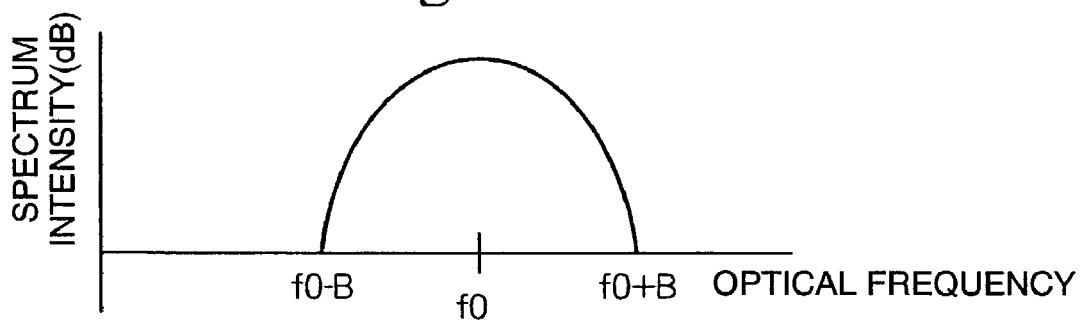
FIGS. 5A through 5C are diagrams for explaining the optically modulated spectrum shown in FIG. 2 ($\tau=1/B$).
Figure 5B:
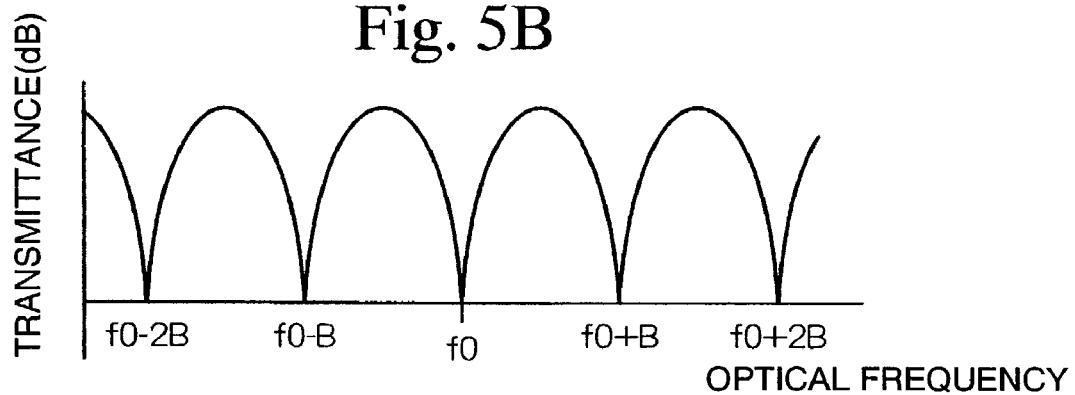
Figure 5C:
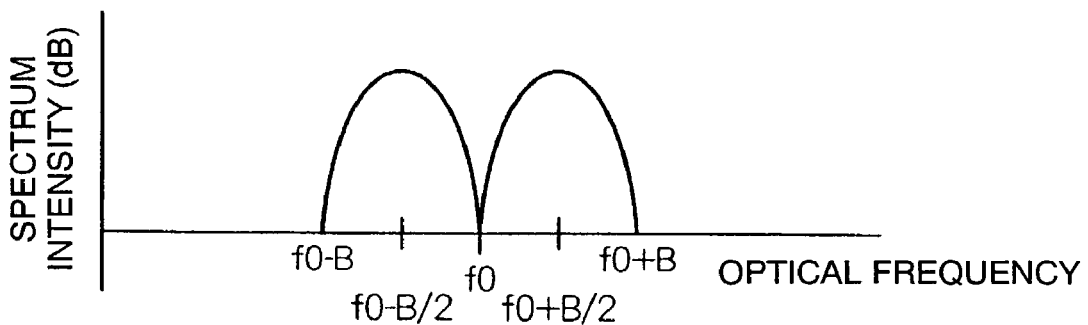
Figure 6A:
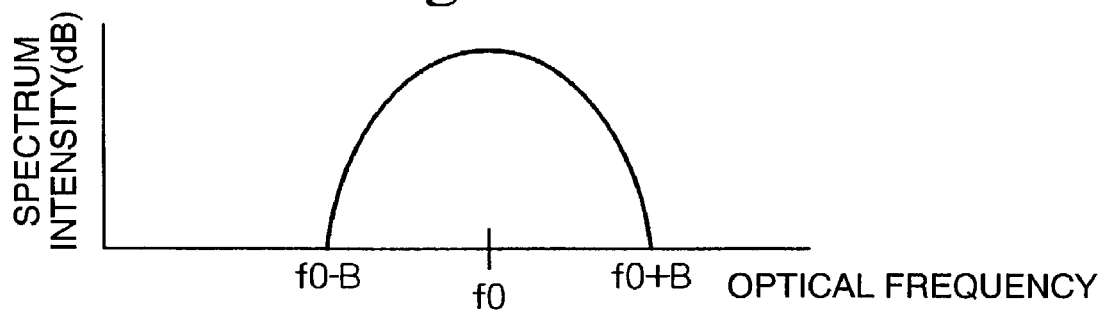
FIGS. 6A through 6C are diagrams for explaining the optically modulated spectrum shown in FIG. 2 ($\tau=/(2B)$).
Figure 6B:
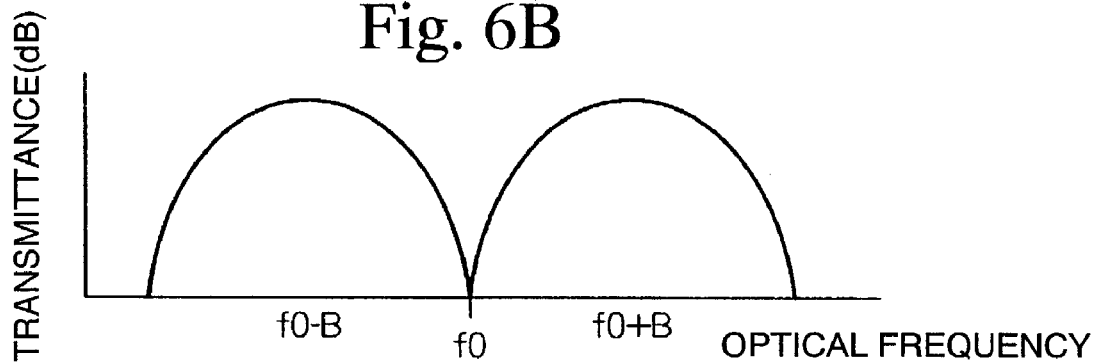
Figure 6C:
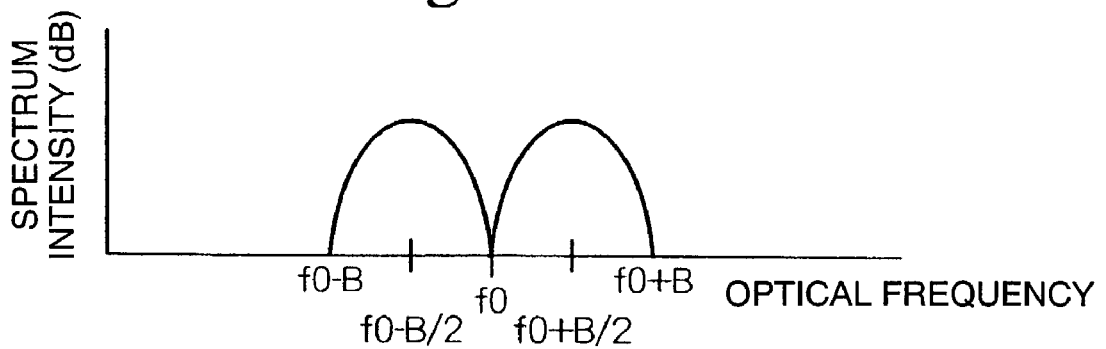

FIGS. 5A through 5C and FIGS. 6A through 6C show the optically modulated spectra at the input port and output port of the MZI optical filter in FIG. 2. FIGS. 5A through 5C show the case where the delay amount $\tau = T_0$, and FIGS. 6A through 6C show the case where $\tau = T_0/2$.

FIGS. 5A and 6A show the DPSK optically modulated spectra at the point A shown in FIG. 2. The ordinate is the scale for the spectral intensity, and the abscissa is the scale for the optical frequency. FIGS. 5B and 6B show the frequency response characteristics of the MZI optical filter 51 shown in FIG. 2. The ordinate is the scale for the transmittance (dB), and the abscissa is the scale for the optical frequency.

FIGS. 5A through 5C show a sine wave frequency response of period B (where B is the line rate). FIGS. 6A through 6C show a sine wave frequency response of period 2B. FIGS. 5C and 6C show the converted RZ signal optical modulated spectra. The ordinate is the scale for the spectral intensity and the abscissa is the scale for the optical frequency. Here, the carrier frequency component is entirely suppressed, and the modulation spectrum has the modulation bandwidth of 2B.

As explained above, the RZ optical signal output from the optical filter unit 5 has the same coding rule as that used in a DCS-RZ format, as can be understood from the optical phase change rule of the waveform response shown in FIGS. 4A through 4F and the optically modulated spectra shown in FIGS. 5A through 5C and FIGS. 6A through 6C.

Figure 7:
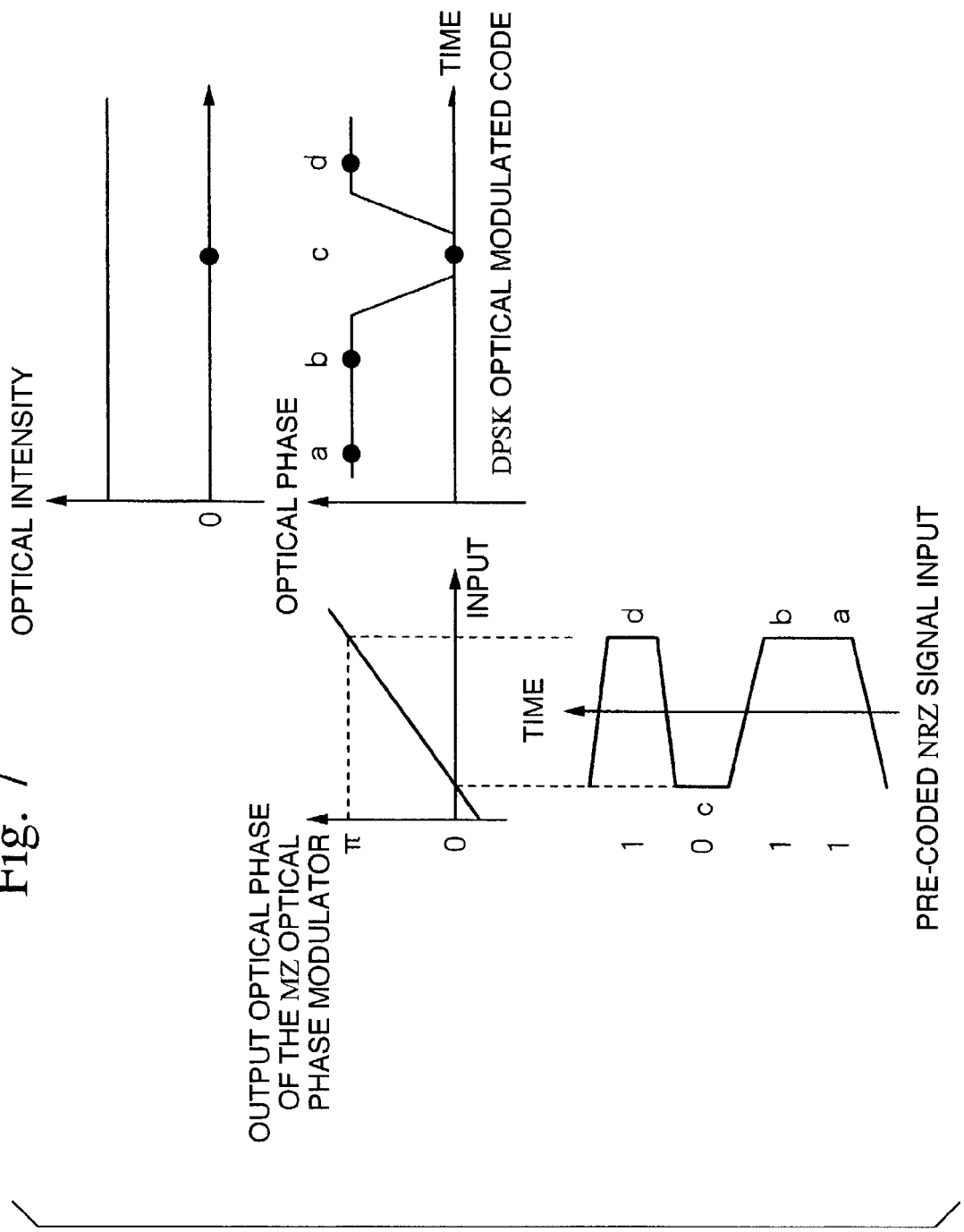
FIG. 7 is a diagram for explaining the operation in the case that the optical phase modulating unit shown in FIG. 2 is realized by another structure.

FIG. 7 is a diagram for explaining the operation in the case that the optical phase modulating unit 3 shown in FIG. 2 is realized by another structure. The difference between the example shown in FIG. 7 and the embodiment shown in FIG. 2 is that the optical pulse is chirped so that the optical phase thereof changes over time and that optical intensity thereof does not change.

In FIG. 7, the optical phase responses for each of the points (a, b, c, d) is output corresponding to each of the points (a, b, c, d) in the baseband pre-coded NRZ electrical signal input. That is, FIG. 7 shows response characteristics in which the optical phase changes linearly. These types of characteristics can be easily realized by an optical phase modulator which modulates the refractive index of the straight optical waveguide formed, for example, on LiNbO$_3$ by means of an electro-optical effect.

Figure 8:
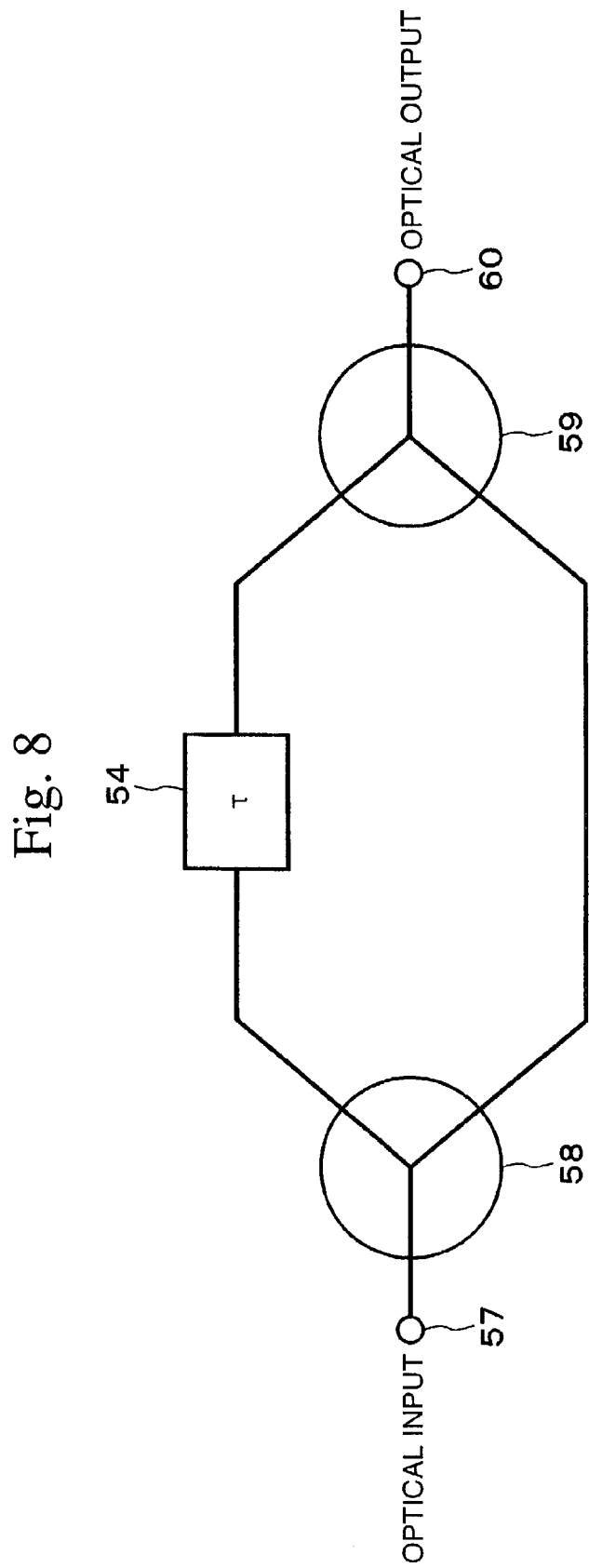
FIG. 8 is a diagram showing another embodiment of the optical filter unit shown in FIG. 2.

FIG. 8 is a diagram for showing another embodiment of the optical filter unit 5 shown in FIG. 2. The embodiment shown in FIG. 8 differs from the embodiment shown in FIG. 2 in that instead of the 3 dB directional couplers 52 and 53, the Y-branching waveguides 58 and 59 are used in the optical branching unit of the Mach-Zehnder interferometer type filter that forms the optical filter unit 5.

In FIG. 8, the DPSK optical signal input from the optical input port 57 is branched into two paths by the Y-branching waveguide 58 such that the power is 50% in each. One optical signal passes through the optical delay element 54 having a delay amount T, is multiplexed with another optical signal by the Y-branching waveguide 59, and the multiplexed optical signal is output from the output port 60.

Figure 9:
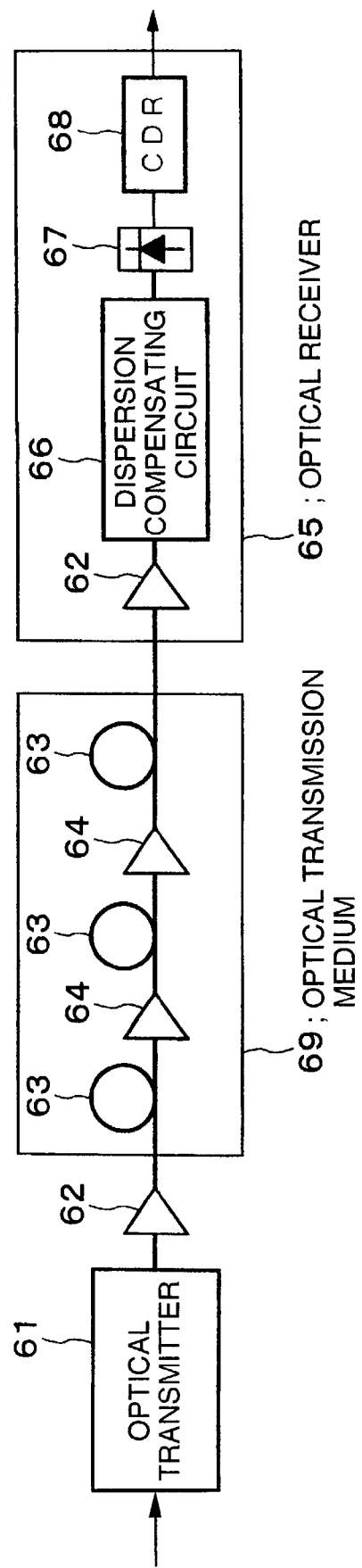
FIG. 9 is a diagram showing an embodiment of the optical transmission system according to the present invention.

Below, the optical transmission system using the optical transmitter described above will be explained. FIG. 9 is a diagram showing an embodiment of the optical transmission system according to the present invention. Because the optical transmitter 61 used is identical to the embodiment described above, the explanation will be omitted in order to avoid repetition.

In FIG. 9, the binary NRZ input electrical signal is converted to an RZ signal by the optical transmitter 61, is optically amplified by the optical amplifier 62 as necessary to a predetermined signal power, and is subsequently supplied to the optical transmission medium 69. The optical transmission medium 69 can be formed from only an optical fiber transmission line 63. Alternatively, the optical transmission medium 69 can be formed by optical transmission lines 63 and optical amplifier repeater devices 64 that directly amplify and repeat the optical signals from the optical transmission lines 63.

The output signal of the optical transmission medium 69 is input into the optical receiver 65. In the optical receiver 65, the input optical signal is pre-amplified by the optical amplifier 62, and then as necessary, input into the dispersion compensating circuit 66 that compensates the chromatic dispersion and the polarization mode dispersion. Thereby, waveform distortion due to the dispersion of the optical transmission medium 69 (chromatic dispersion or polarization mode dispersion) is compensated. The output of the dispersion compensating circuit 66 is directly detected by the optical signal direct detecting element 67, and converted to a baseband electrical signal. Depending on necessity, the baseband electrical signal is equalized and amplified, and then timing extraction, and identification are carried out by the clock/data recovery (CDR) circuit 68, thereby the transmitted data is regenerated.

Figure 10:
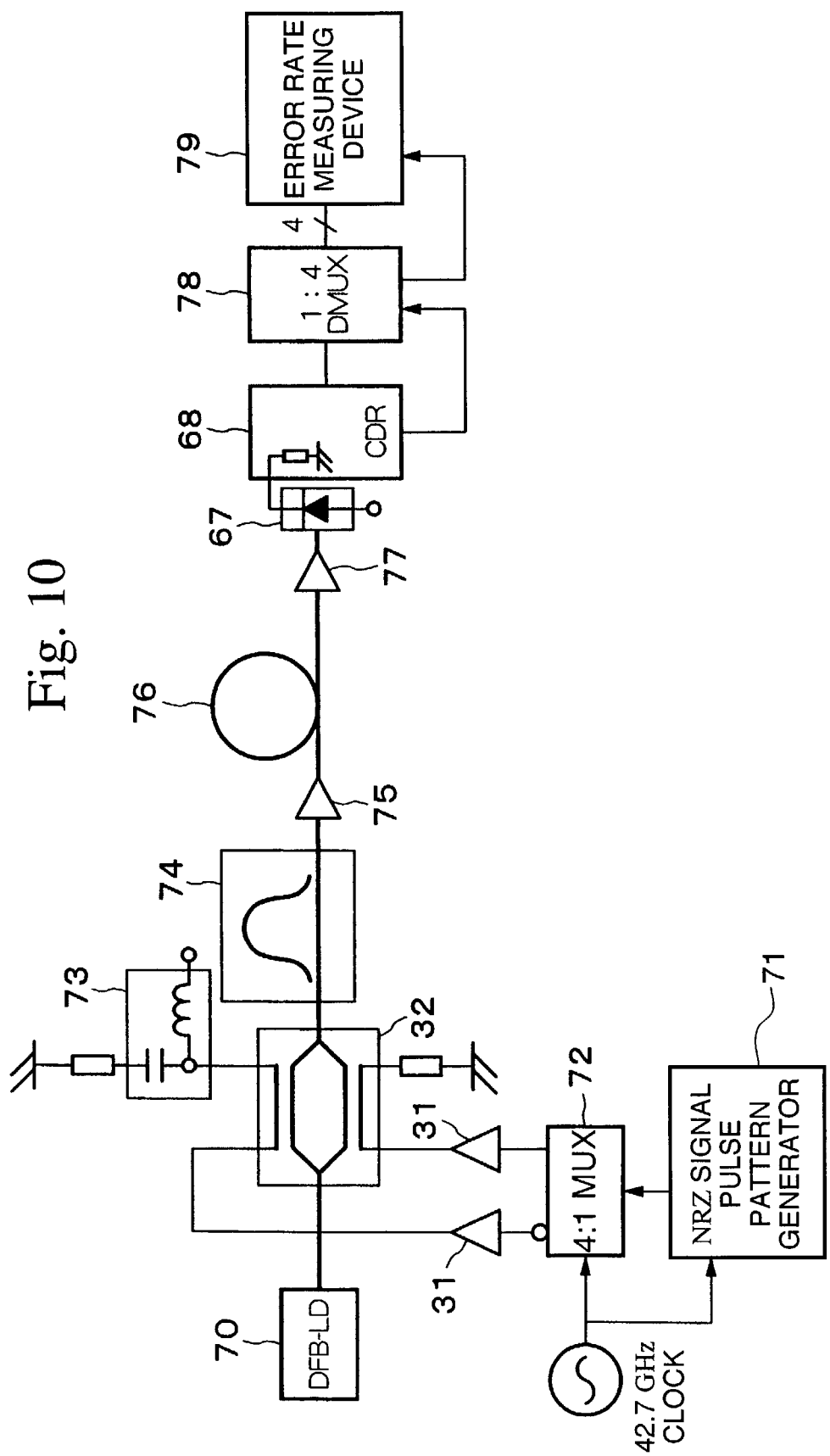
FIG. 10 is a diagram for explaining the experimental system for the optical transmission system according to the present invention.

FIG. 10 is a diagram for explaining the experimental system for the optical transmission system according to the present invention shown in FIG. 9.

In FIG. 10, a single mode longitudinal optical signal generated by a light source (DFB-LD) 70 in the 1.55 μm band was input into a push-pull MZ LiNbO$_3$ modulator 32. The experimental signal used in the experimental system shown here was a 42.7 Gbit/s M sequence pseudorandom (PN) signal (with the pattern length of $2^7-1$). Here, the pre-coding unit 2 converted the PN signal to an identical PN signal, and thus the pre-coding unit 2 is not shown in FIG. 10.

In FIG. 10, the 4-channel M sequence PN $2^7-1$ stage NRZ optical signals modulated at 10.66 Gbit/s (below, written as "10.7 Gbit/s"), which had been generated by an NRZ pulse pattern generator 71, had the same pattern with appropriate relative phase relationships. It was input into a 4 bit interleaving multiplexing circuit (4:1 MUX) 72, multiplexed so as to generate an M sequence PN $2^7-1$ stage signal at 42.64 Gbit/s (below, written as "42.7 Gbit/s"), and this signal was differentially output.

The differentially output signal was amplified up to an amplitude equal to or less than the half-wave voltage in the first MZ optical intensity modulator 32 by the amplifier 31, and then input into the first MZ optical intensity modulator 32. Moreover, the traveling wave type MZ LiNbO$_3$ optical intensity modulator disclosed in citation 3, K. Noguchi, H, Miyazawa, and O. Mitomi, "LiNbO$_3$ high-speed modulators", Tech. Dig. of CLEO Pacific Rim '99, paper FS2, pp. 1267–1268, 1999, was used as the first MZ optical intensity modulator 32.

The bias circuit 73 applied a direct current bias to the MZ optical intensity modulator 32 so as to realize transmission-null when unmodulated, and the MZ optical intensity modulator 32 output a 42.7 Gbit/s PN $2^7-1$ stage DPSK optical modulated code.

The 42.7 Gbit/s DPSK optical modulated code was input into the Mach-Zehnder interferometer (MZI) type optical filter 74 formed on a silica waveguide. As an MZI filter 74, a periodic optical filter having a frequency spacing of 100 GHz and a delay time of 10 ps was used. The temperature of the MZI filter 74 was controlled, and thereby the rejection frequency of the MZI filter 74 was adjusted to match the carrier frequency of the DFB-LD. By operating the MZI optical filter 74 with this type of operating conditions, the MZI filter 74 output a DCS-RZ code. In addition, the output DCS-RZ code was amplified by an EDFA optical amplification post-amplifier (an erbium doped optical fiber amplifier) 75, transmitted through a 1.55 μm zero dispersion optical fiber transmission line 76, and then input into an optical receiver.

At the optical receiver, the signal was amplified by the EDFA optical amplification pre-amplifier 77. Subsequently, the signal was directly detected by the optical signal direct detecting element 67, and converted to a binary NRZ baseband electrical signal. The converted signal was supplied to the CDR circuit 68, and the 42.7 Gbit/s NRZ data signal was regenerated by the CDR circuit 68 was further demultiplexed into four 10.7 Gbit/s data signals by the 4 bit interleaving demultiplexing circuit 78, and each of the error rates thereof was measured by 10.7 Gbit/s error rate measuring device 79.

FIGS. 11A through 11D are diagrams showing the operation of the experimental system shown in FIG. 10.

In the MZ optical intensity modulator 32, the DPSK optical signal is generated by being push-pull driven by the 42.7 Gbit/s NRZ signal. FIG. 11A shows the modulated directly detected waveform of the DPSK optical signal and FIG. 11B shows the optical modulation spectrum of the DPSK optical signal. In addition, FIG. 11C shows the directly detected waveform of the output of the MZI filter 74, and FIG. 11D shows the optical modulated spectrum of the optical signal output from the MZI filter 74.

As can be understood from FIG. 11C, at 42.7 Gbit/s, the optical phase modulated signal is converted to an RZ intensity modulated signal. In addition, it can be understood from the optically modulated spectrum of FIG. 11D that the modulated spectrum of a DCS-RZ code was obtained in which the carrier frequency $f_0$ (193.307 THz) is suppressed.

As a result of evaluating the error rate characteristics when using a PN $2^7-1$ stage NRZ signal, it was confirmed that there were no errors at 42.7 Gbit/s, and a receiver sensitivity of −27 dBm was obtained at the bit error rate of $10^{-9}$. From the above, it can be confirmed that the present format is a DCS-RZ format following a DCS-RZ optical encoding rule.

In addition, the optical loss in the pass band of the MZI filter 74 is approximately 2 dB, the amount of reflective attenuation is equal to or less than −40 dB, and compared to the structure using an MZ optical modulator, it was possible to form an extremely low loss and wide band modulation system.

FIG. 12 is a diagram for explaining another embodiment of the optical transmission system according to the present invention.

In the embodiment shown in FIG. 12, the optical transmission medium 69 and the optical receiver 65 are identical to those of the embodiments shown in FIG. 9. The only difference is that the optical transmitter 61 uses a wavelength division multiplexing transmission scheme.

Specifically, the optical transmitter 61 has the number of channels (CH#1 to CH#n) of the wavelength division multiplexing system. In the case of using the optical transmitter that outputs the DCS-RZ signal shown in FIG. 2, the optical carrier frequencies ($f_{01}$ to $f_{0n}$) of respective channels are located so as to match the central optical frequency of the rejection band of the optical filter unit 5. In each of the optical transmitters 61, the different carrier signals of respective channels are modulated using a DCS-RZ modulation format in each of the optical transmitters. An MZI type optical filter can be used as the optical filter units 5 that are disposed in the optical transmitters 61 of the respective channels. The RZ modulated signal generated by the optical transmitters 61 for each of the channels is optically amplified as necessary by an optical amplifier 62, and then input into the wavelength-division-multiplexing-light multiplexing filter 80, and wavelength division multiplexed.

The DCS-RZ optical signals simultaneously wavelength division multiplexed by the wavelength-division-multiplexing-light multiplexing filter 80 are amplified by the EDFA optical amplification post-amplifier 62 depending on necessity, and the amplified DCS-RZ optical modulated code is supplied at a predetermined transmission channel power for transmission to the optical transmission medium 69. The optical transmission medium 69 can be a linear repeatered transmission line that is formed by optical fibers and optical amplifier repeater devices for performing direct optical amplification and transmission.

The output of the optical transmission medium 69 is optically amplified by the EDFA optical amplification post-amplifier 62, subsequently input into the wavelength-division-multiplexing-light demultiplexing optical filter 81. The wavelength division multiplexed DCS-RZ signal is demultiplexed by wavelength into each of the channels ($f_{01\ to\ f0n}$), and input into the optical receivers 65. The operation in each optical receiver 65 is identical to that of the embodiment shown in FIG. 9, and thus the explanation thereof is omitted.

Moreover, in the transmitter 61 using the wavelength division multiplexing transmission scheme, only an example is shown in which a plurality of channels are multiplexed simultaneously by a wavelength-division-multiplexing-light multiplexing filter 80 and converted to RZ intensity modulated signals, but the same effect can be attained by making the polarization of the adjacent wavelength channels orthogonal.

Figure 13:
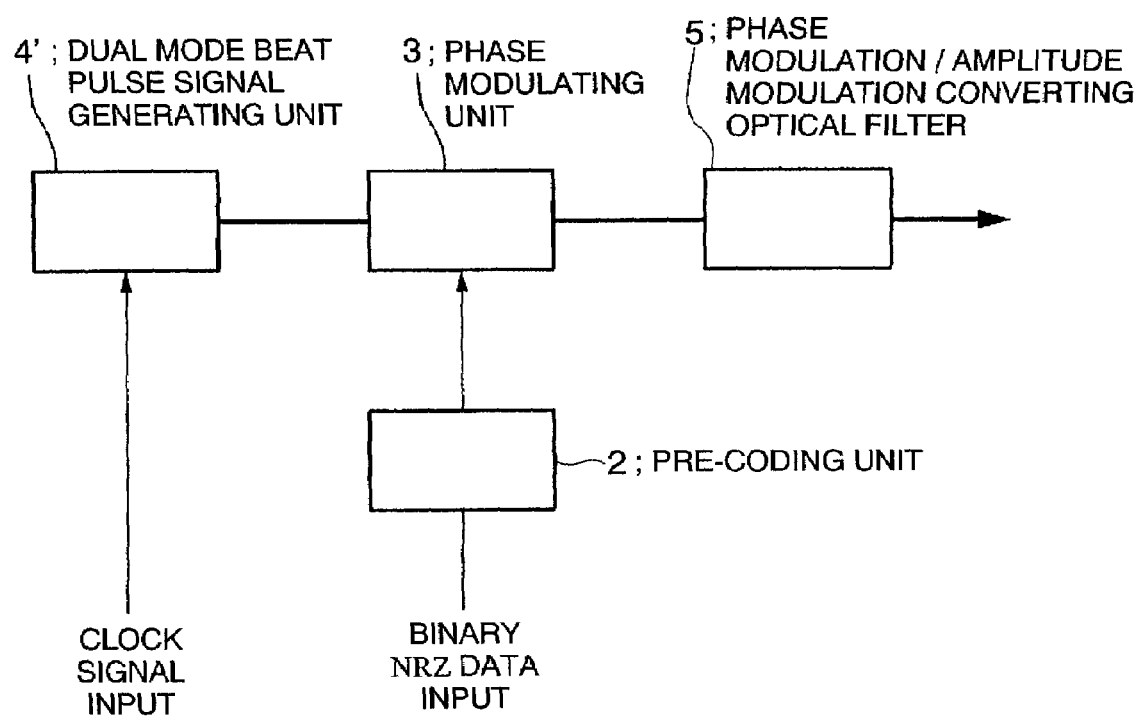
FIG. 13 is a diagram for explaining a further embodiment of the optical transmitter according to the present invention.

FIG. 13 is a block diagram showing a further embodiment of the optical transmitter according to the present invention. Here, instead of the LD that generates a single longitudinal mode signal for the optical transmitter shown in FIG. 1, a dual mode beat pulse generating unit 4' is used. Thereby, the duty cycle of the RZ pulse signal can be uniform between pulses, and thus the transmission quality can be improved.

In the figure, the blocks having reference numerals identical to those of the blocks shown in FIG. 1 are identical to those of FIG. 1. A dual mode beat pulse signal whose repetition frequency is equal to the line rate is generated by the dual mode beat pulse generating unit 4'. The details of this unit will be explained below because a structure identical to the two beat generating pulse unit 91 shown in FIG. 41 can be used.

Moreover, the mode-locked semiconductor laser that has a two mode oscillation disclosed in citation K. Sato, A Hirano, N. Shimizu, T Ohno, and H Ishii, "Dual mode operation of semiconductor mode-locked lasers for anti-phase pulse generation", OFC'2000, 320/ThW3-1, 2000, can be used.

The dual mode beat pulse is PSK modulated by the phase modulating unit 3. The structure of this unit can be selected from the structures shown in either FIG. 3 or FIG. 7. The pre-coding unit 2 can be structured identically to the pre-coding unit 2 shown in FIG. 35. The connections between the phase modulating unit 3 and the pre-coding unit 2 are identical to those in FIG. 35 when using the phase modulating unit 3 shown in FIG. 2.

The advantage of using the dual mode beat pulse generating unit 4' is that the loss in the phase modulation/amplitude modulation converting optical filter used as an optical filter unit 5 is largely decreased in comparison to the case of using a CW light source such as those in FIGS. 1 and 2. In addition, the duty cycle of the generated pulse train can be determined by a dual mode beat pulse, and thus fluctuations of the duty cycle due to the input data pattern can be suppressed. Thereby, in particular the tolerance with respect to optical nonlinear effects in the optical fiber can be improved in comparison to using the optical transmitter shown in FIGS. 1 and 2. In addition, there are the advantages that the symmetry of the two generated duobinary optically modulated spectra can be improved, and thus the chromatic dispersion tolerance characteristics can be improved.

Figure 14:
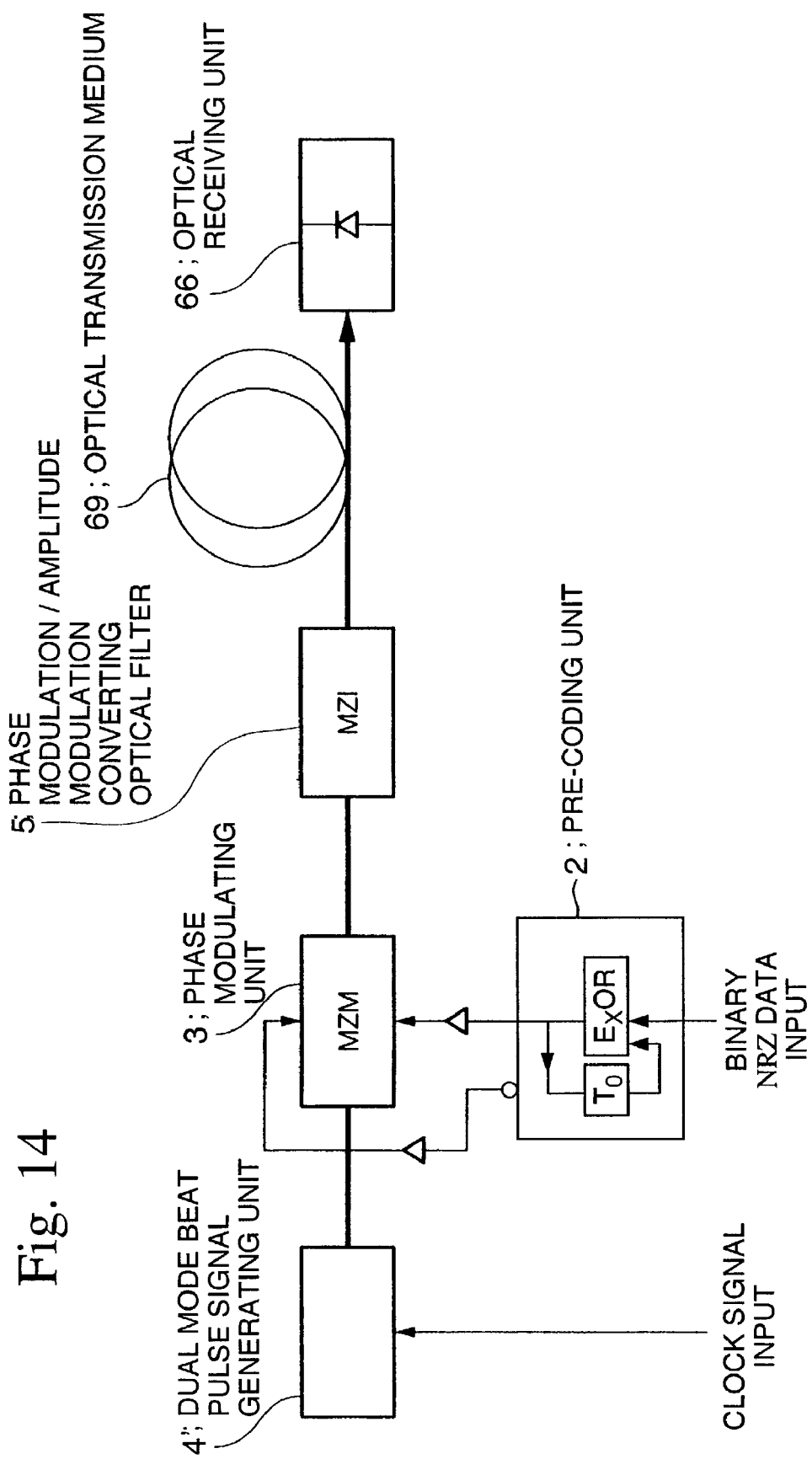
FIG. 14 is a diagram showing one embodiment of the optical transmission system using the optical transmitter shown in FIG. 13.
Figure 20:
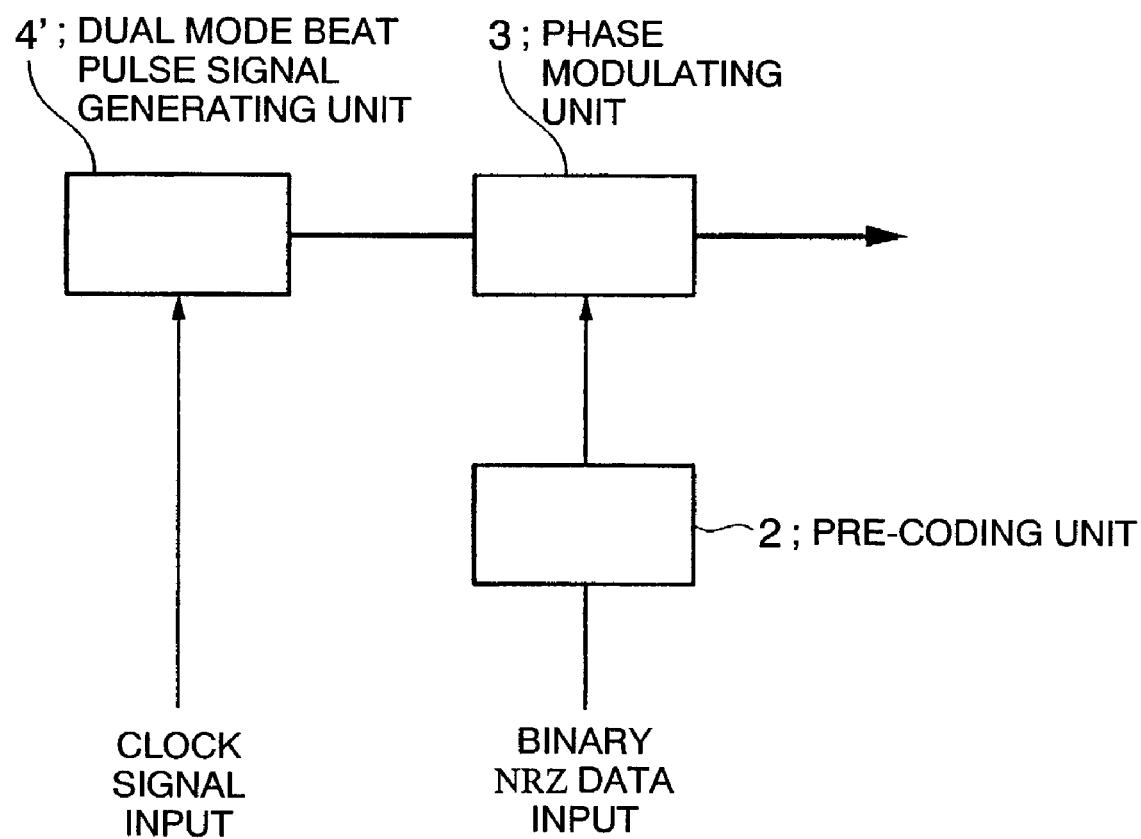
FIG. 20 is a block diagram showing another embodiment of the optical transmitter according to the present invention.

FIG. 14 is a diagram showing another embodiment of the optical transmission system according to the present invention. In addition, FIGS. 15, 16, and 20 are diagrams for explaining the operation thereof.

In FIG. 14, the output of the optical transmitter shown in FIG. 13 is input into the optical transmission medium 69. A pre-coding circuit whose delay time is 1 bit (n=1) is used as a pre-coding unit 2. In addition, a phase modulation/amplitude modulation converting Mach-Zehnder interferometer type optical filter whose delay time is 1 bit is used as an optical filter unit 5. A single mode fiber can be used as an example of the optical transmission medium 69. In addition, a direct detection receiver can be used as an optical receiver 66.

FIGS. 15A through 15F show the waveforms for each of the parts in FIG. 14. In FIG. 15A, a binary NRZ data electrical signal (line rate B) is input into a pre-coding unit 2. In the dual mode beat pulse signal generating unit 4' in FIG. 14, in the case, for example, of using a mode-locked semiconductor laser, a sine wave synchronized with the data signal and having a repetition frequency of B equal to the line rate B is input. The dual mode beat pulse signal generating unit 4' generates the dual mode beat pulse having the modulated spectrum shown in FIG. 16A, and inverts the phase thereof for each bit as shown in FIG. 15B.

Figure 16A:
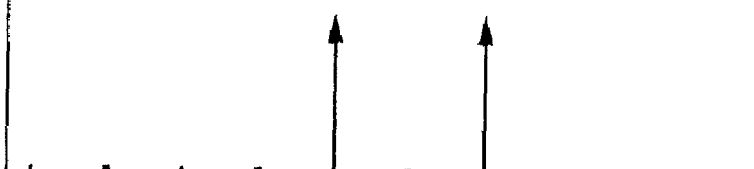
FIGS. 16A through 16E are diagrams for explaining the operation of the optical transmitter and the optical transmission system shown in FIGS. 13 and 14 using the optical spectrum of each part.
Figure 16B:
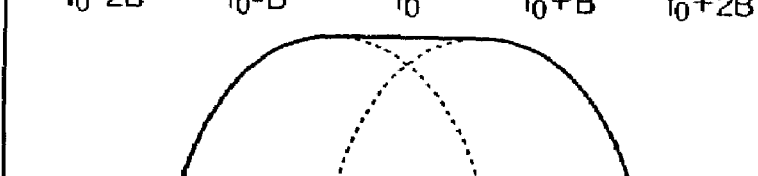

When this dual mode beat pulse is modulated at the timing such as that in FIG. 15C by the phase modulating unit 3 in FIG. 13, as shown in FIG. 16B, an optical signal spectrum having an optical modulated band of 3B in which the carrier component is suppressed is output, and thereby the phase modulated RZ signal as shown in FIG. 15D is generated. In the case that this phase modulated RZ signal is used as a transmission code, the optically modulation band can be reduced in comparison to the technology disclosed in the citation (Miyano et al.). This signal is input into the phase modulation/amplitude modulation converting optical filter used as the optical filter unit 5.

Figure 16C:
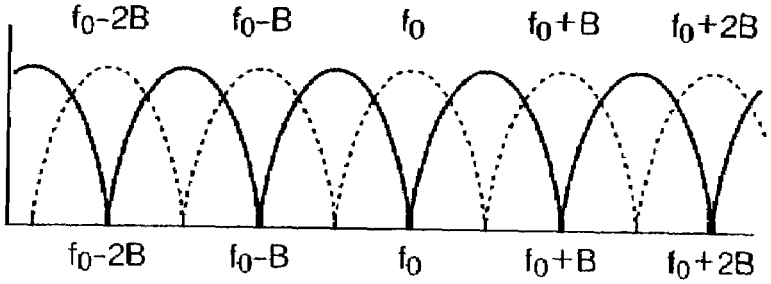
Figure 16D:
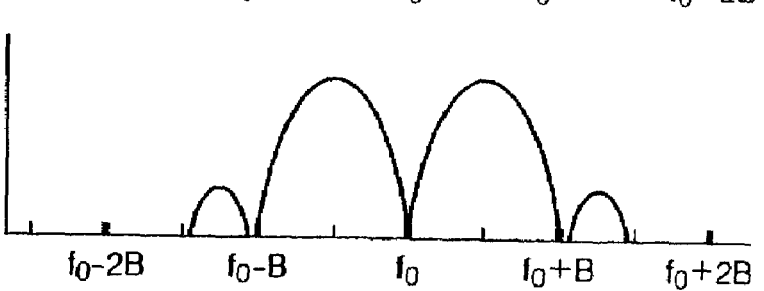

A Mach-Zehnder interferometer type optical filter whose FSR (free spectral range) is equal to the line rate B can be considered as the phase modulation/amplitude modulation converting optical filter, and the optical signal output from the port (shown by the solid line) having transmittance characteristics in which, as shown in FIG. 16C, the center frequencies of the rejection bands coincide with the carrier frequency $f_0$ can be considered. At this time, as shown in FIG. 16D, as an optical signal spectrum, the DCS-RZ signals in which two optical duobinary signal spectra are arranged at a frequency difference of B can be obtained, and the intensity modulated waveform shown in FIG. 16E can be obtained. The phase of this output optical signal is inverted at each mark bit.

Figure 16E:
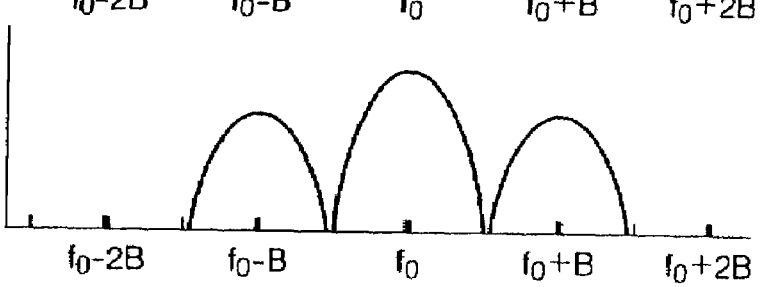

In contrast, as shown in FIG. 16C, the optical signal output from a port (shown by the dashed line) having transmittance characteristics such that the center frequencies of the pass bands coincided with the carrier frequency $f_0$ can be considered. Here, as an optical signal spectrum, a duobinary RZ signals in which three optical duobinary signal spectra are arranged at the frequency difference B as shown in FIG. 16E are obtained, and an intensity modulated waveform such as that shown in FIG. 15F is obtained. This output optical signal has phase modulating rules identical to a duobinary signal.

Either of the bandwidths of the RZ signals described above is narrow, respectively equal to or less than 2B or 3B. Therefore, it is understood that the bandwidth-reduced RZ intensity modulated signal in comparison with the conventional code can be generated by using the NRZ code as a baseband signal.

Figure 17:
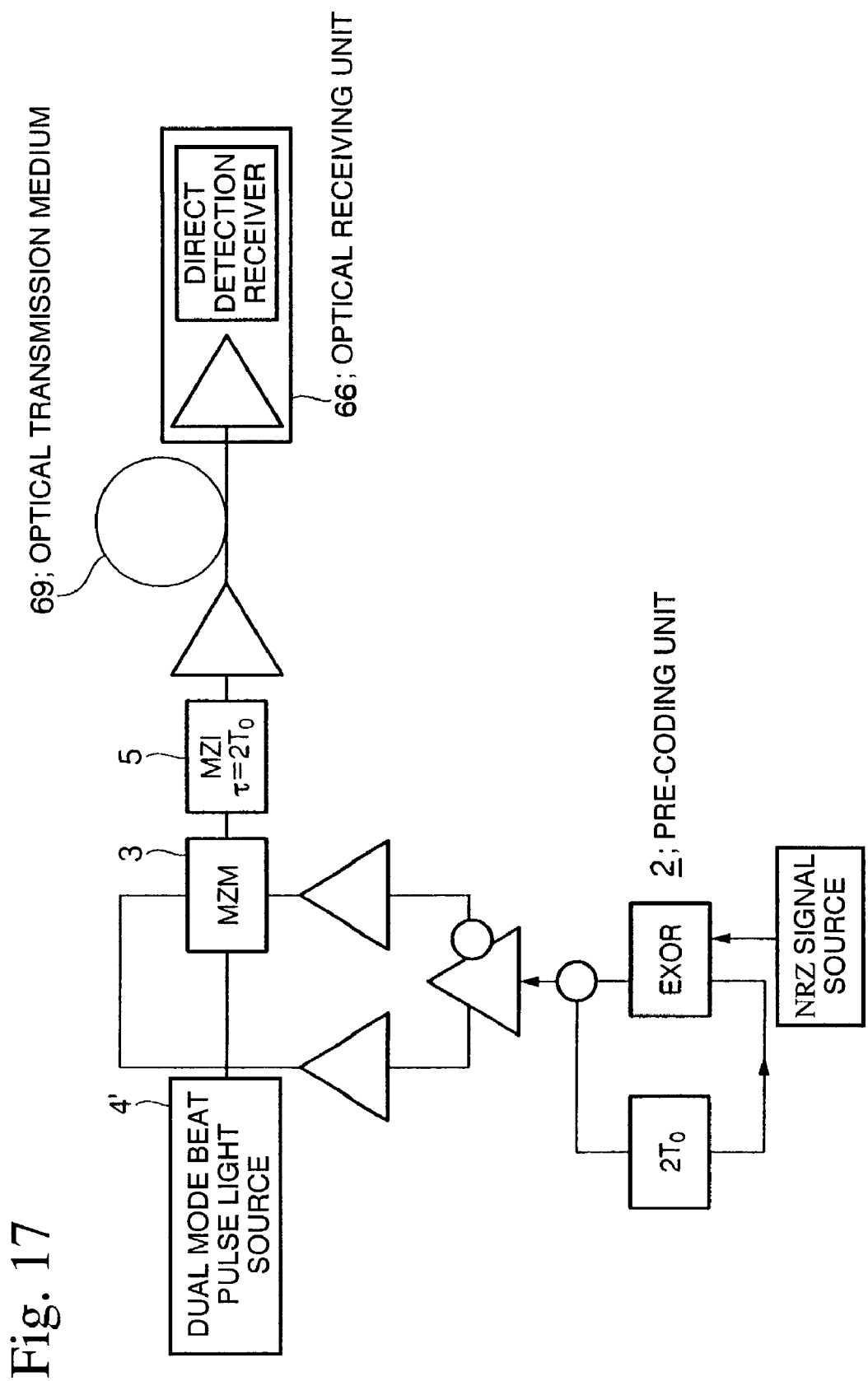
FIG. 17 is a diagram showing a second embodiment of the optical transmission system using the optical transmitter shown in FIG. 13.

FIG. 17 shows an embodiment of the optical transmission system using the optical transmitter shown in FIG. 13. This differs from the embodiment shown in FIG. 14 in that the amount of delay of the pre-coding unit 2 and the amount of delay of the MZI optical filter used as the optical filter unit 5 are selected so that each takes 2 time slots.

In FIG. 17, the output of the optical transmitter shown in FIG. 13 is input into the optical transmission medium 69. A two bit pre-coding circuit having a delay time n=2 is used as a pre-coding unit 2, and in addition, a phase modulation/amplitude modulation converting Mach-Zehnder interferometer type optical filter circuit having a delay time of 2 bits is used as the optical filter unit 5. As one example of the optical transmission medium 69, a single mode fiber is used. In addition, a direct detection receiver is used as the optical receiving unit 66.

Figure 19A:
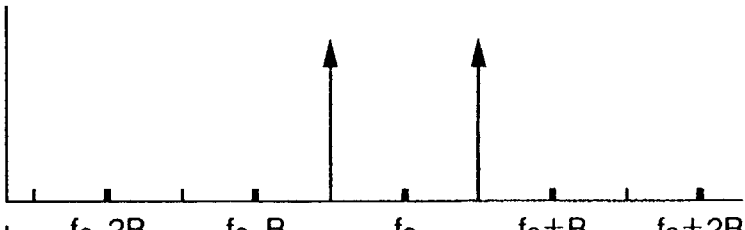
FIGS. 19A through 19E are diagrams for explaining the operation of the optical transmitter and the optical transmission system shown in FIG. 17 using the optical spectrum of each part.

FIGS. 18A through 18G show the waveforms for each of the blocks shown in FIG. 17. In FIG. 18A, a binary NRZ data electrical signal (line rate B) is input into the pre-coding unit 2. In the dual mode beat pulse generating unit 4' shown in FIG. 17, in the case, for example, of using a mode-locked semiconductor laser, a sine wave having a repetition frequency of B that is equal to the line rate B synchronized with the data signal is generated. The dual mode beat pulse generating unit 4' generates a dual mode beat pulse having the modulated spectrum as shown in FIG. 19A, and inverts the phase thereof for each bit, as shown in FIG. 18C.

Figure 19B:
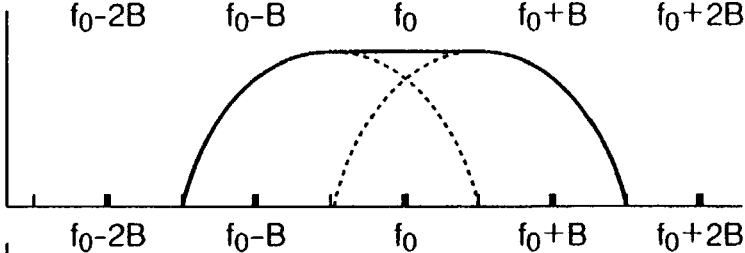
Figure 19C:
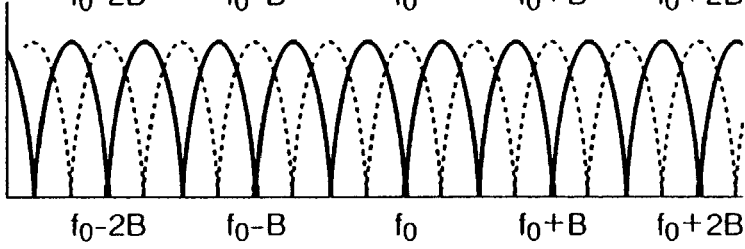

When the phase modulating unit 3 shown in FIG. 17 performs phase modulation on this dual mode beat pulse using a pre-coded signal at the timing such as that in FIG. 18B, as shown in FIG. 19B, an optical signal spectrum having the optical modulation band of 3B in which the carrier component is suppressed is output, and a phase modulated RZ signal as shown in FIG. 18D is generated. In the case that this phase modulated RZ signal is used as a transmission code, the optical modulation band can be reduced in comparison to the technology of the above citation (Miyano et al.). This signal is input into the phase modulation/amplitude modulation converting optical filter that forms the optical filter unit 5. Here, a Mach-Zehnder interferometer type optical filter whose FSR is equal to half the line rate B can be considered as the phase modulation/amplitude modulation converting optical filter. An optical signal output from a port (shown by the solid line) having transmittance characteristics in which the rejection band center frequencies thereof are arranged equally around the carrier frequency $f_0$ as shown in FIG. 19C can be considered. At this time, the optical signal spectrum of this port has a signal spectrum such as that shown in FIG. 19E, and an RZ intensity modulated optical signal such as that shown in FIG. 18G can be obtained.

Figure 19D:
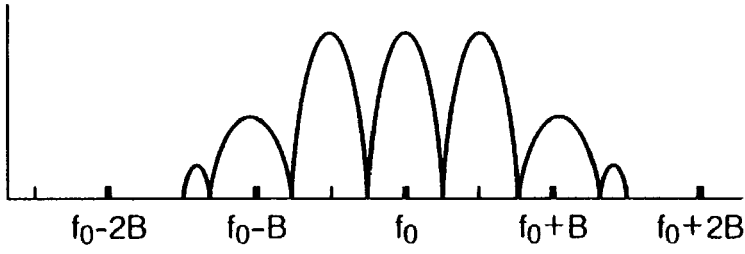
Figure 19E:
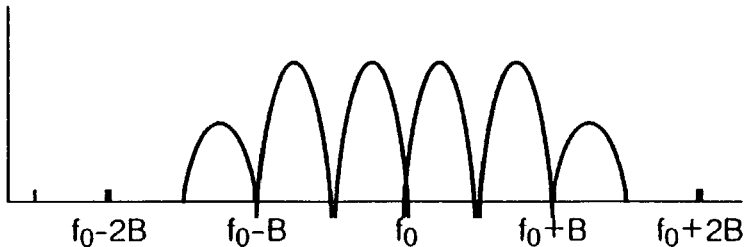

In contrast, an optical signal output from a port (shown by the dashed line) having transmittance characteristics such that the pass band center frequencies are arranged equally at the carrier frequency $f_0$ as shown in FIG. 19C. At this time, the optical signal spectrum shown in FIG. 19D is obtained, and the intensity modulated frequency as shown in FIG. 18F is obtained.

Either of the bandwidths of the RZ signals described above is narrow, respectively equal to or less than 2B or 3B, and it is understood that use the NRZ code can be used as a baseband signal, and the bandwidth-reduced RZ intensity modulated signal in comparison with the conventional code can be generated.

FIG. 20 is a block diagram showing another embodiment of the optical transmitter according to the present invention. The embodiment shown in FIG. 20 differs from the embodiment shown in FIG. 13 in that the optical filter unit 5 for converting phase modulated signals to intensity modulated RZ signals is not present. Therefore, the difference is only that the signal transmitted through the optical transmission medium line (not illustrated) is an RZ intensity modulated phase-encoded signal.

Figure 21:
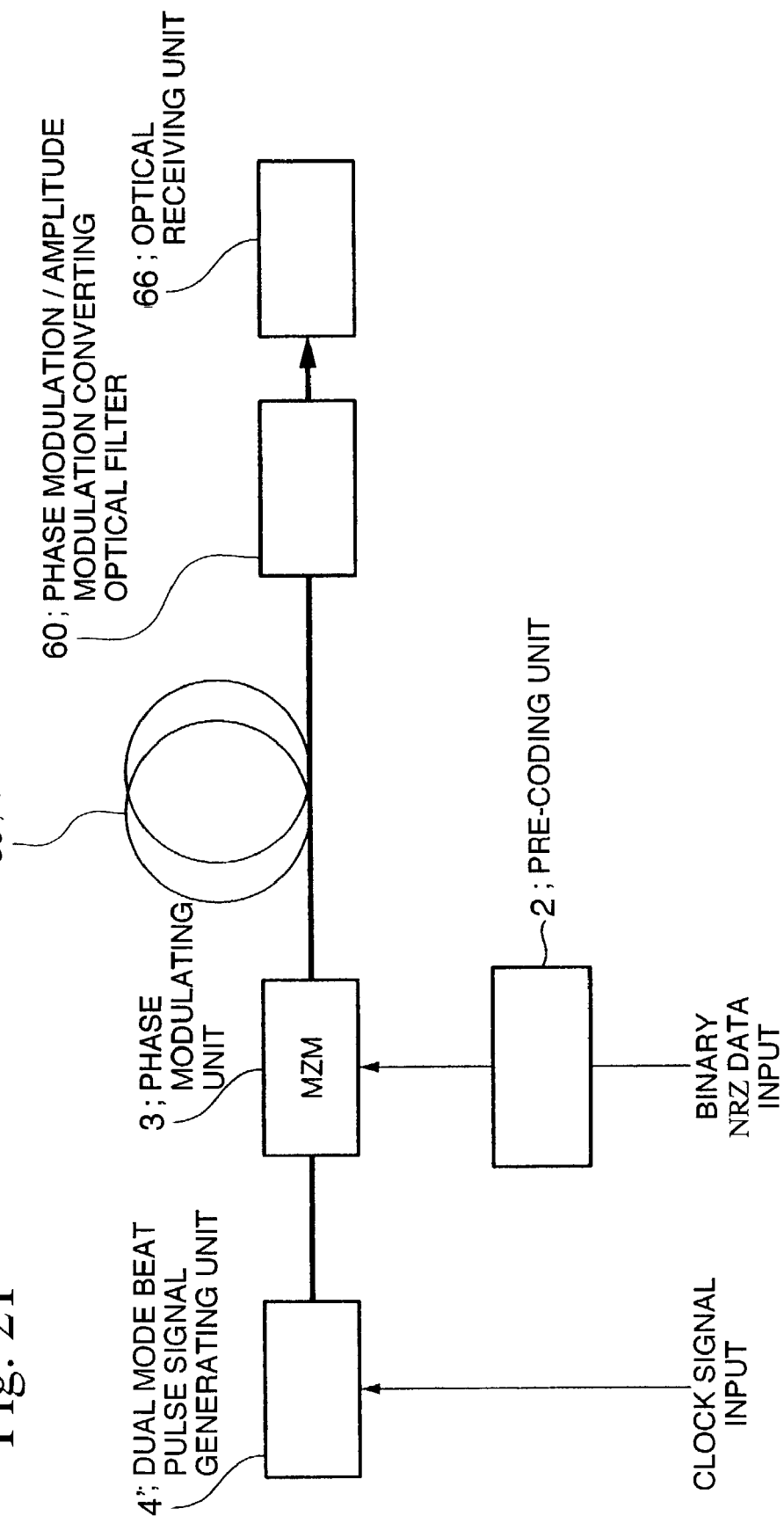
FIG. 21 is a block diagram showing an embodiment of the optical transmission system using the optical transmitter shown in FIG. 20.

FIG. 21 is a block diagram showing another embodiment of the optical transmission system according to the present invention using the optical transmitter shown in FIG. 20. This differs from the optical transmission system shown in FIG. 15 in that the phase modulation/amplitude modulation converting optical filter 60 is formed inside the receiver disposed at the output of the optical transmission medium 69. A 1-bit delay Mach-Zehnder interferometer type optical filter is used as the phase modulation/amplitude modulation converting optical filter 60, and in the case of considering the frequency setting identical to that of FIG. 16C, the optical output of the two arms of the Mach-Zehnder interferometer type optical filter becomes a complementary optical intensity modulated output signal as shown in FIGS. 15E and 15F.

Specifically, in the case that a direct detection receiver carries out regeneration by using this type of delay detection, it can be understood that the alternating phase modulation by the dual mode beat pulse on the transmitting side does not influence the result of the demodulation of the data. In the optical receiving unit 66 in FIG. 21, as shown in FIG. 22A, the received optical phase modulated RZ signal can be converted to the intensity modulated signal shown in FIG. 15E using the MZI optical filter, and can be received at the normal direct detection receiver. In addition, as shown in FIG. 22B, the received optical phase modulated RZ signal is converted to the intensity modulated signal shown in FIG. 15F using the MZI optical filter, directly detected and then regenerated, and can be demodulated after inverting the logic thereof. This inversion operation can be carried out at the input of the pre-coding unit 2 of the optical transmitter.

In addition, as shown in FIG. 22C, differential reception of the two outputs shown in FIGS. 16D and 16E can be carried out using two photo detectors. The receiver sensitivity when carrying out differential reception can be improved by a 3 dB in comparison to the case where differential reception is not carried out.

FIG. 23A through FIG. 26C are diagrams for explaining another embodiment of the present invention. As can be understood from FIGS. 16D and 16E, the optical duobinary component is included in the demodulated intensity modulated signal components. Therefore, as shown in FIGS. 23A, 23I, 23J, 24D, 24G, and 24H, a band pass filter such as the ones in FIGS. 23I and 24G is provided in the receiver, and by direct detection, as shown in FIGS. 23J and 24H, an arbitrary optical duobinary signal component included in the demodulated signal can be obtained, and the chromatic dispersion tolerance can be increased.

In this manner, the optical duobinary signal spectrum can be extracted from the signal spectrum of the received optical phase modulated RZ signal by filtering, and thereby, the chromatic dispersion tolerance can be almost doubled in comparison to the case of using the receiver shown in FIG. 22A.

Figure 23A:
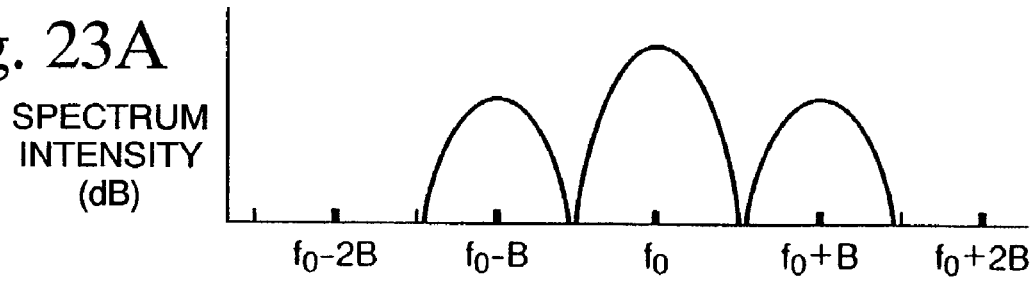
FIGS. 23A, 23I, and 23J are diagrams for explaining the enlargement of the chromatic dispersion tolerance of the optical receiver used in the optical transmission system in FIG. 20 based on the optical signal spectrum.
Figure 23I:
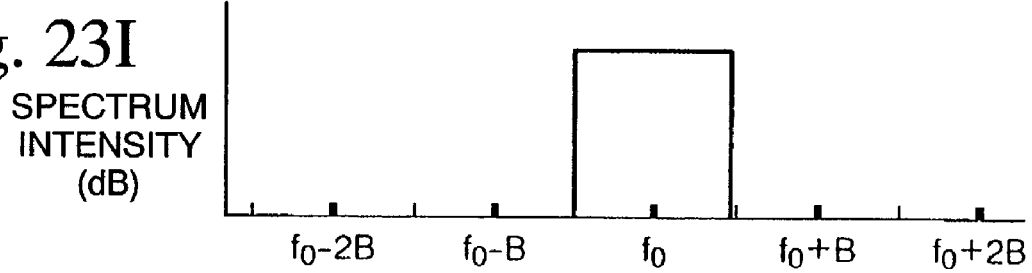
Figure 23J:
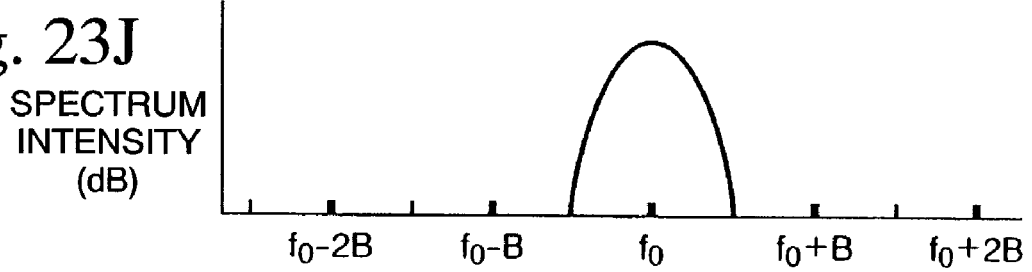
Figure 24D:
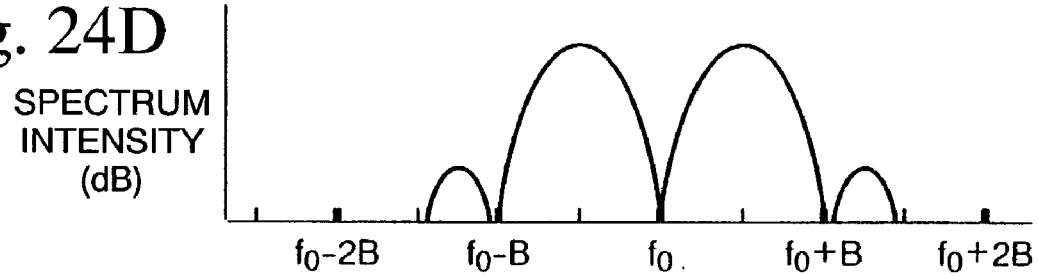
FIGS. 24D, 24G, and 24H are diagrams for explaining the enlargement of the chromatic dispersion tolerance of the optical receiver used in the optical transmission system in FIG. 20 based on the optical signal spectrum.
Figure 24G:
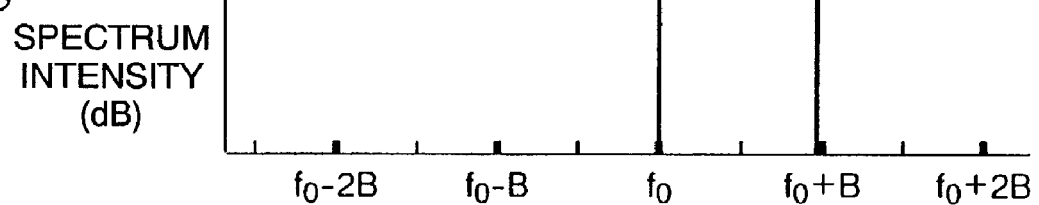
Figure 24H:
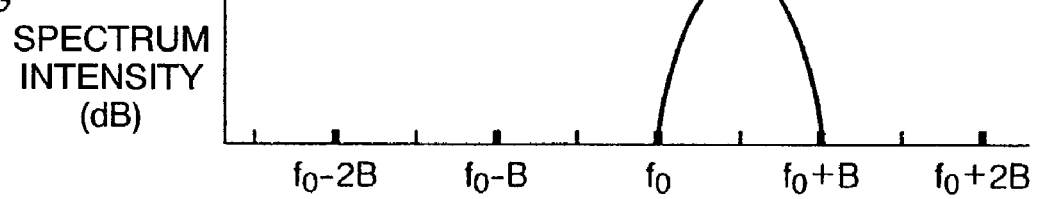

Moreover, in FIGS. 24D, 24G, and 24H, the optical duobinary component of the upper side band is extracted, but the optical duobinary component of the lower side band can also be extracted. In addition, in FIGS. 23A, 23I, and 23J, the optical duobinary component that includes the carrier frequency is extracted, but either one of the upper or lower optical duobinary components can be extracted. Specifically, by using a phase modulated code that has been RZ intensity modulated as the transmission code, the tolerance with respect to the optical nonlinear effects on the optical transmission medium can be improved, and at the receiving side, by carrying out phase modulation/amplitude modulation conversion and then limiting the signal band in the optical carrier frequency domain, the chromatic dispersion tolerance of the transmission line ban be improved.

Figure 25A:
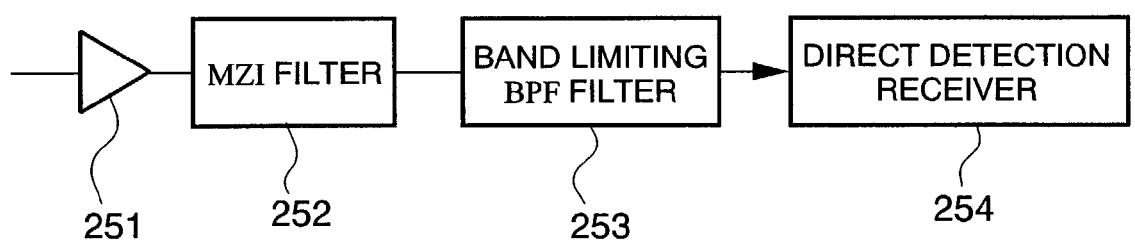
FIGS. 25A and 25B are diagrams showing examples of the structure of the optical receiver shown in FIG. 23A, 23I, 23J, 24D, 24G, and 24H.
Figure 25B:
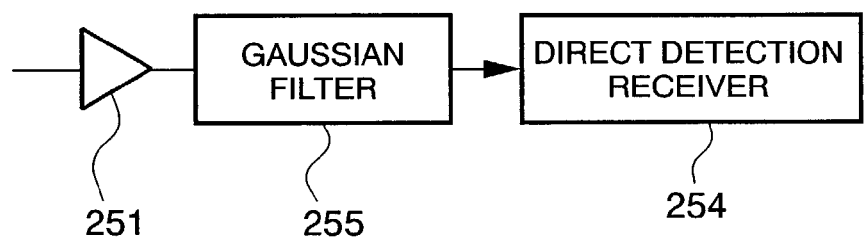

FIGS. 25A and 25B are examples of a concrete structure that adds a band limiting function to the optical filter unit and thereby improves the chromatic dispersion tolerance of the demodulated signal.

In FIG. 25A, the RZ phase modulated signal that is transmitted over the optical transmission medium is amplified by the optical pre-amplifier 251, and then is converted to an intensity modulated signal by the MZI optical filter 252. Here, by disposing the optical band pass filter 253 having a transfer function that is nearly square, as shown in FIGS. 23I and 24G, between the MZI optical filter 252 and the direct detection receiver 254, the optical duobinary component can be extracted.

In contrast, FIG. 25B is an example in which the equivalent functions of the MZI filter 252 in FIG. 25A and the band limiting optical band pass filter 253 are realized by one Gaussian filter 255, which is easily realized. Specifically, like FIG. 25A, the RZ phase modulated signal that is transmitted over the optical transmission medium is amplified by the optical pre-amplifier 251, and then the center frequency of the Gaussian filter 255 is matched with the center frequency of the desired optical duobinary component, and the phase modulation/amplitude modulation conversion and the band limiting function can be realized by a single device.

Figure 26A:
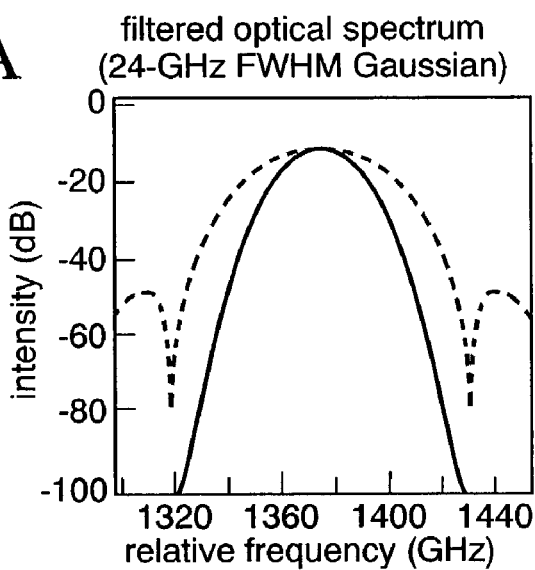
FIGS. 26A through 26C are diagrams for explaining the operation of the optical receiver shown in FIG. 25B.
Figure 26B:
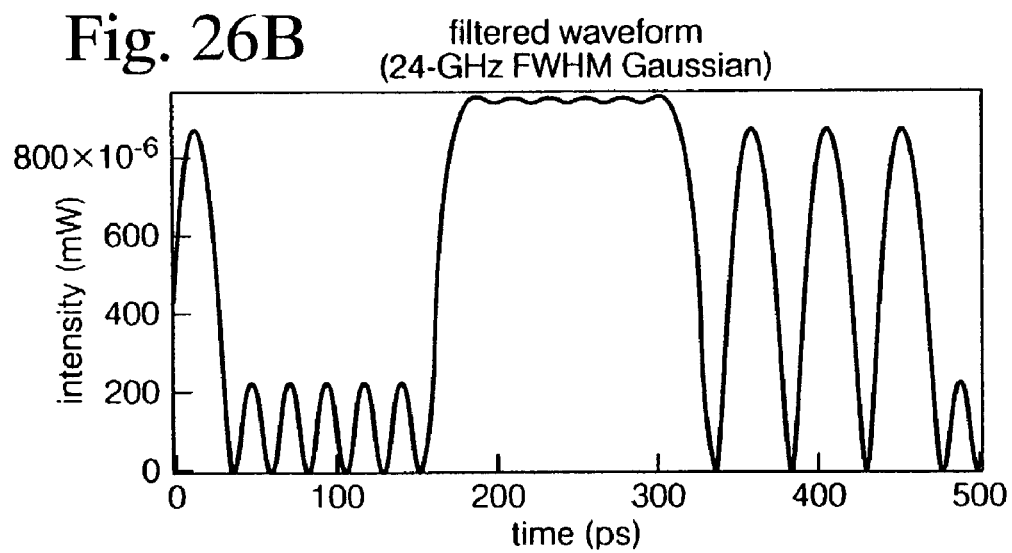
Figure 26C:
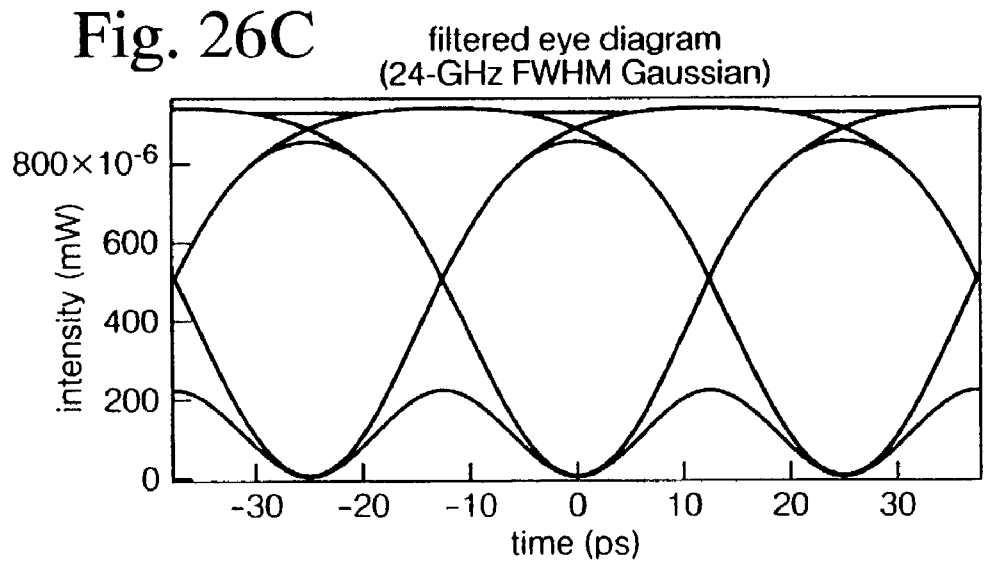

FIGS. 26A through 26C are diagrams showing a graphical representation of the results of numerical calculation of a concrete experimental example of FIG. 25B.

FIG. 26A is an example of the calculation in the case of the frequency arrangement shown in FIGS. 23A, 23I, and 23J, and shows with the dashed line the modulated spectrum of an RZ phase modulated signal modulated with a M sequence pseudo-random signal having a line rate of 43 Gbit/s. The solid line shows the optical duobinary component extracted by one Gaussian filter whose full width at half maximum is 24 GHz. The waveform of the extracted signal that has been directly detected is shown in FIGS. 26B and 26C. According to FIGS. 26B and 26C, it can be confirmed that the original PN $2^7-1$ stage signal has been demodulated as the demodulated waveform with good eye opening has been obtained, and that the demodulation of an optical duobinary signal having a low inter-symbol interference is possible.

Figure 27:
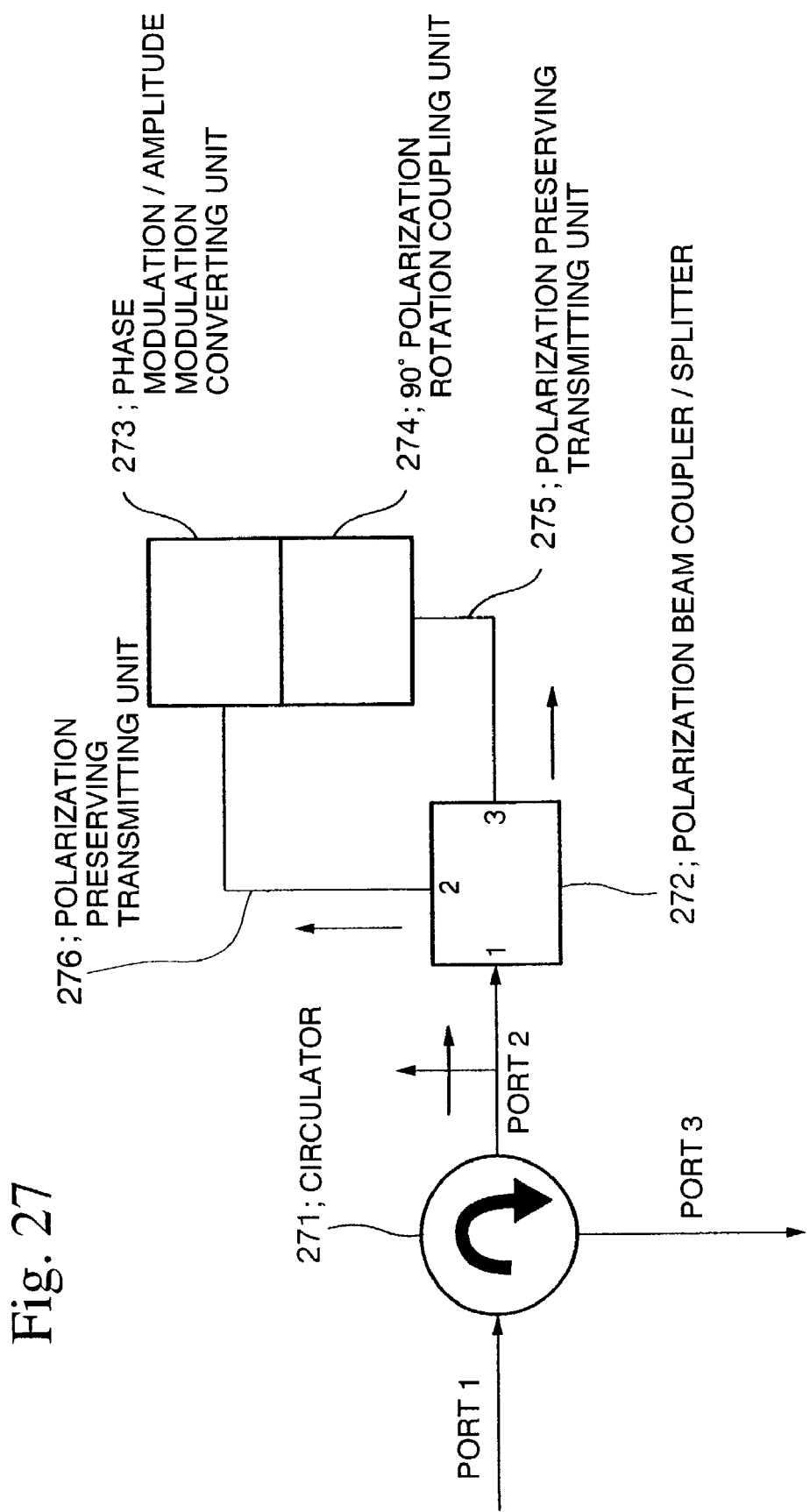
FIG. 27 is a diagram showing an example of the structure for realizing an optical filter having a polarization independent transfer function used in the present invention.

FIG. 27 is a diagram showing an example of the structure of a phase modulation/amplitude modulation converting optical filter used in the transmitter or the receiver according to the present invention.

In the case of using a Mach-Zehnder interferometer type optical filter, there is the problem that the transmittance characteristics change due to the input polarization state. In particular, in the case of using this type of optical filter on the receiver side, for example, in the case of using an optical fiber as an optical transmission medium, there is the problem that the receiver characteristics fluctuate due to changes in the polarization state after transmission. The structure of a phase modulation/amplitude modulation converting filter that solves this problem is shown in FIG. 27.

In FIG. 27, the optical phase modulated signal is input into the port 1 of the circulator 271, and output from the port 2 of the circulator 271. The optical phase modulated signal from the port 2 is input into the polarization beam coupler/splitter 272, and separated into two linearly polarized wave components which are orthogonal to each other. The polarization axis of one of the optical phase modulated signal components of the split polarization components is rotated by 90°.

Two polarization separated signals are coupled to either a TE propagatiori mode or a TM propagation mode of the phase modulation/amplitude modulation converting optical filter. The optical signals are propagated together in the opposite directions, and have undergone phase modulation/amplitude modulation conversion with the same transmission mode. The converted intensity modulation signal is again input into the polarization beam coupler/splitter 272, is polarization-combined, and then output from the port 1 of the polarization beam coupler/splitter 272, and input into the port 2 of the circulator 271. The demodulated intensity modulation signal that has been polarization-combined can be extracted from the port 3 of the circulator.

Due to having this type of structure, no matter the polarization state of the input optical phase modulated signal, it is always only sensitive to filter characteristics in one direction of polarization. Thereby, phase modulation/amplitude modulation conversion that is not influenced by the polarization sensitivity of the phase modulation/amplitude modulation converting filter can be realized.

Figure 28A:
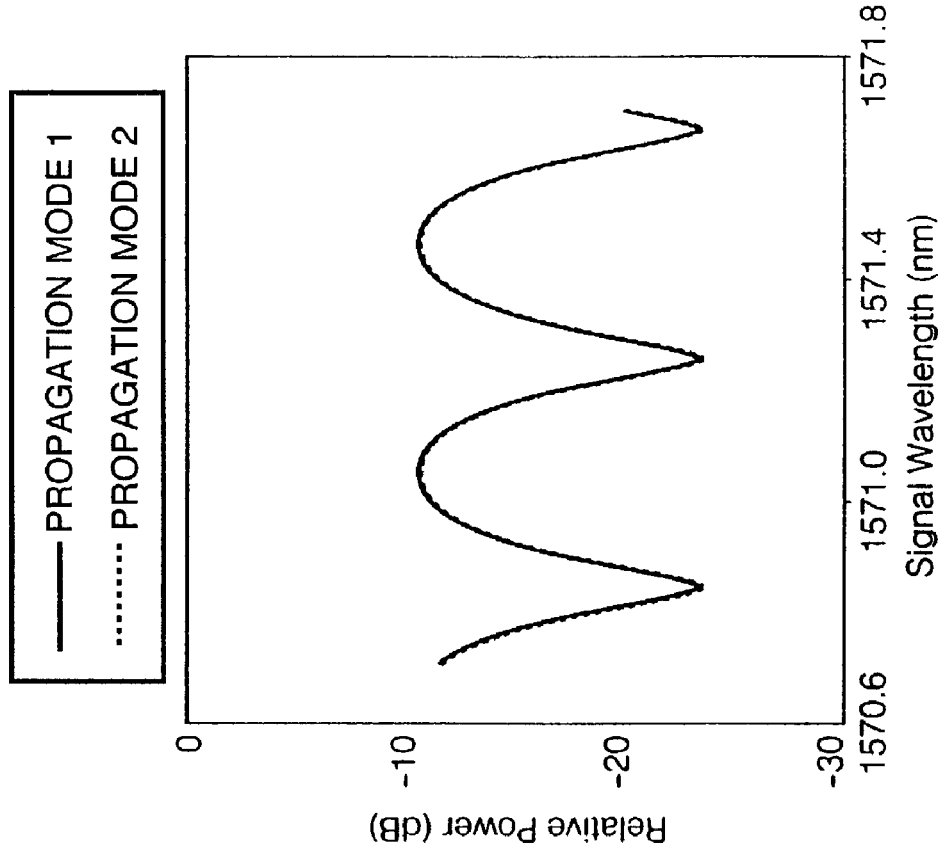
FIGS. 28A and 28B are diagrams for explaining the experimental results using the structure shown in FIG. 27.
Figure 28B:
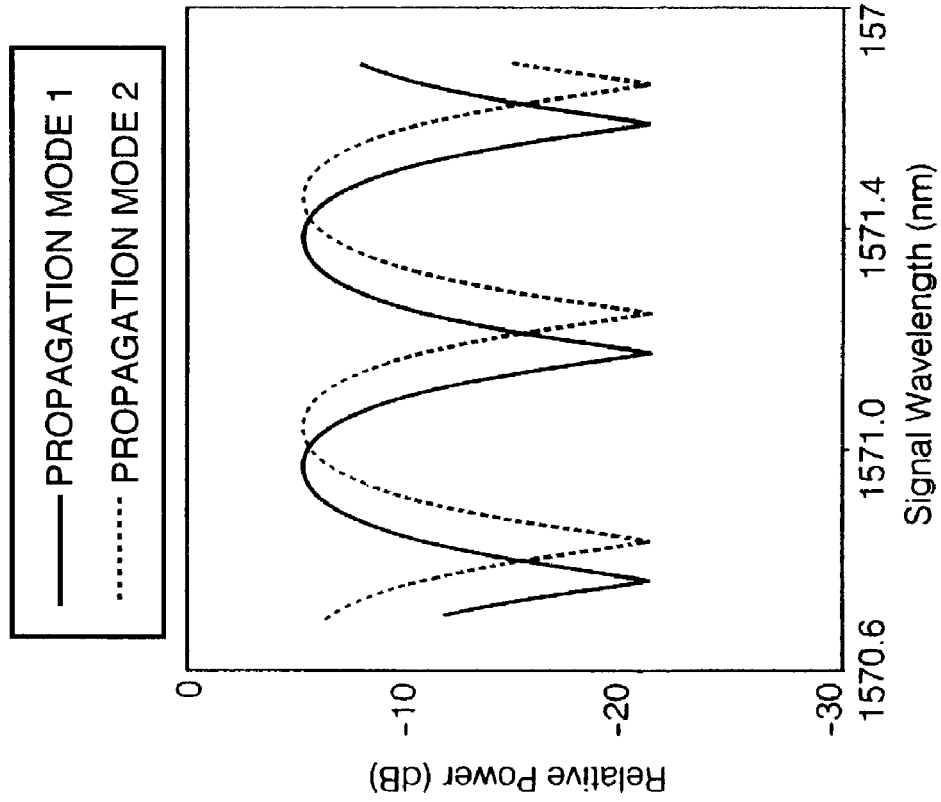

FIGS. 28A and 28B present as a graph an experimental example of the phase modulation/amplitude modulation converting optical filter in the 1.58 μm band. Here, an MZI interference filter having FSR of 50 GHz formed on a silica waveguide is used as an optical filter. In the case that the structure shown in FIG. 27 is not used, when the input polarization changes, a maximum shift in the transfer function of approximately 9 GHz can be observed.

In contrast, by using the structure shown in FIG. 27, as shown in FIG. 28B, a transfer function of the optical filter that is almost completely insensitive to the input polarization can be realized, and it is confirmed that a stable phase modulation/amplitude modulation signal conversion can be realized.

FIG. 29 is a block diagram showing yet another embodiment of the phase modulation device and the pre-coding device used in the optical transmitter according to the present invention, and here a multi-stage structure where n=2 is shown.

The difference between this embodiment and the optical phase modulation unit of the embodiment shown in FIG. 2 is that the optical phase modulating unit 3 comprises two DPSK modulating units 301 and 302 connected in series and the two input data signals can be time division multiplexed in the processing block of the optical carrier frequency band, and this is desirable for the realization of the high speed operation.

FIGS. 30A to 30J are diagrams for explaining the operation of the transmitter shown in FIG. 29. FIGS. 30A and 30B are two independent multiplexed digital electrical signals D1 and D2 that have the same bit rate, and are binary NRZ signals. In addition, D1 and D2 are time division multiplexed to generate the binary NRZ multiplexed signal shown in FIG. 30C. FIG. 30D shows the data generated by pre-coding this multiplexed signal. The signal generated by the DPSK modulation of D1 and D2 using time division multiplexing is phase modulated in conformity to FIG. 30D. The optical transmitter shown in FIG. 29 generates the multiplexed phase modulated signal by carrying out the processing using the processing block of the optical carrier frequency band instead of carrying out multiplexing in the baseband.

Figure 35:
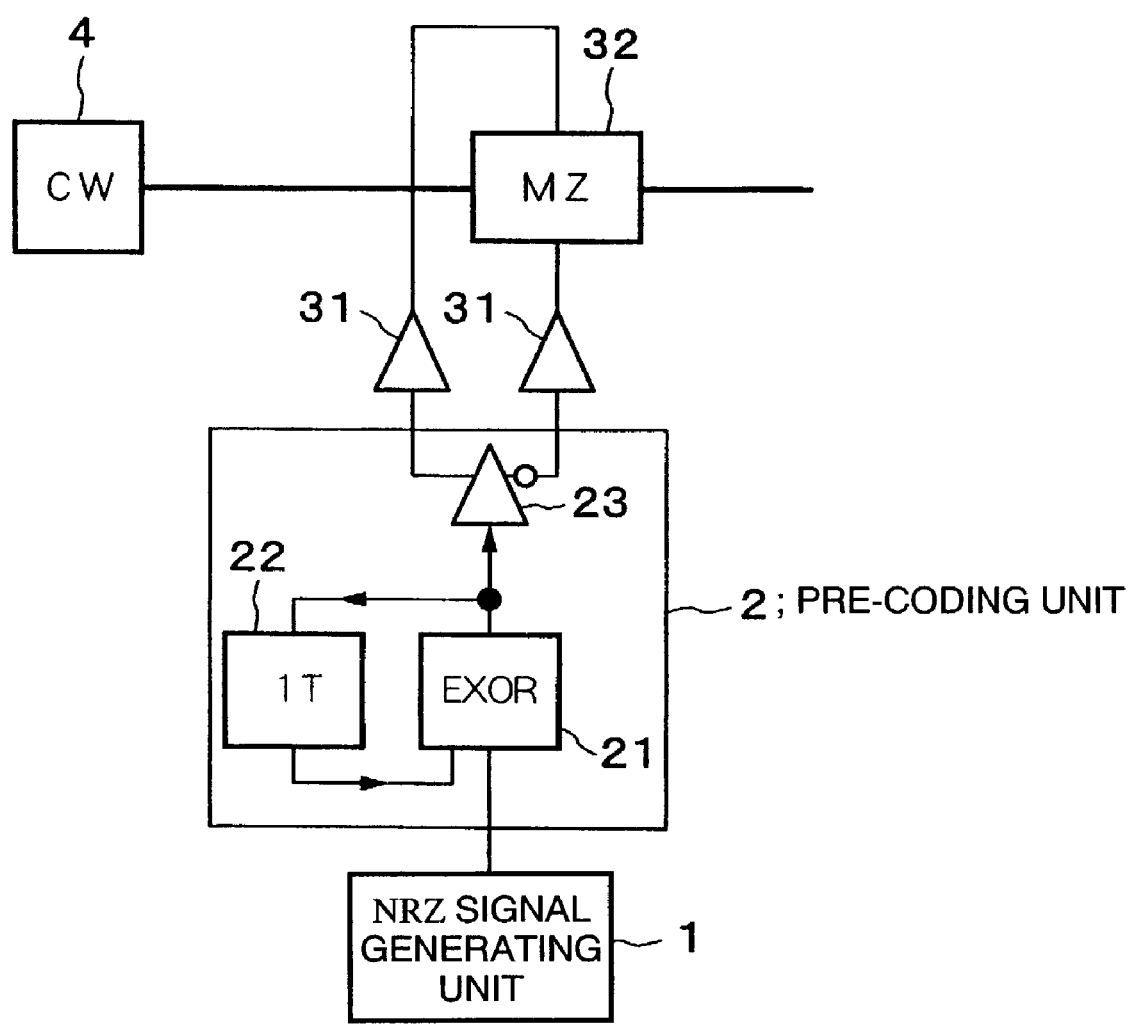
FIG. 35 is a diagram for explaining the internal structure of the optical transmitter shown in FIG. 34.

Moreover, in FIGS. 30A to 30J, FIGS. 30E and 30F are pre-coded NRZ data P1 and P2 that have been obtained by converting D1 and D2 using the pre-coding unit 2 shown in FIG. 35, and the code is inverted each time a mark bit is input. The pre-coded NRZ data P2 is delayed by T/2 (where T is one time slot of the input data signals D1 and D2) as a relative delay difference in comparison to P1. The signal INPUT is phase modulated, as shown in FIG. 30E, by the DPSK modulator 301 based on P1, and input into the DPSK modulator 302. The DPSK modulators 301 and 302 carry out phase modulation using P2 in accordance with a DPSK format in the manner shown in FIG. 30G at a timing delayed by T/2 in comparison to the phase modulation timing of D1 shown in FIG. 30F. As a result, the DPSK modulators 301 and 302 output a signal shown in FIG. 30H. It can be understood that a phase modulated signal, which is the same as the phase modulated signal obtained from one of the DPSK modulator 301 and 302, is generated using the multiplexed data shown in FIG. 30D that is obtained by the time division multiplexing of D1 and D2 and the pre-coding of the multiplexed signal. The signal shown in FIG. 30H and the 1 bit delayed signal shown in FIG. 30I are combined using a Mach-Zehnder interferometer type modulator, and when phase modulation/amplitude modulation conversion is carried out, as shown in FIG. 30J, a signal has been demodulated that is identical to the original multiplexed signal shown in FIG. 30C.

Figure 31:
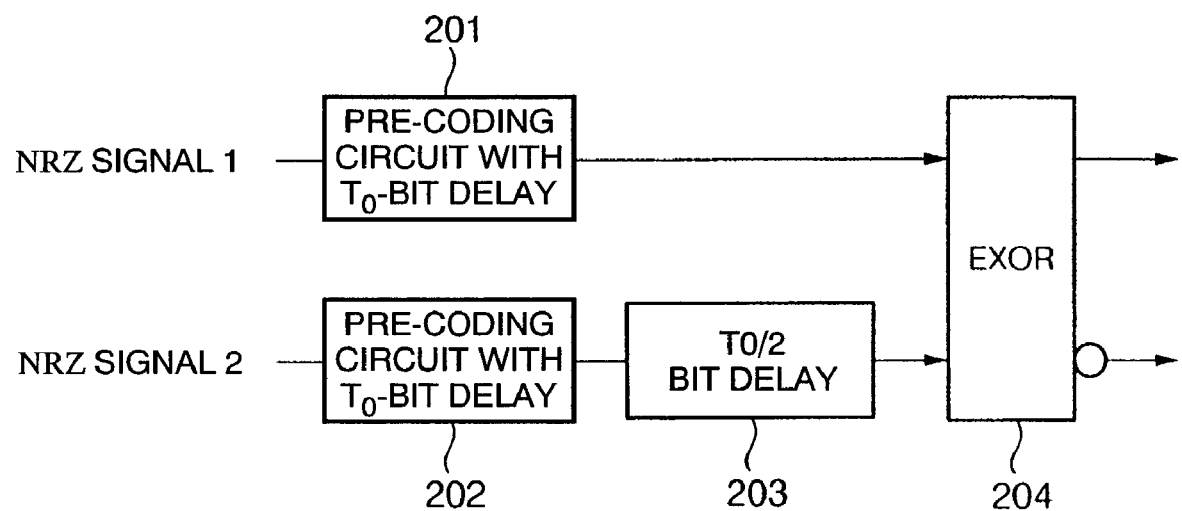
FIG. 31 is a diagram for explaining another structure of the pre-coding unit used in the present invention.

FIG. 31 is a block diagram showing yet another embodiment of the pre-coding device (in the case of a 1 bit delay) used in the optical transmitter according to the present invention. The embodiment shown is basically the same as the embodiment shown in FIG. 29, but instead of carrying out exclusive OR of a plurality of delayed pre-coded multiplexed signals in the optical phase modulator using the carrier frequency, this is carried out using the baseband.

Here, the two synchronized independent NRZ signal 1 and NRZ signal 2 having identical line rates of B are each pre-coded by the pre-coding unit 2 shown in FIG. 35. At this time, the delay time of the delay element is set equal to the time slot $T_0$ of NRZ signal 1 among the multiplexed NRZ 1 and 2 signals. One of the pre-coded NRZ signal is delayed by the delay element, the relative delay difference of each of the phase modulation timings is set equal to $T_0/2$, and the exclusive OR is processed by the exclusive OR circuit 204. The output of this exclusive OR circuit 204 is equal to the pre-coded signal after the NRZ 1 input signal and the NRZ 2 input signal are multiplexed by bit interleaving As can be understood from the above explanation, a pre-coding unit 2, which is difficult to operate at high speed, can be realized by performing parallel processing using a pre-coding circuit that operates as a low speed. As a result, increasing the speed of the pre-coding unit 2 can be easily realized.

Figure 34:
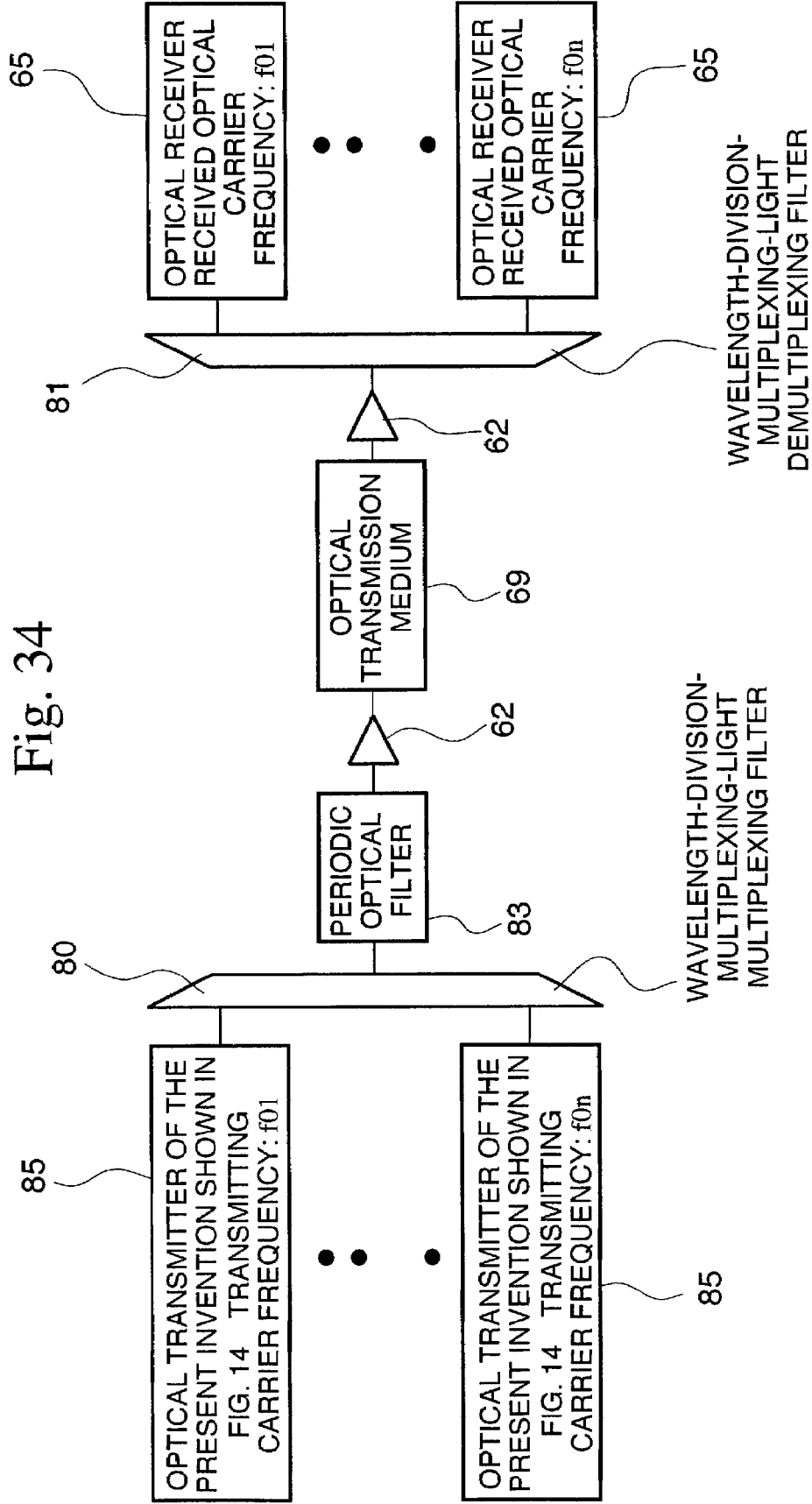
FIG. 34 is a diagram for explaining another embodiment of the optical transmission system according to the present invention.

Here, the optical carrier frequencies ($f_{01}$ to $f_{0n}$) of the transmitter are set in agreement with each of the channel grids of the wavelength division multiplexing system shown in FIG. 34. FIG. 34 is a diagram showing an embodiment in which the channel spacing is equal. In each optical transmitter, the optical carrier signal from the light source 4 is modulated using a DPSK optical modulation format by the MZ optical intensity modulator 32. Baseband signal processing by the DPSK optical modulation format is identical to that in FIG. 2, and thus the explanation thereof is omitted.

The DPSK optical modulated signals modulated by the optical transmitter for each channel are wavelength division multiplexed by the wavelength-division-multiplexing-light multiplexing filter 80. After the wavelength division multiplexed DPSK optical modulation code is optically amplified according to necessity, it is input into the optical filter unit 83. The rejection band optical center frequency of the optical filter unit 83 is set the optical carrier frequency of each channel, and in addition, the period thereof is set to the grid period of the wavelength division multiplexed channels.

By setting the operating conditions of the optical filter unit 83 in the above manner, the periodic optical filter unit 83 simultaneously converts the wavelength division multiplexing DPSK optical modulated signals to a wavelength division multiplexing DCS-RZ optical modulated signals. As an example of the periodic optical filter 83, an MZI type optical filter can be used as an optical filter unit 83.

Subsequently, the simultaneously converted DCS-RZ optical modulation code is optically amplified by the optical amplifier 62 according to necessity, and input into the optical transmission medium 69 at a predetermined transmission channel power. The optical transmission medium 69 can be, for example, a linear repeating transmission line having an optical fiber that is optically directly amplified and repeated by an optical amplifier repeater. The output of the optical transmission medium 69 is optically amplified, and then input into the wavelength demultiplexing filter 81, the DSC-RZ code is wavelength demultiplexed by each channel, and input into the optical receiver 65 after wavelength demultiplexing. The operation in the optical receiver 65 is identical to that of the embodiment shown in FIG. 12, and thus the explanation thereof is omitted.

Moreover, here, in the transmitter 85 that uses the wavelength division multiplexing transmission scheme, only an example was given in which a plurality of channels are simultaneously converted to RZ intensity modulated signals by the wavelength-division-multiplexing-light multiplexing filter 80, but the same effect can be attained by making the polarization of the adjacent wavelength channels orthogonal.

FIGS. 36A through 36D are diagrams for explaining the operation of the embodiments shown in FIG. 34 and FIG. 35.

The carrier signals (FIG. 36A) disposed at equal spacing in the optical frequency domain are each modulated using the DPSK format, and the output of the wavelength-division-multiplexing-light multiplexing filter 80 becomes a wavelength division multiplexed DPSK optical signal spectrum such as that in FIG. 36B. The optical filter unit 5, which is one essential component of the present invention, can be realized by using a periodic optical filter 83 such as that in FIG. 36C. FIG. 36D shows the optically modulated spectrum of the converted wavelength division multiplexing DCS-RZ code.

As explained above, by using the periodicity of one periodic optical filter 83, the wavelength division multiplexing DPSK optical signals can be converted simultaneously to wavelength division multiplexing DCS-RZ optical modulated signals.

Moreover, according to the embodiments of the present invention, the wavelength division multiplexing having equal spacing was assumed in the explanation, but unequal spacing can be used, and in this case, optical filters having equal transfer functions in the optical signal band of the respective channels are used.

Figure 37:
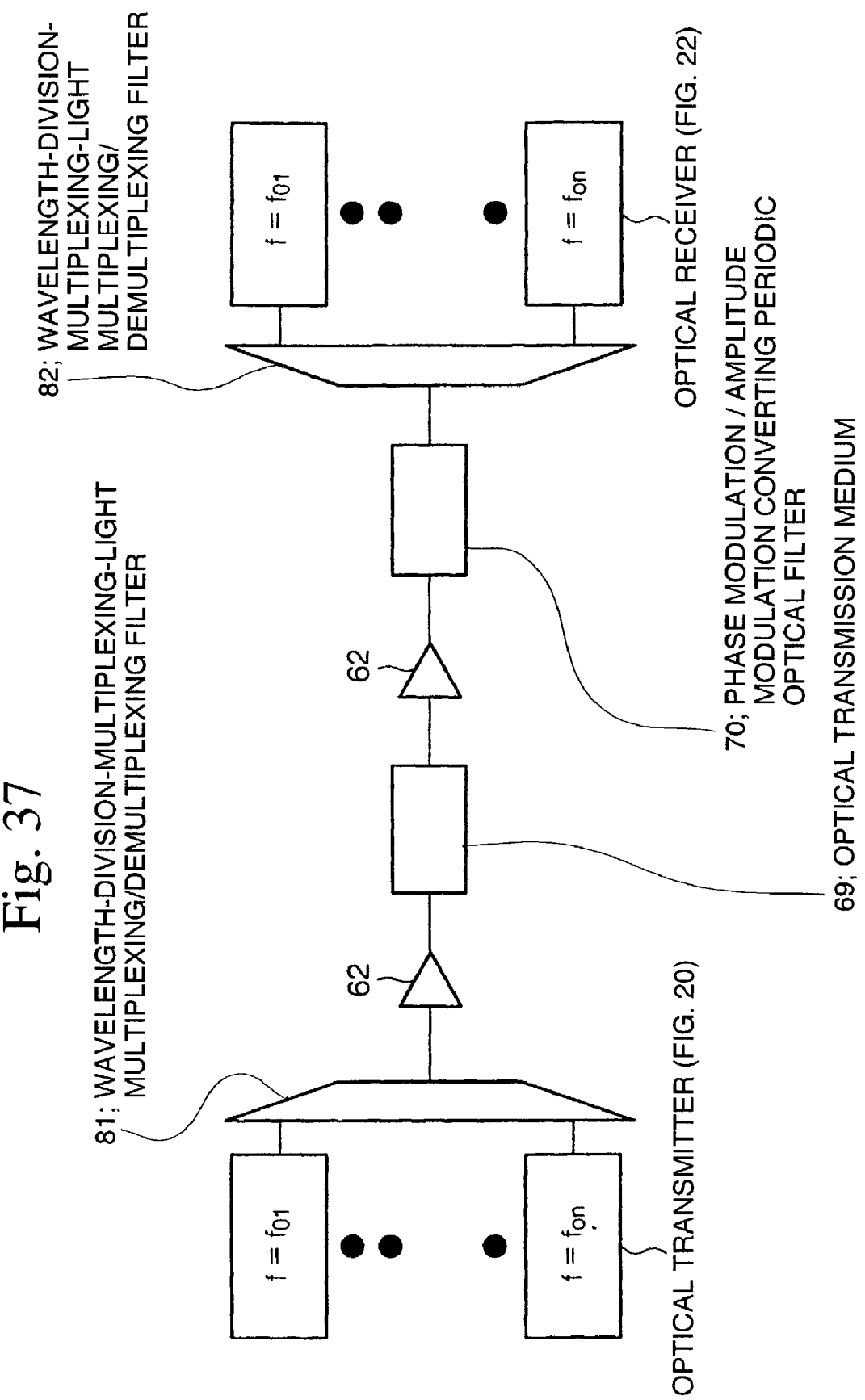
FIG. 37 is a diagram for explaining another embodiment of the optical transmission system according to the present invention.

FIG. 37 is a diagram for explaining yet another embodiment of the optical transmission system according to the present invention. The differences between this embodiment and the embodiment shown in FIG. 34 are that the transmission format is a phase encoded RZ format using a dual mode beat pulse and that a phase modulation/amplitude modulation converting periodic optical filter 70 is disposed at the receiving end. The optical transmission medium can be a linear repeating transmission line having an optical fiber that is optically amplified and repeated by the optical amplifier repeater 62. The structures shown in FIGS. 22A through 22C and FIGS. 25A and 25B are used as an optical receiver.

Here, the optical carrier frequency ($f_{01}$ to $f_{0n}$) of the transmitter are set to match each of the channel grids of the wavelength division multiplexing system shown in FIG. 37. FIGS. 38A through 38E show examples in which the wavelengths are equally spaced (3B, which is three times the line rate). Each of the optical transmitters can have the structure shown in FIG. 20. Here, the phase modulating unit 3 can be any of the structures shown in FIGS. 2, 7, and 29. The baseband processing using the DPSK optical modulation format is identical to that in FIGS. 2 and 29, and thus the explanation thereof is omitted.

Figure 38:
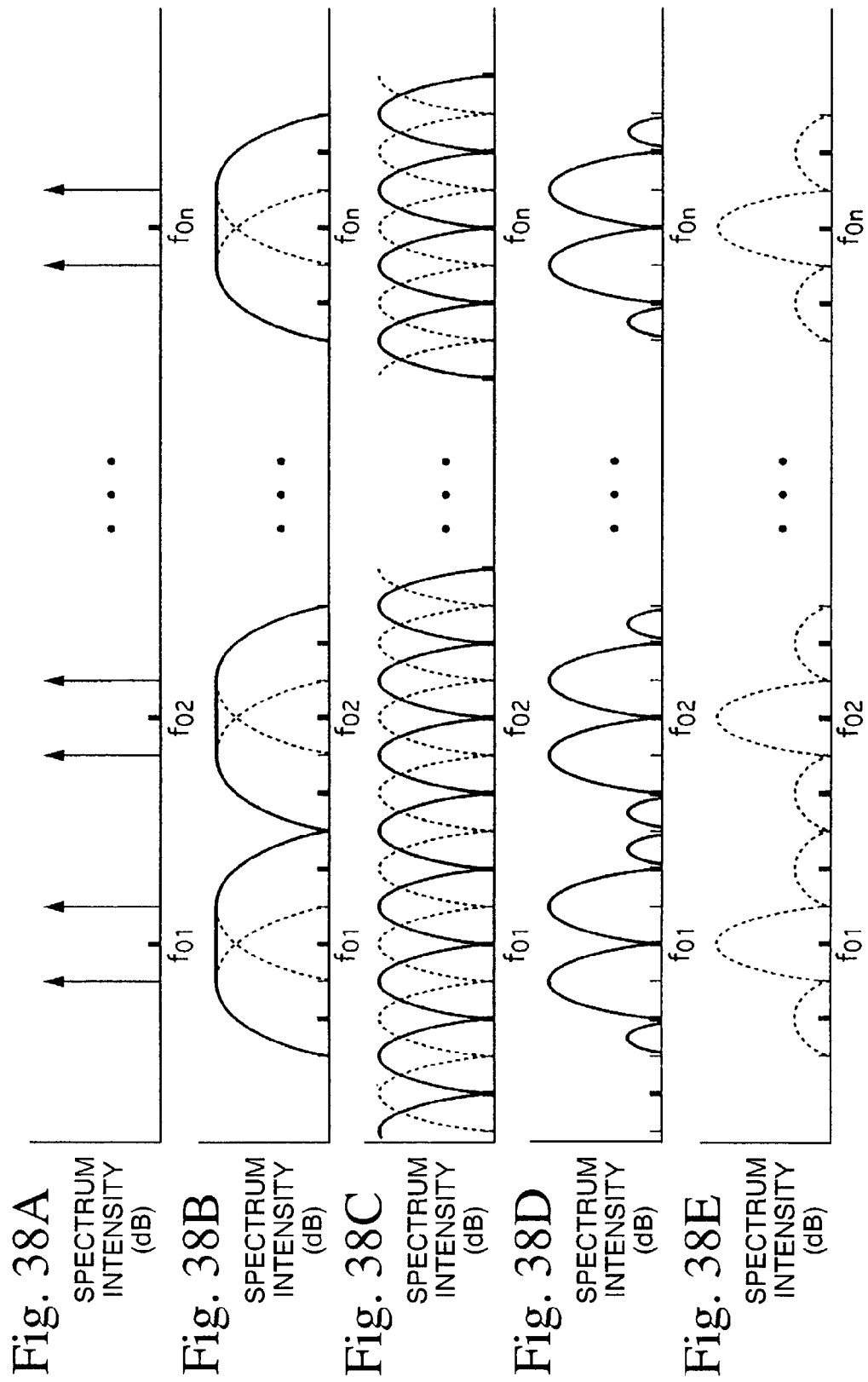
FIGS. 38A through 38E are diagrams for explaining the operation of the optical transmission system shown in FIG. 37 using the optical signal spectra.

The DPSK-CS-RZ signals (FIG. 38) modulated by the optical transmitters of respective channels is wavelength division multiplexed by the wavelength-division-multiplexing-light multiplexing filter 81. The wavelength division multiplexed DPSKCS-RZ optical transmission code is optically amplified according to necessity, and then input into the optical transmission medium 69. The output of the optical transmission medium 69 is input into the optical phase modulation/amplitude modulation converting periodic optical filter 70. The central frequency of the rejection band of the optical phase modulation/amplitude modulation converting periodic optical filter 70 is set to the optical carrier frequency of each of the channels, and in addition, the period thereof is set to the grid period of the wavelength division multiplexed channels. In FIGS. 38A through 38E, the FSR is set equal to the line rate B. FIG. 38A shows the spectrum of the dual mode beat pulse signals generated by each of the optical transmitters in FIG. 37. FIG. 38B shows the spectrum of a signal that is wavelength division multiplexed by the wavelength-division-multiplexing-light multiplexing filter 81 after phase modulating the dual mode beat pulse signal in each of the optical transmitters shown in FIG. 37.

FIG. 38C is a diagram showing the relationship between the optical carrier frequency $f_{0i}$ (i=1 to n) of each of the optical transmitters and the phase modulation/amplitude modulation converting periodic filter 70.

In FIGS. 38A to 38E, a 1-bit delay Mach-Zehnder optical filter is used as the optical periodic filter 70. If the pass band arrangement for the optical periodic filter is selected as shown by the solid line in FIG. 38C, then as shown in FIG. 38D, differential output RZ optical intensity modulated signals are generated by simultaneous conversion, and it is output from the optical periodic filter 70. In addition, if the pass band arrangement is selected as shown by the dashed line in FIG. 38C, then as shown in FIG. 38E, sum output RZ optical intensity modulated signals are generated by simultaneous conversion, and it is output from the optical periodic filter 70. One of the above RZ optical intensity modulated signals generated by simultaneous conversion is demultiplexed by wavelength by a wavelength-division-multiplexing-light multiplexing/demultiplexing filter 82, and demodulated at each of the optical receivers.

The FSR should be set equal to or greater than the line rate B. For example, considering WDM having a line rate of 43 Gbit/s and a 100 GHz spacing, demodulation is possible even if the FSR of the optical phase modulation/amplitude modulation converting periodic optical filter 70 (MZI optical filter) is 50 GHz. In addition, in the case that an MZI filter can be used as the optical phase modulation/amplitude modulation converting periodic optical filter 70, polarization insensitive optical phase modulation/amplitude modulation converting filter shown in FIG. 27 is preferably used.

Figure 39:
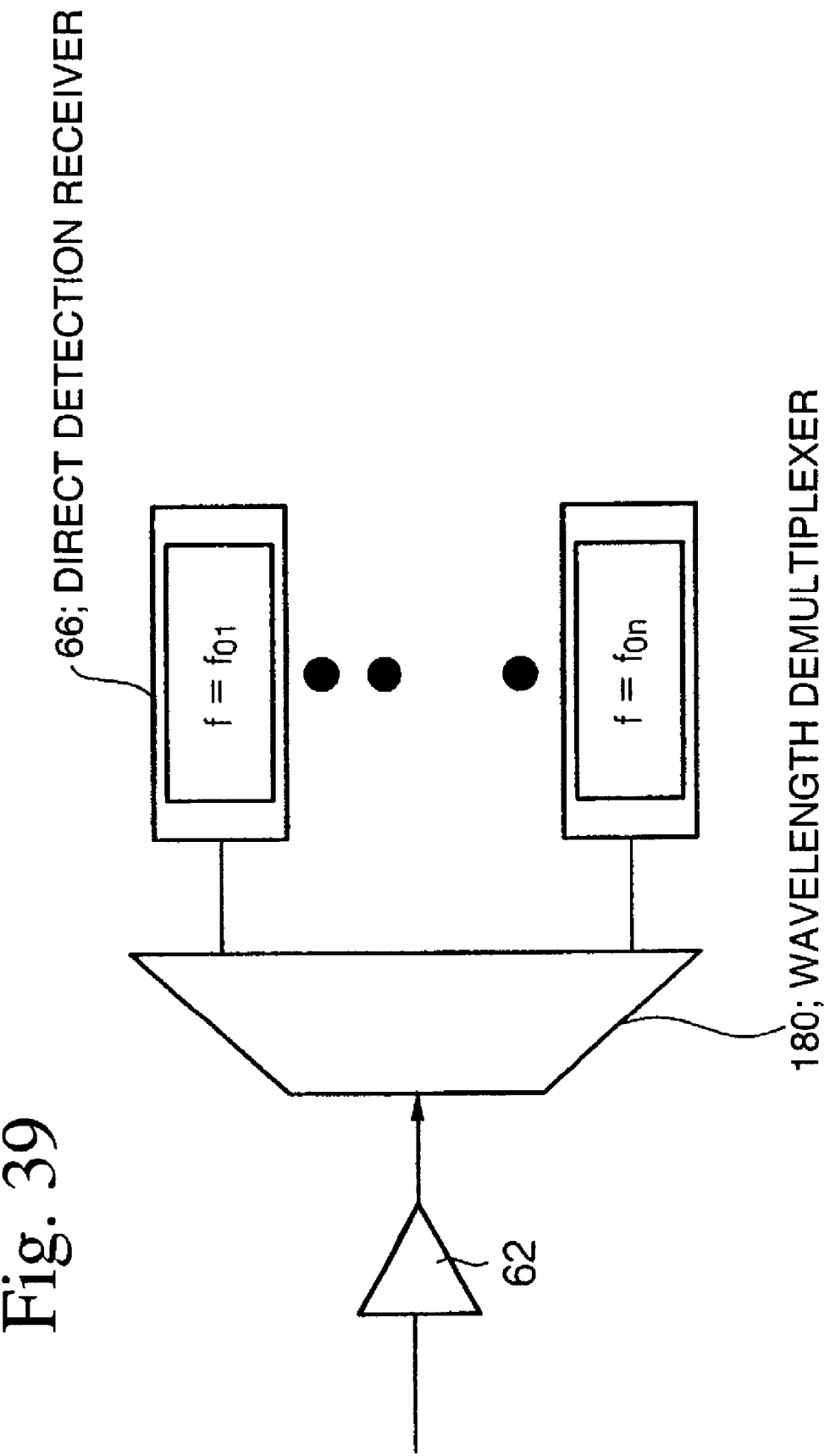
FIG. 39 is a diagram for explaining another embodiment of the optical receiver used in the optical transmission system shown in FIG. 37.

FIG. 39 is a diagram showing an embodiment in the case that the function of the phase modulation/amplitude modulation converting periodic optical filter 70 and the function of the wavelength-division-multiplexing-light multiplexing/demultiplexing filter 82 are realized by one optical filter. In addition, FIGS. 40A through 40C are diagrams for explaining the conversion operation of the filter shown in FIG. 39.

In FIG. 39, like the receiving unit in FIG. 37, the wavelength division multiplexing RZ phase encoded signal is input into the receiver 66 shown in FIG. 39 after being transmitted over an optical transmission medium such as an optical filter. In the optical receiver 66, the wavelength division multiplexed signals are amplified together by the optical amplifying pre-amplifiers 62, and input into the wavelength demultiplexer 180. The center frequency of the pass band in each of the channels of the wavelength demultiplexer 180 is set to the carrier frequency of each of the channels. Here, the wavelength division multiplexing having equal spacing was assumed in the explanation, but unequal spacing can be used.

The pass band shape of the wavelength demultiplexer is a Gaussian, and its FWHM is set from 0.5 to 0.6 times the channel line rate. In the example shown in FIGS. 26A through 26C, the FWHM is set to 0.56 times the line rate. By setting in this manner, the wavelength division multiplexing RZ phase modulated signals are simultaneously converted into wavelength division multiplexed duobinary signals.

The advantage of this scheme is that realization of optical phase modulation/amplitude modulation converting filter is easy and the loss in the pass band is low. In addition, a Gaussian filter whose pass band is insensitive to the input polarization can be used. For example, when the array waveguide grating filter disclosed in the citation, H. Takahashi, K. Oda, H. Toba, and Y. Inoue, "Transmission characteristics of arrayed waveguide N×N wavelength multiplexer", IEEE J. Lightwave Technol, 13, No. 3, pp. 447–455, 1995, is used, a wavelength division multiplexing demultiplexer using a Gaussian filter having uneven spaces or even spaces can be realized.

When the optical phase modulation/amplitude modulation converting filter has the above operating conditions, the periodic filter simultaneously converts the wavelength division multiplexing DPSK optical modulated signals to wavelength division multiplexing RZ signals.

Moreover, FIGS. 32A, 32B, 33A and 33B are diagrams for explaining the effect of the optical transmission system according to the present invention using the phase modulation format as the transmission format.

Figures 32A, 32B:
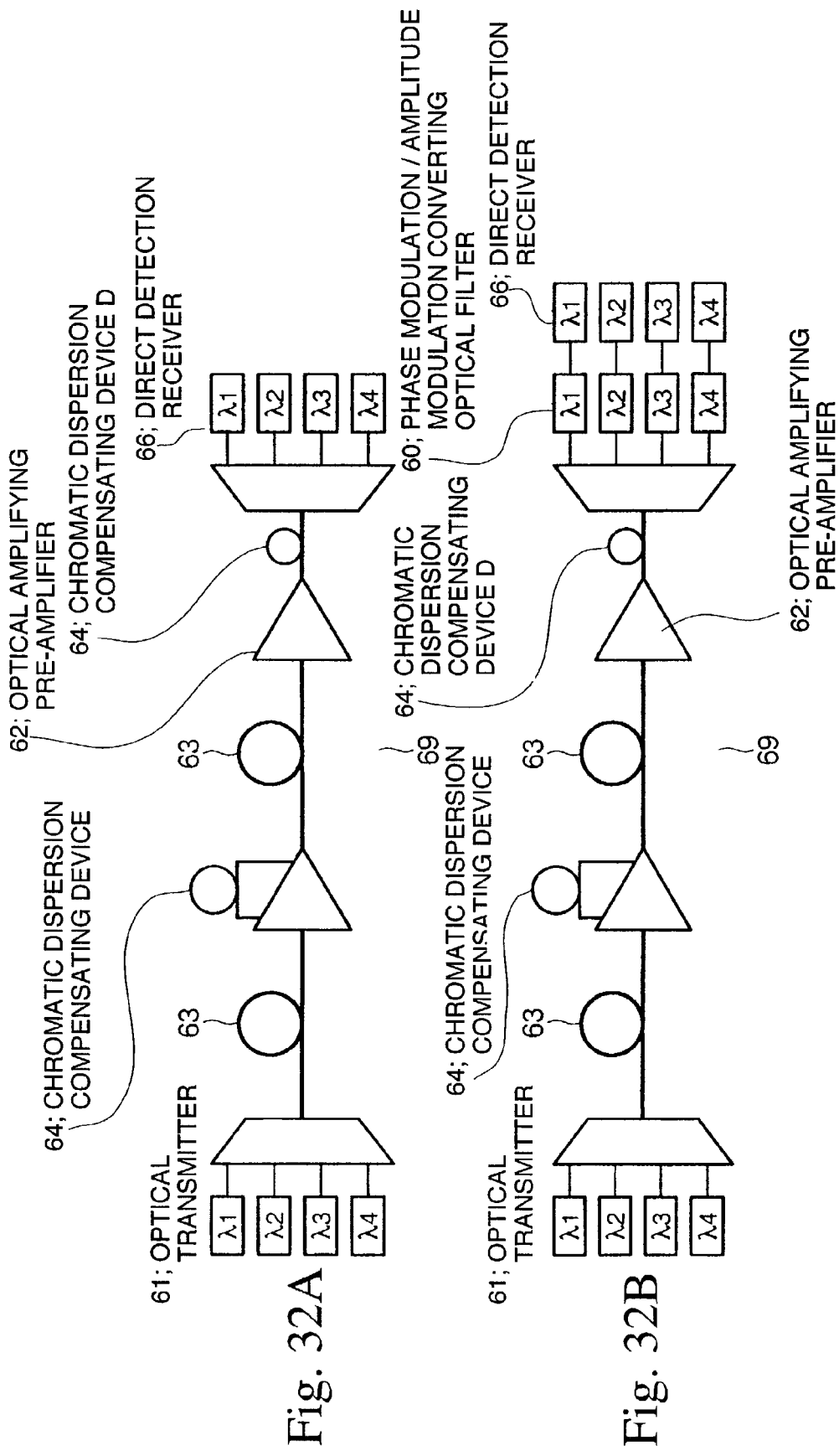
FIGS. 32A and 32B are diagrams for explaining the effect of the optical transmission system according to the present invention.

FIGS. 32A and 32B show the models of two computer simulations. The computing conditions are as follows: line rate, 43 Gbit/s; number of channels, 4; wavelength division multiplexing channel spacing, 100 GHz; and signal wavelength, C band. The fiber transmission line was a 200 km optical amplifier and repeater transmission line, and each span comprised of a 100 km dispersion shifted fiber (loss, 0.21 dB; dispersion value, +2 ps/nm/km; dispersion slope, 0.07 ps/km/nm). The dispersion of the first span is compensated by the optical amplifier repeater such that the center wavelengths of channel 2 and channel 3 have zero dispersion, and the output of the first span is input into the second span.

A calculation model (FIG. 32A) in which an RZ format that carries out phase modulation/amplitude modulation conversion in the transmitter as shown in FIG. 14 is used, is compared with a calculation model (FIG. 32B) in which an RZ format that carries out phase modulation/amplitude modulation conversion in the receiver as shown in FIG. 21 is used.

Here, a Mach-Zehnder (MZI) type optical filter whose FSR is equal to the line rate B (=43 GHz) was used as the phase modulation/amplitude modulation converting filter 60. Each of the optical carrier signals is modulated by the optical transmitter 61 shown in FIG. 13 or FIG. 20, then wavelength division multiplexed by a wavelength division multiplexing filter at a 100 GHz spacing, and input into the fiber transmission line 63. The output of the fiber transmission line 63 is optically amplified, demultiplexed by wavelength, and then the chromatic dispersion of the transmission line is compensated by the chromatic dispersion compensating device D (64). In FIG. 32A, the signal received by the direct detection receiver 66 is regenerated. In FIG. 32B, the dispersion compensated optical signal is input into the MZI filter, which serves as the phase modulation/amplitude modulation converting optical filter 60, and after being converted to an intensity modulated signal, the signal received by the direct detection receiver 66 is regenerated.

Figure 33A:
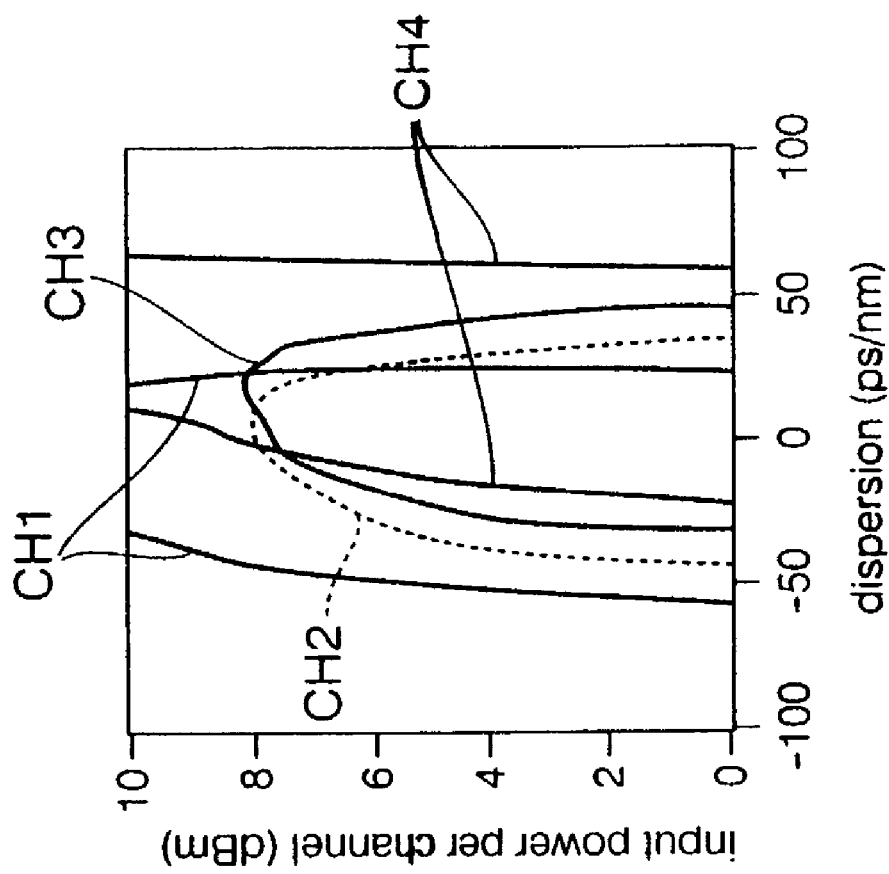
FIGS. 33A and 33B are diagrams showing the calculation result for explaining the effect of the optical transmission system according to the present invention.

FIG. 33A shows for each of the channels the tolerance range of the eye opening penalty within 1 dB in the case that the channel power and the total dispersion (i.e., the total of the dispersion of the fiber transmission line and the dispersion of the dispersion compensating device D) change for the structure shown in FIG. 32A.

In the case of linear transmission where the channel power is equal to or less than 2 dBm, the dispersion tolerance of each of the channels becomes about 80 ps/nm, which is almost twice that of the dispersion tolerance in comparison with normal RZ format can be realized. As can be understood from these results, the RZ format transmission scheme described above has a wide dispersion tolerance. The allowable channel power for which the transmission characteristics for all channels remain within an eye opening penalty of 1 dB is determined by channels 2 and 3, and is approximately +5 dBm.

Figure 33B:
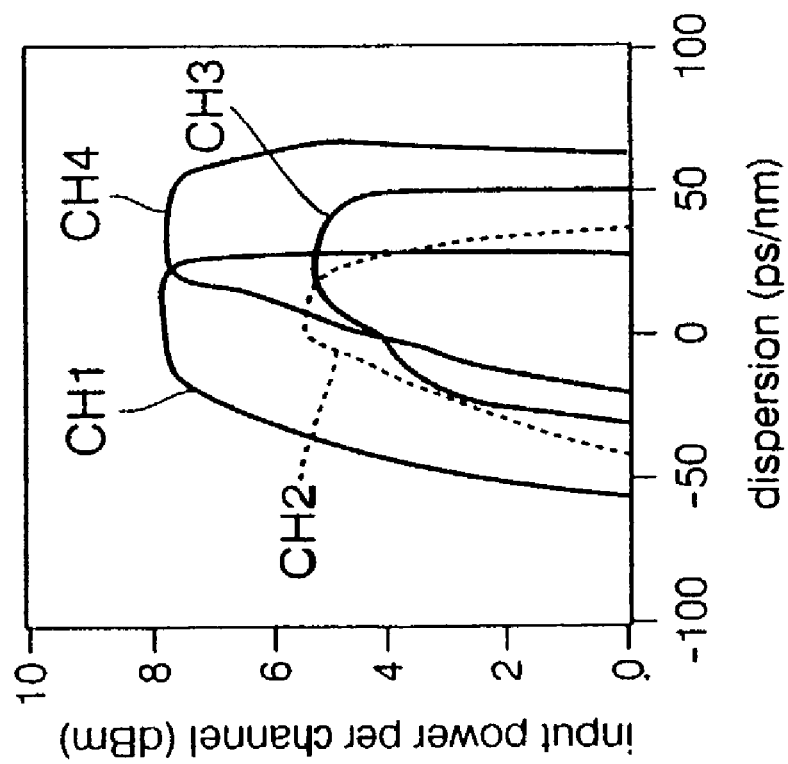

FIG. 33B shows for each of the channels the tolerance range of the eye opening penalty within 1 dB in the case that the channel power and the total dispersion (i.e., the total of the dispersion of the fiber transmission line and the dispersion of the dispersion compensating device D) changes for the structure shown in FIG. 32B.

In the case of linear transmission where the channel power is equal to or less than 2 dBm, the dispersion tolerance of each of the channels becomes about 80 ps/nm, which is almost twice that of the normal RZ format, and a dispersion tolerance equivalent to the case shown in FIG. 32A can be realized. As can be understood from these results, the RZ format transmission scheme described above has a wide dispersion tolerance in comparison to conventional technology. In addition, allowable channel power for which the transmission characteristics for all channels remain within an eye opening penalty of 1 dB is determined by channels 2 and 3, and is approximately +8 dBm.

As can be understood from these results, the allowable channel power can be improved by approximately 3 dB over that of the scheme shown in FIG. 32A, and the tolerance with respect to degradation due to non-linear effects can be improved. Furthermore, because the optimal dispersion value does not depend on the channel power, an optical amplifier repeater system whose channel power has a wide dynamic range can be realized using a wavelength division multiplexing technology.

When compared to the FIGS. 33A and 33B, in the case that the optical transmission line is linear, identical characteristics are obtained that do not depend on the position of the phase modulation/amplitude modulation converting optical filter 60, but the channel power is increased, and in the case that the optical transmission line is non-linear, it can be understood that in comparison to FIG. 33C, in FIG. 32B a robust transmission characteristics can be realized due to the non-linear effects, and it can be understood that a new effect is obtained thereby.

What is claimed is:

1. An optical transmitter comprising:
a light source which is a single mode longitudinal light source;
a pre-coding device that receives an NRZ signal and generates a pre-coded NRZ signal or a differential pre-coded NRZ signal whose logic inverts each time a mark bit is input;
an optical phase modulating device that uses a Mach-Zehnder optical intensity modulator driven by either the pre-coded NRZ signal or the differential pre-coded NRZ signal generated by the pre-coding device, and carries out optical phase modulation of the optical phase of a single longitudinal mode optical signal from the light source using the pre-coded NRZ signal or the differential pre-coded NRZ signal generated by the-coding device and outputs an RZ optical phase modulated signal in which a plurality of duobinary optical signal components are included in an optical RZ signal spectrum with carrier suppressions; and
an optical filter device that converts the RZ optical-phase modulated signal generated by the optical phase modulating device to an RZ optical intensity modulated signal and outputs an RZ optical intensity modulated signal from an output terminal.

2. An optical transmitter according to claim 1, wherein a direct current bias is applied to the Mach-Zehnder optical intensity modulator to obtain transmission-null when unmodulated, and the Mach-Zehnder optical intensity modulator carries out the differential phase shift keying modulation on the single longitudinal mode optical signal using the pre-coded NRZ signal or the differential pre-coded NRZ signal.

3. An optical transmitter according to claim 1 or 2, wherein the optical filter device is a Mach-Zehnder interferometer type optical filter.

4. An optical transmitter according to claim 1, wherein the optical filter device is a Mach-Zehnder interferometer type optical filter whose rejection band center frequency coincides with the carrier frequency of a channel, and whose output optical electric field is:

$$E(t)=(Ein/2)\exp\{-j(\omega\tau\phi)/2\}\sin\{(\omega\tau\phi)/2\} \quad \text{(Equation 1)}$$

where the amplitude of the input optical signal field is denoted by Ein, the optical frequency is denoted by $\omega$, the delay amount of a delay element is denoted by $\tau$, and the relative phase between the optical signals propagated through two waveguides in the Mach-Zehnder interferometer type optical filter is denoted by $\phi$.

5. An optical transmitter according to claim 3, wherein the relative delay difference between two arms of the Mach-Zehnder interferometer type optical filter is 1 time slot.

6. An optical transmitter further comprising:
a dual mode beat pulse light source that generates two longitudinal mode signals which synchronizes with a data signal and which have the mode spacing between the two longitudinal mode signals that is an integral multiple of the data line rate, and which mode signals are mode-locked with each other;
a pre-coding device that receives an NRZ signal, and carries out code conversion such that an RZ optical phase modulated signal output from the optical transmitter has a logic identical to the input NRZ signal; and outputs a pre-coded NRZ signal or a differential pre-coded NRZ signal; and
an optical phase modulating device in which is driven by either the pre-coded NRZ signal or the differential pre-coded NRZ signal generated by the pre-coding device, and carries out optical phase modulation of an optical pulse train generated by the dual mode beat pulse light source has undergone optical phase modulation by using a the pre-coded NRZ signal or the differential pre-coded NRZ signal generated by the pre-coding device, and outputs from an output terminal an RZ optical phase modulated signal in which a plurality of duobinary optical signal components are included in an optical RZ signal spectrum with carrier suppression.

7. An optical transmitter, further comprising a light source which is a dual mode beat pulse light source that generates two longitudinal mode signals which synchronize with a data signal and which have a mode spacing between the two longitudinal mode signals that is an integral multiple of the data line rate, and which are mode-locked with each other;
a pre-coding device that receives an NRZ signal and carries out code conversion such that an RZ optical phase modulated signal output from the optical transmitter has a logic identical to the input NRZ signal;

an optical phase modulating device which uses a Mach-Zehnder optical intensity modulator driven by either a pre-coded NRZ signal or a differential pre-coded NRZ signal generated by the pre-coding device, and carries out optical phase modulation of an optical pulse train generated by the dual mode beat pulse light source using the pre-coded NRZ signal or the differential pre-coded NRZ signal generated by the pre-coding device, and outputs an RZ optical phase modulated signal in which a plurality of optical duobinary signal components are included in an optical RZ signal spectrum with carrier suppression; and an optical filter device that converts an the RZ optical phase modulated signal generated by the optical phase modulating device to an RZ optical intensity modulated signal having either the identical logic or the inverted logic of the input NRZ signal, and outputs the RZ optical intensity modulated signal from an output terminal.

8. An optical transmitter according to claim 6 or claim 7, wherein the pre-coding device carries out differential pre-coding by processing exclusive OR of the NRZ signal that is input into the pre-coding device and a delayed NRZ signal, and the pre-coding device generates the delayed NRZ signal by delaying the NRZ signal obtained from the exclusive OR processing by n bits (where n is a natural number).

9. An optical transmitter according to claim 7, wherein the optical filter device is a Mach-Zehnder interferometer type optical filter, and the relative delay difference between two arms in the Mach-Zehnder interferometer type optical filter is greater than n−1 bits and less than n+1 bits (where n is a natural number).

10. An optical transmission system using a single channel or wavelength division multiplexing channels, comprising:

an optical transmitter that comprises: a light source that is either a single longitudinal mode light source or a dual mode beat pulse light source; a pre-coding device that receives an NRZ signal and generates a pre-coded NRZ signal or a differential pre-coded NRZ signal whose logic inverts each time a mark bit is input; an optical phase modulating device that uses a Mach-Zehnder optical intensity modulator driven by either the pre-coded NRZ signal or the differential pre-coded NRZ signal generated by the pre-coding device and performs optical phase modulation on a signal from the light source using the pre-coded NRZ signal or the differential pre-coded NRZ signal generated by the pre-coding device and outputs an RZ optical phase modulated signal in which a plurality of optical duobinary signal components are included in an optical RZ signal spectrum and have a suppressed carrier component; and an optical filter device that converts an the RZ optical phase modulated signal generated by the optical phase modulating device into an RZ optical intensity modulated signal and outputs the RZ optical intensity modulated signal from an output terminal;

an optical transmission medium that transmits the RZ optical intensity modulated signal output by the optical transmitter; and an optical receiver that receives the RZ optical intensity modulated signal output by the optical transmitter via the optical transmission medium, demodulates and directly detects the transmitted RZ optical intensity modulated signal to convert the RZ optical intensity modulated signal into a baseband electrical signal.

11. An optical transmission system according to claim 10, wherein the optical receiver compensates the waveform distortion, which is induced in the RZ optical intensity modulated signal, due to chromatic dispersion or polarization mode dispersion of the optical transmission medium.

12. An optical transmission system according to claim 10, wherein the optical phase-modulated signals are generated by the optical phase modulating device in the optical transmitter, are wavelength-division-multiplexed, and are subsequently converted simultaneously to the wavelength-division-multiplexed RZ optical intensity modulated signals by the single optical filter device of the optical transmitter, and transmitted via the optical transmission medium.

13. An optical transmission system using a single channel or wavelength division multiplexing channels, comprising:

an optical transmitter that is provided with: a light source that is a single longitudinal-mode light source or a dual mode beat pulse light source; a pre-coding device that receives an NRZ signal and carries out code conversion of the input NRZ signal such that the an RZ optical phase modulated signal output from the optical transmitter has a logic identical to the input NRZ signal and outputs a pre-coded NRZ signal or a differential pre-coded NRZ signal; and an optical phase modulating device that is driven by either the pre-coded NRZ signal or the differential pre-coded NRZ signal generated by the pre-coding device and performs optical phase modulation on a signal from the light source using the pre-coded NRZ signal or the differential pre-coded NRZ signal generated by the pre-coding device;, and outputs an RZ optical phase modulated signal in which a plurality of optical duobinary signal components are included in an optical RZ signal spectrum and have a suppressed carrier component;

an optical transmission medium that transmits a the RZ optical phase modulated data signal with sinusoidal RZ optical intensity modulation that has been output by the optical transmitter;

an optical receiver that receives the RZ optical phase modulated signal output by the optical transmitter via the optical transmission medium, and after passing through an optical filter device that converts the RZ optical phase modulated signal to an RZ optical intensity modulated signal, demodulates and directly detects the RZ optical intensity modulated signal to convert to a baseband electrical signal.

14. An optical transmission system according to claim 13, wherein the wavelength division multiplexed optical phase modulated signals generated by the optical phase modulating device of the optical transmitter corresponding to each of the channels is simultaneously converted to the wavelength-division-multiplexed RZ optical intensity modulated signals by the single optical filter device in the optical receiver.

15. An optical transmission system according to any of claims 10 to 14, wherein a periodic optical filter whose free: spectral range is equal to the wavelength division multiplexing channel spacing is used as the optical filter device.

16. An optical transmission system according to any of claims 10 to 14, wherein an optical filter having an equal transfer function in the optical signal band for each of channels is used as the optical filter device.

17. An optical transmission system according to any of claims 10 to 14, wherein the polarization of adjacent wavelength division multiplexing channels is orthogonal.

18. An optical transmitter in an optical transmission system comprising an optical transmitter, an optical receiver, and an optical transmission medium that couples the optical transmitter and the optical receiver,
   wherein the optical transmitter is formed by the optical transmitter according to any one of claims 1, 6, and 7,
   wherein the optical phase modulating device in the optical transmitter includes n DPSK modulators (where n is a natural number) connected in series,
   wherein the driving signal of the m-th DPSK modulator is generated by a delay device that delays the m-th input signal of the optical phase modulating device by an interval equal to ml(nB) (where m is a natural number) and by a pre-coding device that pre-codes the delayed modulated signal, and
   wherein the DPSK modulators convert n multiplexed baseband modulated signals having a bit rate of B into time division multiplexed optical modulated signal having a line rate of nB.

19. An optical transmitter in an optical transmission system comprising an optical transmitter, an optical receiver, and an optical transmission medium that couples the optical transmitter and the optical receiver,
   wherein the optical transmitter is formed by the optical transmitter according to any one of claims 1, 6, and 7,
   wherein the optical filter device is provided with: a polarization beam splitter that is connected to a circulator having three ports; a polarization preserving devices that maintains the polarization state of the two optical outputs of the polarization beam splitter; and a Mach-Zehnder interferometer type filter that couples the input thereof and the output thereof, wherein an optical input signal is input into a first port of the circulator and output from a second port of the circulator, and the output signal of the circulator is input into a first port, which is a multiplexing/demultiplexing port, of the polarization beam splitter, and the optical signals output from second and third ports of the polarization beam splitter, which serve as polarization separation output ports, are input into polarization preserving devices, and while preserving the polarization of the two separated output beams, the separated output beams are input from the opposite directions into the two ports of the Mach-Zehnder interferometer type optical filter so that the two separated output beams couple with either the TE mode or TM mode of the Mach-Zehnder interferometer type optical filter, and thereby an optical output signal from a third port of the circulator is obtained.

20. An optical transmitter according to any of claims 1, 6, and 7, wherein the pre-coding device is prodded with: n pre-coding circuits that operate at the line rate of B; a delay circuit that delays each output from the n pre-coding circuits by mT0/n (where T0=1/B, and m is a natural number selected from 1 to n); and an exclusive OR circuit that processes the exclusive OR of the n delayed pre-coded output signals, and wherein a time division multiplexed pre-coded signal having a line rate of nB is generated.

21. An optical transmission system according to any of claims 10 through 14,
   wherein the optical phase modulating device provided in the optical transmitter comprises n (where n is a natural number) DPSK modulators connected in series,
   wherein the driving signal of the m-th DPSK modulator is generated by a delay device that delays the m-th input signal of the optical phase modulating device by an interval equal to ml(nB) (where m is a natural number) and by a pre-coding device that pre-codes the delayed modulated signal, and
   wherein the DPSK modulators convert n multiplexed baseband modulated signals having a bit rate of B into time division multiplexed optical modulated signal having a line rate of nB.

22. An optical transmission system according to any of claims 10 through 14,
   wherein an optical filter used in at least one of either the optical transmitter or the optical receiver is provided with: a polarization beam splitter connected to a circulator having 3 ports; a polarization preserving medium that maintains the polarization state of two optical outputs of the polarization beam splitter; and a Mach-Zehnder interferometer type optical filter that couples the input thereof and the output thereof, and
   wherein an optical input signal is input into a first port of the circulator and output from a second port of the circulator, and the output signal of the circulator is input into a first port, which is a multiplexing port, of the polarization beam splitter, the optical signals output from second and third ports of the polarization beam splitter, which serve as polarization separation output ports, are input into the polarization preserving devices, and while preserving the polarization of the two separated output beams, the separated output beams are input from the opposite directions into the two ports of the Mach-Zehnder interferometer type optical filter so that the two separated output beams couple with either the TE mode or TM mode of the Mach-Zehnder interferometer type optical filter, and thereby an optical output signal from a third port of the circulator is obtained.

23. An optical transmission system according to claim 13 or 14, wherein the pass band of the optical filter device used in the optical receiver has a transmission characteristic that extracts to convert a binary-intensity modulated signal whose signal spectrum includes the optical duobinary signal component from the input phase modulated signal.

24. An optical transmission system according to any of claims 10, 11, and 13,
   wherein the pre-coding device is provided with: n pre-coding circuits that operate at the line rate of B; a delay circuit that delays each output from the n pre-coding circuits by mT0/n (where T0=1/B, and m is a natural number selected from 1 to n); and an exclusive OR circuit that processes the exclusive OR of the delayed n pre-coded output signals, and
   wherein a time division multiplexed pre-coded signal having a line rate of nB is generated.

* * * * *

UNITED STATES PATENT AND TRADEMARK OFFICE
CERTIFICATE OF CORRECTION

PATENT NO. : 7,116,917 B2
APPLICATION NO. : 10/185407
DATED : October 3, 2006
INVENTOR(S) : Yutaka Miyamoto et al.

It is certified that error appears in the above-identified patent and that said Letters Patent is hereby corrected as shown below:

On the Title Page (73)
In the Assignee:

Please delete "Nippon Telegraph and Telephone Coproration, Tokyo (JP)" and substitute -- Nippon Telegraph and Telephone Corporation, Tokyo (JP) --.

Signed and Sealed this

Twenty-sixth Day of December, 2006

JON W. DUDAS
*Director of the United States Patent and Trademark Office*